(12) United States Patent
Kweon

(10) Patent No.: US 11,886,527 B2
(45) Date of Patent: Jan. 30, 2024

(54) DIGITAL MAP BASED ONLINE PLATFORM

(71) Applicant: S360VR CO., LTD., Daejeon (KR)

(72) Inventor: Gyeongil Kweon, Daejeon (KR)

(73) Assignee: S360VR CO., LTD., Daejeon (KR)

( * ) Notice: Subject to any disclaimer, the term of this patent is extended or adjusted under 35 U.S.C. 154(b) by 0 days.

(21) Appl. No.: 17/891,161

(22) Filed: Aug. 19, 2022

(65) Prior Publication Data

US 2023/0086205 A1    Mar. 23, 2023

Related U.S. Application Data

(63) Continuation of application No. PCT/KR2021/002186, filed on Feb. 22, 2021.

(30) Foreign Application Priority Data

Feb. 20, 2020  (KR) .......................... 10-2020-0020778
Mar. 31, 2020  (KR) .......................... 10-2020-0038796

(Continued)

(51) Int. Cl.
  *G06F 16/00*      (2019.01)
  *G06F 16/955*     (2019.01)
  *G06F 16/29*      (2019.01)

(52) U.S. Cl.
  CPC .......... *G06F 16/9558* (2019.01); *G06F 16/29* (2019.01)

(58) Field of Classification Search
  CPC .. G06F 16/9558; G06F 16/29; G06F 16/9537; G01C 21/00; G06Q 30/02; G06Q 50/10; G07F 17/16; G09B 29/00
  See application file for complete search history.

(56) References Cited

U.S. PATENT DOCUMENTS 6,985,588 B1    1/2006   Glick et al.
7,428,476 B1    9/2008   Toms
(Continued)

FOREIGN PATENT DOCUMENTS

JP        2010061092 A      3/2010
KR     1020000072562 A     12/2000
(Continued)

OTHER PUBLICATIONS

What is an "online platform"?, in an Introduction [0067] to Online Platforms and Their Role in the Digital Transformation, OECD Publishing, Paris, OECD, 2019.
(Continued)

*Primary Examiner* — Dinku W Gebresenbet
(74) *Attorney, Agent, or Firm* — Nicholas Park

(57) ABSTRACT

A digital map based online platform is provided. The online platform comprises an outdoor map server, a data store, a building database, a space database, and a computer program stored in a medium. The data store manages digital files related to buildings including floor plans of buildings and digital files including website source codes related to spaces in individual folders for each building and space. The building database and the space database manage map setting data of buildings and spaces, respectively. The computer program stored in a medium executes a series of stages to integrally display an outdoor map, an indoor map including floor plans of buildings, Internet links, and responsive HTML pages on the view of a digital map. The medium includes a web server and a user terminal.

4 Claims, 31 Drawing Sheets

(30) Foreign Application Priority Data

Nov. 3, 2020 (KR) ........................ 10-2020-0145593
Feb. 20, 2021 (KR) ........................ 10-2021-0022985

(56) References Cited

U.S. PATENT DOCUMENTS

| | | | |
|---|---|---|---|
| 7,746,343 B1 * | 6/2010 | Charaniya | G06T 17/05 |
| | | | 345/428 |
| 8,464,181 B1 | 6/2013 | Bailiang et al. | |
| 9,323,420 B2 | 4/2016 | Bailiang et al. | |
| 9,417,777 B2 | 8/2016 | Pensack-Rinehart et al. | |
| 9,883,333 B2 | 1/2018 | Ganesalingam et al. | |
| 11,132,102 B2 | 9/2021 | Kornmann et al. | |
| 2011/0157220 A1 * | 6/2011 | Kim | G09B 11/00 |
| | | | 345/619 |
| 2013/0104035 A1 * | 4/2013 | Wagner | G06F 16/29 |
| | | | 715/240 |
| 2014/0100815 A1 | 4/2014 | Dubuc | |
| 2015/0019625 A1 | 1/2015 | Pensack-Rinehart et al. | |
| 2015/0020008 A1 | 1/2015 | Pensack-Rinehart et al. | |
| 2018/0199190 A1 * | 7/2018 | Khan | G01S 5/02 |

FOREIGN PATENT DOCUMENTS

| | | |
|---|---|---|
| KR | 1020020022487 A | 3/2002 |
| KR | 100500504 B1 | 7/2005 |
| KR | 200430083 Y1 | 11/2006 |
| KR | 100819167 B1 | 4/2008 |
| KR | 20100083961 A * | 7/2010 |
| KR | 101312294 B1 | 10/2013 |
| KR | 101358690 B1 | 2/2014 |
| KR | 101546676 B1 | 8/2015 |
| KR | 101967394 B1 | 4/2019 |
| KR | 102001785 B1 | 7/2019 |
| KR | 101985699 B1 | 9/2019 |
| KR | 102029450 B1 | 10/2019 |
| KR | 102073183 B1 | 2/2020 |
| KR | 102234723 B1 | 4/2021 |
| WO | 2004034076 A2 | 4/2004 |
| WO | 2013104127 A1 | 7/2013 |

OTHER PUBLICATIONS

Google maps, Wikipedia, Dec. 28, 2020.
Universal Transverse Mercator coordinate system, Wikipedia, Sep. 2, 2020.
Web Mercator map projection, National Geospatial-intelligence Agency (NGA), Feb, 18, 2014.
Web Mercator projection, Wikipedia, Jul. 24, 2020.
Sinusoidal projection, Wikipedia, Jul. 25, 2020.
WIPO, ISA210, International Search Report of International Application No. PCT/KR2021/002186, dated Jun. 29, 2021, 5 pages.
WIPO, ISA237, International Search Report of International Application No. PCT/KR2021/002186, dated Jun. 29, 2021, 7 pages.

* cited by examiner

FIG. 20

```
// initial zoom level
let zoom = 12;

// coordinate of the view center in (longitude, latitude) pair
let viewLonLat = [127.4259235, 36.3286936]; // Daejeon Jungang-ro Intersection // view center coordinates in Spherical Mercator(EPSG:3857)
let view_xy = ol.proj.transform(viewLonLat, "EPSG:4326", "EPSG:3857");

const view = new ol.View({
    center: view_xy,
    zoom: zoom
});

const map = new ol.Map({
    target: "map",
    layers: [baseLayer,
             BBoxLayer,
             buildingLayer,
             bldLabelLayer,
             floorLayer,
             spaceLabelLayer,
             markerLayer],
    view: view
});
```

FIG. 21

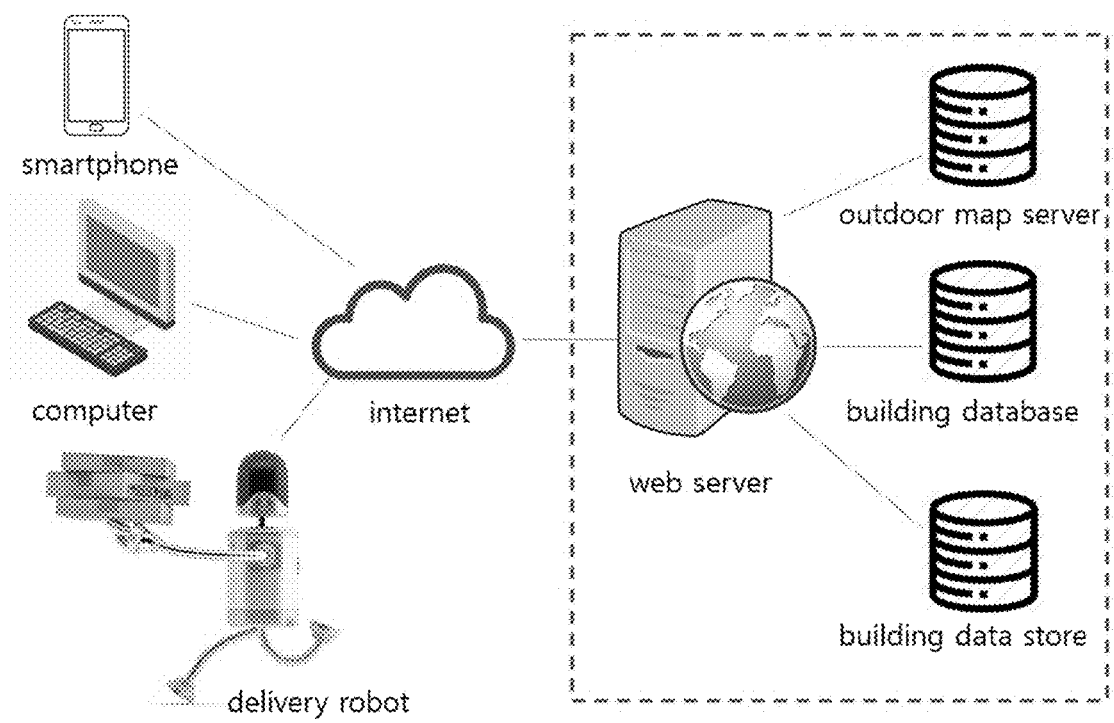

FIG. 22

```
1  {
2      "type": "FeatureCollection",
3      "name": "Daejeon Jungang-ro Underground Shopping Mall",
4      "crs": {
5          "type": "name",
6          "properties": { "name": "urn:ogc:def:crs:OGC:1.3:CRS84" }
7      },
8      "features": [
9          {
10             "type": "Feature",
11             "properties": {
12                 "bldID": 1,
13                 "bldName": "Daejeon Jungang-ro Underground Shopping Mall"
14             },
15             "geometry": {
16                 "type": "MultiPolygon",
17                 "coordinates": [ [ [ [ 127.428626254, 36.32986724 ], [ 127.
18             }
19         }
20     ]
21 }
```

FIG. 37

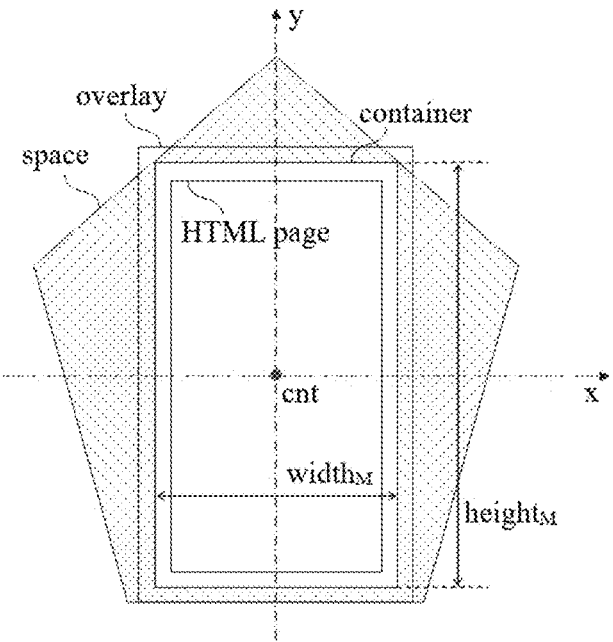

FIG. 38

```
1   function addHTMLOverlay(){
2       // spaceID
3       let spaceID = 1;
4       // coordinate of the space center as an array in map units
5       let cnt = [14185901.18, 4345964.43];
6       // width of the container in map units
7       let widthM = 7.0; // 7.0 meters
8       // height of the container in map units
9       let heightM = 11.0; // 11.0 meters
10      // resolution of the view
11      let resolution = map.getView().getResolution();
12      // width of the iframe element in pixels
13      let width = widthM / resolution;
14      // height of the iframe element in pixels
15      let height = heightM / resolution;
16      // iframe element
17      let container = document.createElement("iframe");
18      container.setAttribute("width", width);
19      container.setAttribute("height", height);
20      container.setAttribute("src", "popup/index.html");
21      // append iframe on the document
22      document.body.appendChild(container);
23      // create overlay
24      let overlay = new ol.Overlay({
25          id: spaceID,
26          element: container,
27          position: cnt,
28          positioning: "center-center"
29      });
30      // add overlay at the map
31      map.addOverlay(overlay);
32  }
```

FIG. 43

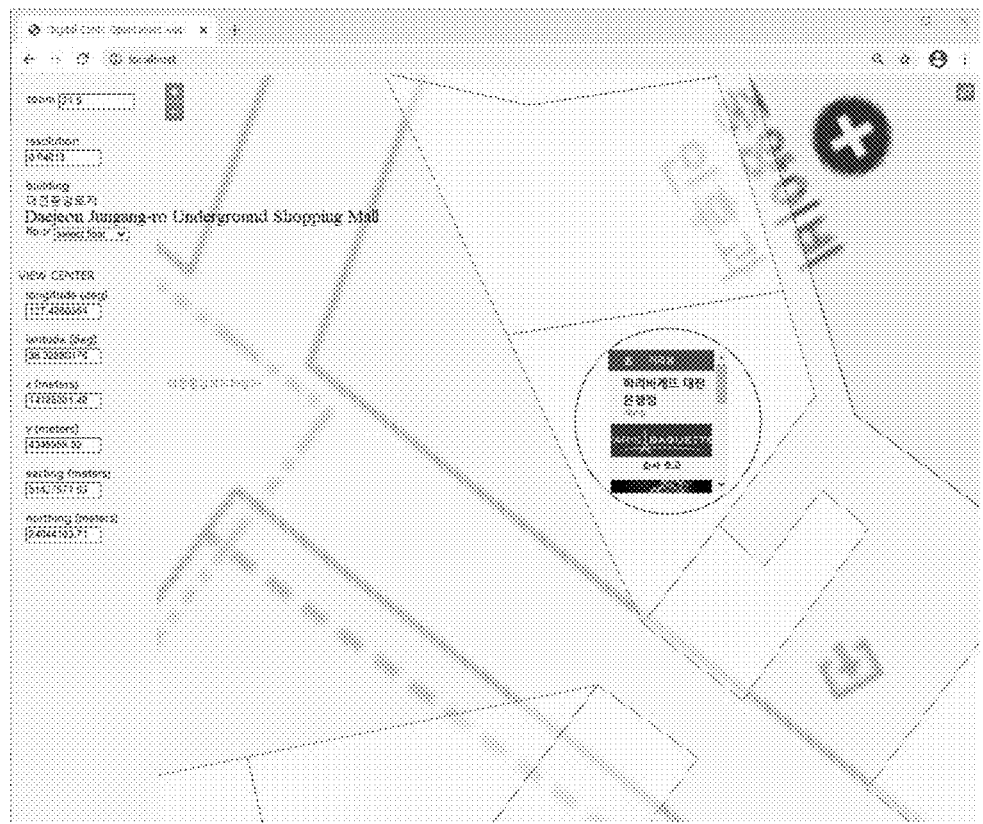

FIG. 44

```
1   function addLinkOverlay(){
2       // spaceID
3       let spaceID = 1;
4       // coordinate of the space center as an array in map units
5       let cnt = [14185802.28, 4345964.43];
6       // Create a new anchor element
7       let anchor = document.createElement('a');
8       // business name
9       let spaceName = "S360VR CO., LTD.";
10      let linkText = document.createTextNode(spaceName);
11      anchor.appendChild(linkText);
12      let spaceURL = "http://www.S360VR.com";
13      anchor.href = spaceURL;
14      anchor.target = "_blank";
15      document.body.appendChild(anchor);
16      txtOverlay = new ol.Overlay({
17          id: spaceID,
18          element: anchor,
19          position: cnt,
20          positioning: 'center-center'
21      });
22      map.addOverlay(txtOverlay);
23  }
```

FIG. 45

DIGITAL MAP BASED ONLINE PLATFORM

CROSS-REFERENCE TO RELATED APPLICATION

This patent application is a US Bypass Continuation application of International Application No. PCT/KR2021/002186, filed on Feb. 22, 2021, which claims the benefit of earlier filing date and right of priority to Korean Patent Application No. 10-2020-0020778, filed on Feb. 20, 2020, Korean Patent Application No. 10-2020-0038796, filed on Mar. 31, 2020, Korean Patent Application No. 10-2020-0145593, filed on Nov. 3, 2020, and Korean Patent Application No. 10-2021-0022985, filed on Feb. 20, 2021, the contents of which are all incorporated by references herein in their entireties.

BACKGROUND

Technical Field

The present invention provides a digital map based online platform wherein an outdoor map, an indoor map, Internet links, and responsive HTML pages are integrated.

Related Art

According to an OECD report 'An introduction to online platforms and their role in the digital transformation', the term 'online platform' has been used to describe a range of services available on the Internet including marketplaces, search engines, social media, creative content outlets, app stores, communications services, payment systems, services comprising the so-called 'collaborative' or 'gig' economy, and much more [non-patent document 1].

According to this report, 'online' refers to the state of being connected to the Internet. As such, online aspect is fairly straightforward, but the definition for platform is not immediately obvious. Ansip, a Vice President of the European Commission, has said "we do not even have a single definition of platforms accepted by everyone. We have hundreds of good definitions . . . [so] when different people are talking about platforms, they have a totally different understanding".

In the same report, an online platform is defined as a digital service that facilitates interactions between two or more distinct but interdependent sets of users (whether firms or individuals) who interact through the service via the Internet.

The European Commission (EC) formally defines an 'online platform' similarly. According to EC, an online platform is defined as an "undertaking operating in two (or multi)-sided markets, which uses the Internet to enable interactions between two or more distinct but interdependent groups of users so as to generate value for at least one of the groups".

According to the OECD report, traditional print newspaper is a platform, but not an online one. In newspaper, there are a group of advertisers who pay to place advertisements, and there are a group of readers distinct from the advertisers, and some of the readers buy goods or services after seeing the advertisements. However, since the purchase of goods or services takes place outside the platform (newspaper), print newspaper is said to be a one-way platform wherein information flows in one direction (i.e. from advertisers to readers). Also, a traditional stock market, where there are a group of sellers who want to sell stocks and a group of buyers who want to buy stocks, is said to be a two-way platform in which information (sell offer and buy offer) flows in both directions.

Meanwhile, video-sharing service is exemplified as a representative online platform. On a platform like YouTube, there are a group of people who upload videos, that is, creators, there are viewers or subscribers who watch the videos, and there are a group of advertisers who want to pay to place advertisements on popular videos.

A cloud service, on the other hand, is said to be an 'online' service, but not a 'platform'. That's because there are only one class of customers who are willing to pay to store data on servers connected to the Internet.

Online platforms share important features, such as Information and Communication Technologies (ICT) to facilitate user interactions, and collection and utilization of data produced in the user interactions, and network effects. The network effects refer to the effect that the value increases exponentially rather than arithmetically as the number of users participating in the online platform increases.

This report mentions 'Airbnb', 'Alibaba', 'Amazon', 'Apple', 'Baidu', 'BlaBlaCar', 'Facebook', 'Freelancer', 'Google', 'MercadoLibre', 'Rakuten', and 'Tencent' as leading online platforms. In the Republic of Korea, 'Auction', 'G-market', 'Coupang', 'Baemin', 'Jikbang', 'Dabang', 'How about here' and 'Yanolja' can be considered as leading online platforms.

The present invention relates to an online platform technology using a Location Based Service (LBS) technology. Location-based services are, of course, closely related to maps. The location-based service market is growing day by day. For example, if we are using services such as Naver Map, Kakao Map, or Google Map, they show nearby cafes, gas stations, and restaurants based on the current location of a device such as our smartphone. Also, if we specify our interests, such as gas stations or restaurants, search results for that category are displayed on the map.

Google maps was originally a desktop program written in C++ from Where 2 Technologies, founded by Lars Rasmussen and Jens Rasmussen brothers. After the company was acquired by Google, it was transformed into a web application and first released in February 2005 [non-patent document 2].

Google encourages business owners to register their business information including address, phone number, business category and photo through 'Google My Business' (https://www.google.com/business/), and based on this information, a business website is created for free. For example, the homepage address of the applicant produced through this service is https://360-manufacturer.business.site, and FIG. 1 shows the landing page of this homepage. Since the registered information can be searched by search engines, business owners can use it as a marketing tool to promote their business.

In March 2011, an indoor map service was added to Google Maps. When a user uploads floor plans of publicly used facilities such as airports, museums, shopping malls, universities, transit stations or underground shopping malls on the site, an indoor map is created based on this, which is integrated with the outdoor map. If the building consists of several floors, a level selector is shown.

FIG. 2 is an image posted on the homepage (https://www.google.com/maps/about/partners/indoormaps/) that introduces the indoor map function in Google Maps. This representative image illustrates that in New York's Madison Square Garden, a different floor of this indoor arena can be selected using a smartphone.

FIG. 3 is a screen where the user actually moved to Madison Square Garden on Google Maps. A floor plan of the first floor of this indoor arena is seen in FIG. 3. In FIG. 4, when this floor plan is clicked, Madison Square Garden is shown as a popup window on the left side of the screen, and a floor selection menu for each floor of this indoor stadium is shown on the lower right corner of the screen.

In FIG. 5, if −2 floor is selected, the floor plan of the first floor of Madison Square Garden is replaced by the floor plan of the second basement floor. Also, each room is displayed in a discernable way, and toilets, stairs, and elevators are marked as small icons. In addition, brand names and small markers of the shops located on the second basement floor are also shown. In FIG. 5, the drawing in which icons of toilets/elevators and shop information are shown on the floor plan may be considered as an indoor map. That is, the floor plan is the essence of an indoor map, and various additional information is added to the floor plan.

In FIG. 6, when we hover over the trade name Krispy Kreme with a mouse, information of the store is displayed as a small overlay. From this, we can see that this store is a donut shop and shop closes at 9 pm.

In FIG. 7, when this brand name is clicked, a mini homepage of this store is displayed in a popup window on the left side of the screen, and the official homepage address of this store (krispykreme.com) is also displayed at the bottom. In FIG. 8, when this homepage address is clicked, the homepage of this store appears.

Using such an indoor map, we can find out what facilities or shops are on each floor of Madison Square Garden, and if necessary, we can find out the menu, business hours, phone number, or user reviews of any shop through the mini homepage and the official website.

FIG. 9 is an indoor map of the University of Twente introduced as a representative example in MazeMap (https://www.mazemap.com/). Similar to the Google's indoor map, we can find a menu for selecting a floor in the lower left corner. If we click the Starbucks in the center of the screen in FIG. 10, a pop-up window appears at the bottom of the screen to display simple information.

MazeMap's slogan is "Indoor Maps & Wayfinding Platform". Basically, the main services are to provide indoor maps of large buildings such as universities, and routes for wayfinding. MapWize (https://www.mapwize.io) also provides an indoor map and wayfinding service similar to MazeMap.

IndoorAtlas (https://www.indooratlas.com) also provides a wayfinding service using an indoor map. How IndoorAtlas integrates indoor maps into an outdoor map is well illustrated in a YouTube content (https://youtu.be/11ohBHC_001). However, in order to find a route, it is not sufficient to have an indoor map. Rather, we need to know our location on the indoor map. IndoorAtlas is said to estimate an accurate location by integrating Wi-Fi sensor, Bluetooth sensor, barometric pressure sensor, and geomagnetic field sensor built-in in a smart phone, and using inertial navigation technology.

MapsIndoors (https://www.mapspeople.com/mapsindoors) also provides a service similar to that of IndoorAtlas, and uses Google Maps as an outdoor map. In large shopping malls, new stores open and close down incessantly, and stores are changed frequently. It is said that using MapsIndoors, it is possible to maintain and manage the contents of an indoor map, such as store names, without any programming.

MapsAlive (http://www.mapsalive.com) provides an interactive map. For example, one or more arrows can be added as markers to a floor plan of a house made with this technology. When a user hovers over a marker using a mouse, a picture in the direction of the arrow appears. Therefore, we can see a scenery in that direction, for example, a scenery of a garden or an appearance of a kitchen. Such maps can be used for renting or selling real estate.

In addition, the same technology can be used not only for floor plans, but also for general world maps, local maps, pictorial maps, product user manuals, photos, etc. And, instead of a picture, a text, an Internet homepage, or a video can be connected to a marker. From this point of view, MapsAlive can be thought of as having extended the functions implemented in Google's indoor maps to non-geographic maps.

However, unlike Google Maps, MapsAlive is a private map produced for a fee. For example, the address (URL) of a beehive trail in Acadia National Park, Maine, USA is http://tour.mapsalive.com/20133. Customers can use the generated URL for information or promotion by attaching a link to their homepage. In other words, each map has a different address, so we must know the address in advance to use the map.

WRLD (https://www.wrld3d.com) allow us to create 3D outdoor and indoor maps. Therefore, we can have a realistic experience as if we are looking at a bird's-eye view or a doll's house.

LAN cable tours are popular these days. LAN cable tours refer to looking around online using the Internet without actually visiting the places. Platforms such as Google Maps or YouTube can be used for LAN cable tours.

The destination of a LAN cable tour can be a famous tourist attraction, a traditional market with a long history, or a famous building such as Macy's. For example, the Jemaa el Fna square in the Medina of Marrakesh, Morocco or the Covent Garden in London are world-class landmarks that can become travel destinations in their own right. However, even if the destination is implemented as an indoor map on Google Maps, another difficulty exists.

If we went downtown on a leisurely weekend, we can walk around and enter an arbitrary shop that pleases us without having anything special to buy. However, in indoor maps such as Google Indoor Maps, only names and room numbers or lot numbers of individual stores are displayed on the floor plan. In order to find out what exactly are the items or services a store provide, we have to click text link or marker to open a popup window.

Daejeon Jungang-ro Underground Shopping Mall is under the Daejeon Jungang-ro (Daejeon Jungang boulevard), and the total number of stores is about 490. Therefore, if we want to look around with a computer or a smartphone instead of visiting the Daejeon Jungang-ro Underground Shopping Mall in person, 490 clicks are required. It is like having to open all the drawers of a large chest of drawers to find a desired item. If we don't have a lot of patience or determination, we will have a hard time clicking 490 times.

Publicly used facilities (multi-use facilities) refer to buildings of a certain size or larger used by an unspecified number of people. 'Urimalsaem (our language fountain)' explains 'multi-use facilities' which is stipulated by 'indoor air quality management law of multi-use facilities', as facilities used by many people such as underground stations, underground shopping malls, waiting rooms for passenger car terminals, passenger terminals at airports, passenger terminals at ports, as well as libraries, museums, art galleries, medical institutions, indoor parking lots, and waiting rooms for railway stations used by an unspecified number of people, and apartments and townhouses larger than a size prescribed by the Presidential Decree.

As buildings, including multi-use facilities, become larger and more complex, the importance of indoor map is increasing. However, we cannot obtain sufficient information about a store if only the location and the name of the store is displayed on an indoor map or a kiosk for visitor information. For example, if we have decided to have a light lunch at the Coex mall, names of the restaurants in the COEX mall are not enough for information. Rather, we will want to know what menus they offer and what are the prices. In the age of information and communication technology, the most basic way to obtain such information is to visit a website or a blog of the restaurant.

Since homepages are important for publicity, we can find Internet links in which mini homepages of commercial facilities appear as popup windows on Google or Naver maps. In addition, pop-up windows include Internet links to the official websites. However, for example, even if we can see the menu of a specific restaurant in COEX Mall through the pop-up window of that specific restaurant, if we cannot check the pop-up windows of all the restaurants in COEX Mall, we wouldn't know whether we have made a most satisfactory choice or not.

For this reason, these days, it can be said that a website for publicity and information is essential whether it is a corporation or a commercial facility such as a cafe or a restaurant. Recently, most of the websites are created using HTML5, CSS3, and JavaScript. HTML is an abbreviation of Hyper Text Markup Language, and it is one kind of language used to create web documents that can be viewed through the World Wide Web. CSS stands for Cascading Style Sheets, and is a separate language for setting layouts of HTML documents and designing them. Also, JavaScript is a programming language which web browsers can recognize.

We can create a homepage using only HTML and not using CSS, but that homepage would look unspeakably shabby. Also, the use of JavaScript is essential if we want to create a dynamic web site. Using JavaScript, we can make many applications running on a web browser which were used to be installed and used on our PC, such as word processor like MS Word and games.

Therefore, the source code of an online website will be basically one or more digital files written in HTML5, CSS3, and JavaScript languages. And if there are product photos, descriptions, background music, shopping malls, Q&A bulletin boards, etc., data such as photos, videos, sound sources, texts, and source codes written in separate languages such as PUP, SQL for running bulletin boards or shopping malls would be part of the digital files related to the online web site.

In the past, there were many cases where users were forced to install ActiveX when accessing a new website. ActiveX is an external installation program that is installed on the user's PC and run with the we b browser, in other words, it is a plug-in. In particular, when viewing multimedia contents or trying to use a certificate for Internet banking, installing ActiveX was unavoidable.

ActiveX has many advantages, but it is basically a plug-in exclusively for Microsoft's Internet Explorer, and has a disadvantage in that it increases the risk of virus contamination, spam, and hacking. However, if we create a website using only HTML5, CSS3 and JavaScript, we can access it using the latest web browser without any plug-in, and we can access it from smartphones using built-in web browsers as well as from PCs.

In the past, it was a common knowledge to use a PC to visit a website, but nowadays it is more common to use a smartphone. In addition, it is also possible to use a tablet PC instead of a PC or a smartphone. When devices for accessing a homepage are PCs, the screen sizes with which the homepages are displayed on different PCs are not significantly different. This is because the differences in resolutions between different PCs are not large. However, since the screen size differences between a PC, a tablet PC, and a smartphone is very large, if the same layout used on a PC is used on a smartphone, the contents will not be recognizable.

Responsive web refers to a web page in which the layout is changed or the width of the content is changed according to the screen size of the device accessing the web. In fact, in the HTML field, responsive web has a slightly different meaning in a strict sense. But in the present invention, an HTML page whose width or layout is changed according to the size of the screen will be referred to as a responsive HTML page. In a responsive homepage that uses different layouts according to the screen sizes, the HTML5 part corresponding to the content of the document itself is the same, but there are several CSS files to match the screen sizes of the accessing devices. This does not necessarily mean that there are multiple CSS files, but it means that different CSS codes are applied according to the resolution of the accessing devices.

Even if multiple layouts are not used to fit the screen sizes and only one layout is used, when the width of the HTML page changes according to the screen size, the size of the HTML element in the CSS file has been defined as a percentage (%). Therefore, even if the screen size changes, the size of the HTML element calculated as a percentage is applied and used accordingly.

These days, instead of using responsive HTML pages, there are cases where separate homepages are accessed according to the sizes of the resolution. For example, we can see that the homepage addresses are different when we access Naver from a PC and when we access it from a smartphone. However, a responsive HTML page has the advantage that it can always show a natural-looking homepage even if the width of the web browser window changes continuously.

Meanwhile, there exist many prior arts about methods for creating indoor maps, methods for specifying geographic locations, or methods for providing location-based contents.

In [patent 1], a commercial information providing system has been disclosed in that banner advertisements or icons of local information and commerce companies are displayed at the actual location on the electronic map based on the lot numbers of the places of businesses, and service users can search using various search methods such as type of business, region, street address, or company name. When a user clicks on a banner advertisement or icon, user is directed to the website of the relevant company.

In [patent 2], a method of providing information using an Internet electronic map is disclosed. For this, a server is built that integrates and operates map information and company information. Individuals and companies corresponding to each lot number are provided with bulletin boards, e-mails, and various records so that information sharing between individuals are easy and companies are able to publish their advertisements widely.

[Patent 3] discloses a method and an apparatus for configuring digital information so as to limit the geographic area for accessing that digital information.

[Patent 4] discloses a technique for dividing the Earth's surface into pieces of 1° latitude and 1° longitude, and then setting a local surface coordinate system for each piece.

[Patent 5] discloses a system for providing location information and making it easy to create a homepage by registering subdomains on the Internet.

[Patent 6] discloses systems and methods for ultra-precise three-dimensional real-time positioning and tracking of objects such as trucks, firefighters, fire trucks, and airplanes by generating movement related coordinates. In particular, this invention calculates latitude, longitude and altitude from GPS data, and then derives level information within a building based on a 3D site model of the structure. Then, the location of the target object is displayed as an icon on the 3D model of the structure. To this end, each target object is equipped with a GPS receiver as well as a wireless transmitter capable of sending its location to a monitoring system. This makes management easier for trucking companies by allowing the location of delivery trucks to be displayed as icons in real-time on a precise 3D model. In addition, it has a function of displaying the exact locations of firefighters on the computer of the monitoring system even when firefighters are moving up and down several floors in a building in order to extinguish fire. However, since it is difficult to receive GPS signals indoors, it is expected that there will be difficulties in practical application.

[Patent 7] discloses a homepage providing system based on an electronic map. Specifically, the homepage server receives user information including location information from a user terminal, and generates a homepage corresponding to the user information, and then places a user landmark on the electronic map corresponding to the location of the terminal and connects the user landmark to the said homepage address.

When a mouse is hovered over the said user landmark, the user information and the homepage address are additionally displayed, and when the user landmark is selected (mouse click), the user information and the homepage address are displayed on a popup window external to the electronic map.

In the one stop wayfinding information system disclosed in [patent 8], people's information and actual map are efficiently linked in the wayfinding kiosk. Therefore, route to the destination location, people's information, building exterior video and etc. are displayed for quick and precise one-stop navigation.

[Patent 9] discloses a conversion method for converting location information on the Earth and on a map into a decimal system, as well as a method of displaying location information on the Earth and on a map using the method.

We can find three major problems with this method. First of all, all places on the Earth have coordinates in double. Secondly, this number does not have a simple relationship with a distance on the Earth and therefore does not provide any special meaning to people. Thirdly, since latitude and longitude are simply renormalized into large numbers, the resolution varies depending on the location on the Earth. In other words, even if the latitude corresponding coordinate is expressed to a third decimal place, the degree to which the numerical value specifies the position on the Earth varies depending on the latitude.

In the technology disclosed in [patent 10], first, the user configures the inquiry target terminal on the server. When a user requests a user-set content service thereafter, the server acquires the location information of the region where the inquiry target terminal is located through LBS, and based on the obtained location information, provides image information captured by local base station cameras to the user terminal.

[Patent 11] discloses a method of providing users with the structures of indoor spaces of buildings registered by map providers in the form of a map, and allowing the user to add or use the indoor map through an open API.

Technology for generating indoor map is disclosed in [patent 12]. Floor plan images of buildings are image processed and discerned between navigable areas and non-movable areas (e.g. wall), and movable areas and non-movable areas are decorated with different colors.

A location-based content providing technology is disclosed in [patent 13]. In specific areas including filming locations for movies and dramas, and tourist destinations, photographic images are taken while encircling the shooting target 360° all around and at a certain distance. Photo images thus obtained at regular angular intervals are stored in a database. Using the GPS and other sensors installed in the user's terminal, the location and the orientation of the user's terminal can be obtained, and allows a user to check image information from the user's current location and from the viewpoint of the user.

The indoor map authoring method disclosed in [patent 14] comprises stages of analyzing the properties of nodes existing on the indoor map for each floor of a building, detecting one or more inter-story nodes based on the analyzed properties of the nodes, and connecting the detected inter-story nodes to create a new link.

[Patent 15] discloses a system for providing user location information using a map divided into a plurality of grids, where index is assigned on each grid.

[Patent 16] discloses a technology for converting conventional GPS coordinates into AIM coordinates so that the coordinates can have a minimum length. However, this technology not only uses a complex algorithm at the level of a cryptographic generator, but also it seems that a large part of the effectiveness of the invention is due to the use of the system based on 36 digits instead of the decimal system.

In [patent 17], a new coordinate system is disclosed to overcome the shortcomings of Web Mercator coordinates.

Patent Document

[Patent 1] Minkyung Kim, "System for providing a commercial information with a geographical information of a local area on the Internet", Korean patent publication no. 10-2000-0072562, date of publication Dec. 5, 2000.

[Patent 2] Seungho Kim, "An information providing method by Internet electronic map", Korean patent publication no. 10-2002-0022487, date of publication Mar. 27, 2002.

[Patent 3] Barry J. Glick, Ronald S. Karpf, Mark E. Seiler, "System and method for using location identity to control access to digital information", patent no. U.S. Pat. No. 6,985,588, date of registration Jan. 10, 2006.

[Patent 4] Ralph M. Toms, "System and method of simulating with respect to spheroid reference models using local surface coordinates", patent no. U.S. Pat. No. 7,428,476, date of registration Sep. 23, 2008.

[Patent 5] Taesub Seo, "Method and system for providing geographical information using subdomain in internet map", patent no. KR 10-0500504, date of registration Jul. 1, 2005.

[Patent 6] Michael R. Zeitfuss, Joseph M. Nemethy, Joseph A. Venezia, "System and method for highly accurate real time tracking and location in three dimensions", international publication no. WO 2004/034076, date of publication Apr. 22, 2004.

[Patent 7] Suho Bae, Kwangho Yoo, "System and method for providing homepage and displaying detailed information based electronic map, and recording medium thereof", patent no. KR 10-0819167, date of registration March 27.

[Patent 8] Samkeun Kim, Jeongmin Seo, "Onestop road guidance information system", registered utility model KR 20-0430083, date of registration Oct. 26, 2006.

[Patent 9] Shigeru Owada, "Method of displaying location information on the Earth and on a map, and maps and coordinates using it", publication no. JP 2010-61092, date of publication Mar. 18, 2010.

[Patent 10] Seunghoon Moon, "Method and system for providing video information about locating area of searching terminal", patent no. KR 10-1358690, date of registration Jan. 28, 2014.

[Patent 11] Dongwhan Kim, Yeonhee Kwon, Jeonga Choi, Hyungchan Kim, "Indoor map database, apparatus and method for providing map service, apparatus and method for providing indoor map service using open API, and apparatus and method for producing indoor map", patent no. KR 10-1312294, date of registration Sep. 23, 2013.

[Patent 12] Guanfeng Li, Faen Zhang and Feng Wang, "Generating an indoor map model", international publication no. WO 2013/104127, date of publication Jul. 18, 2013.

[Patent 18] Kyuhyun Kim, "Method of providing location-based contents and apparatus thereof", patent no. KR 10-1546676, date of registration Oct. 18, 2015.

[Patent 14] Daehyeon Lim, Jinkwon Lee, "Method for building an indoor map and apparatus thereof", patent no. KR 10-1985699, date of registration May 29, 2019.

[Patent 15] Hyungyu No, Younghyun Joo, Kiseok Park, Jeonghee Kim, "Method and system for providing user location information using gridding map", patent no. KR 10-2029450, date of registration Sep. 30, 2019.

[Patent 16] Hamin Lee, "The method of changing GPS coordinates to AIM coordinates", patent no. KR 10-2001785, date of registration Jul. 12, 2019.

[Patent 17] Gyeongil Kweon, "Methods of specifying geographical locations, and database and database of databases using the same", Korean patent application no. 10-2020-0113509, date of application Sep. 6, 2020.

Non-Patent Document

[Non-patent document 1] OECD(2019), 'What is an "online platform"?', in An Introduction to Online Platforms and Their Role in the Digital Transformation, OECD Publishing, Paris.

[Non-patent document 2] Wikipedia, "Google maps".

[Non-patent document 3] Wikipedia, "Universal Transverse Mercator coordinate system".

[Non-patent document 4] National Geospatial-intelligence Agency (NGA), "Web Mercator map projection", NGA_SIG_0011_1.0.0_WEBMERC (2014).

[Non-patent document 5] Wikipedia, Web Mercator projection.

[Non-patent document 6] Wikipedia, Sinusoidal projection.

SUMMARY OF THE INVENTION

Technical Subject

It is intended to provide a new type of online platform by integrating all websites with location attributes on a digital map.

Solution

A digital map system comprising an outdoor map server, a data store, a building database, a space database and a computer program stored in a medium are used. The medium includes a web server/service server and user terminals including computers and smart phones. The data store manages digital files related to buildings including floor plans of buildings and digital files including online website source codes related to spaces on individual folders for each building or space. The building database and the space database manage map setting data of buildings and spaces, respectively. The computer program stored in the medium integrally displays an outdoor map and an indoor map including floor plans of buildings on the view of the digital map. When the zoom of the map is greater than a preset value, floor plans of the ground floor of buildings are displayed on the map conforming to the outlines of the buildings. When a building with basement levels or a multi-story building is located at the center of the view, a menu for selecting a floor appears automatically. A building has location attribute including a geodetic latitude, a longitude and optionally a number of floors, and has one or more spaces with a boundary and a finite areas. If the spaces visible on the view are enlarged beyond a preset value, Internet links and responsive HTML pages are selectively displayed within the boundaries of each space according to the zoom value.

Effects

It can be used in various fields such as web surfing or LAN cable tour, because websites with objective or subjectively recognized location attributes can be displayed integrally on a digital map. In addition, since the subdomain of each website is automatically created according to the location attribute, there is no need to worry about devising a subdomain that does not overlap with others. It also becomes very easy to conjecture a subdomain from a location attribute, or a geographic location from a subdomain. It is also easy to maintain and manage a data store that stores digital files related to subdomains.

BRIEF DESCRIPTION OF THE DRAWINGS

FIG. 20 is a drawing illustrating the configuration of layers in the fourth embodiment of the present invention.

FIG. 21 is a conceptual drawing showing the configuration of a digital map system in the fourth embodiment of the present invention.

FIG. 22 is an example of a building database in the fourth embodiment of the present invention.

FIG. 37 is a conceptual diagram for understanding a method of displaying a responsive HTML page within a space in a digital map.

FIG. 38 is an exemplary embodiment of JavaScript code that creates an HTML page overlay.

FIG. 43 is another example of running a digital map.

FIG. 44 is an exemplary embodiment of JavaScript code that creates a link overlay.

FIG. 45 is an example of a space database in the seventh embodiment of the present invention.

DETAILED DESCRIPTION

Figure 1:
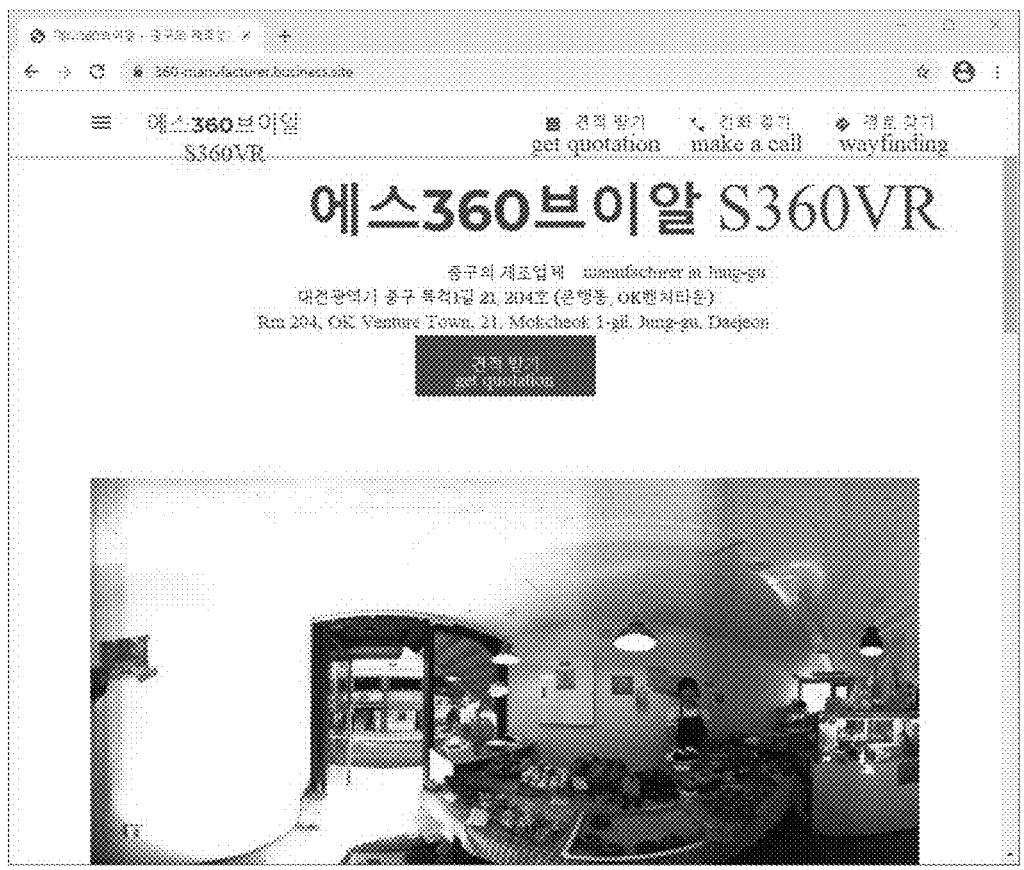
FIG. 1 is a main screen of the applicant's free homepage produced through 'Google My Business'.
Figure 2:
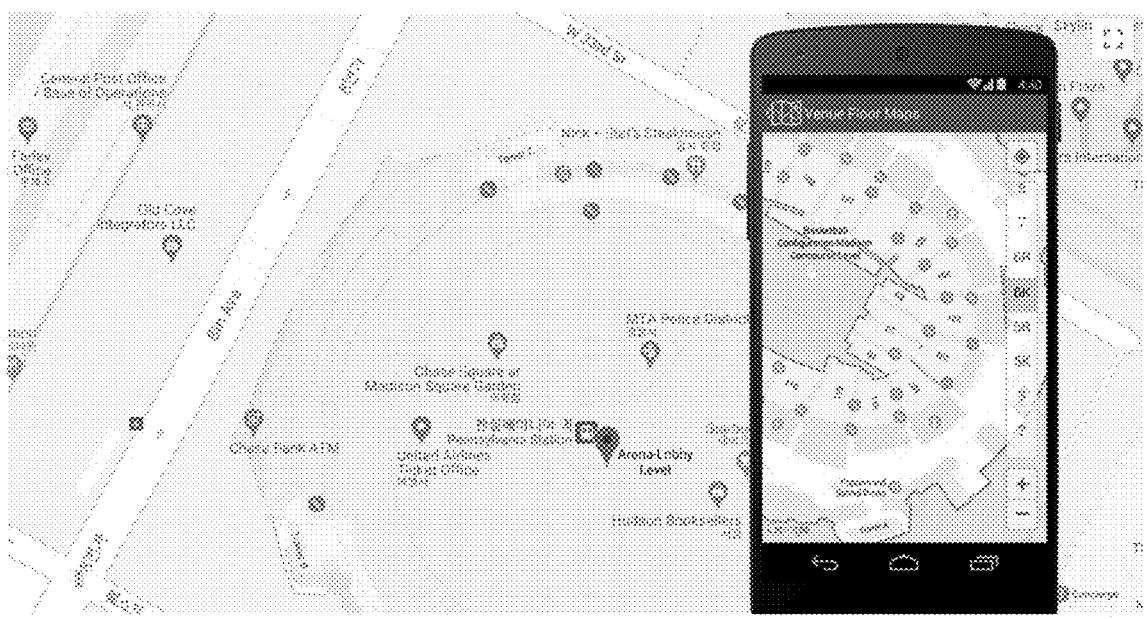
FIG. 2 to FIG. 8 are screens illustrating an indoor map function of Google.
Figure 3:
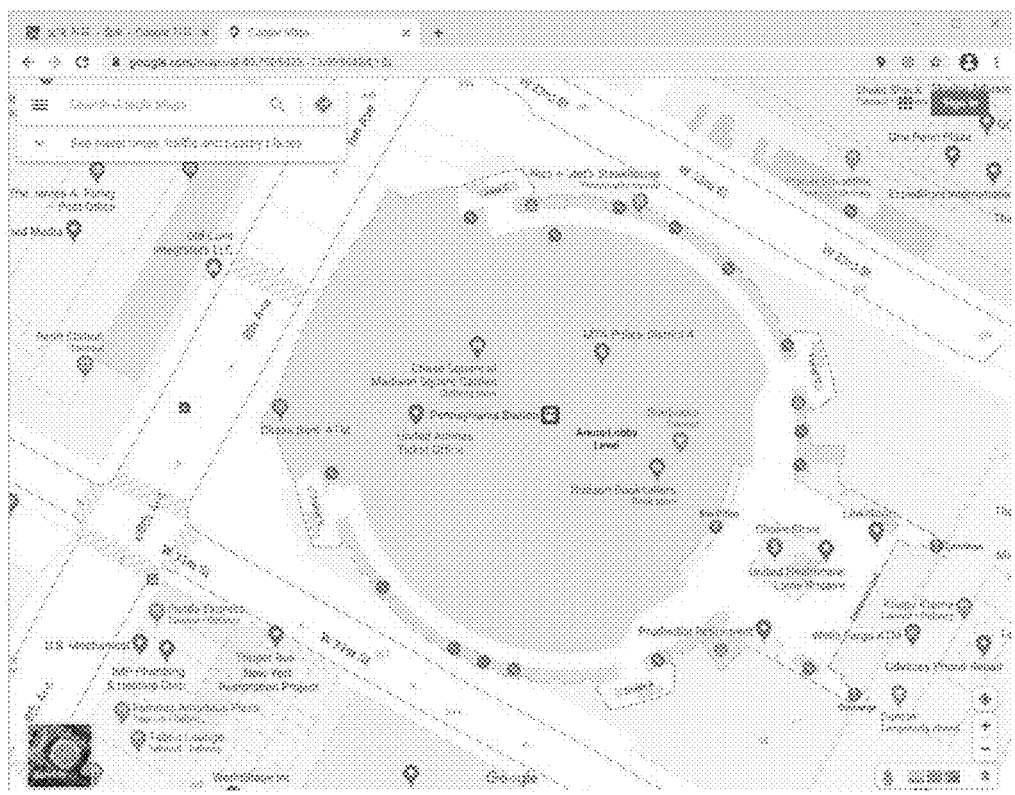
Figure 4:
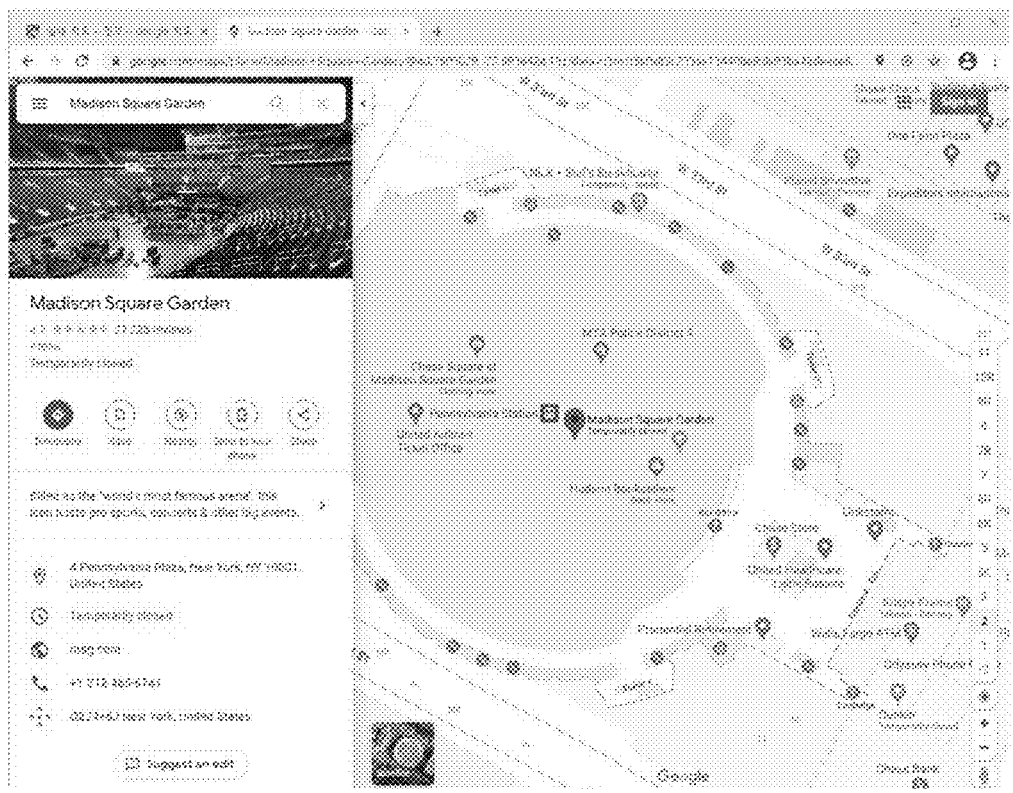
Figure 5:
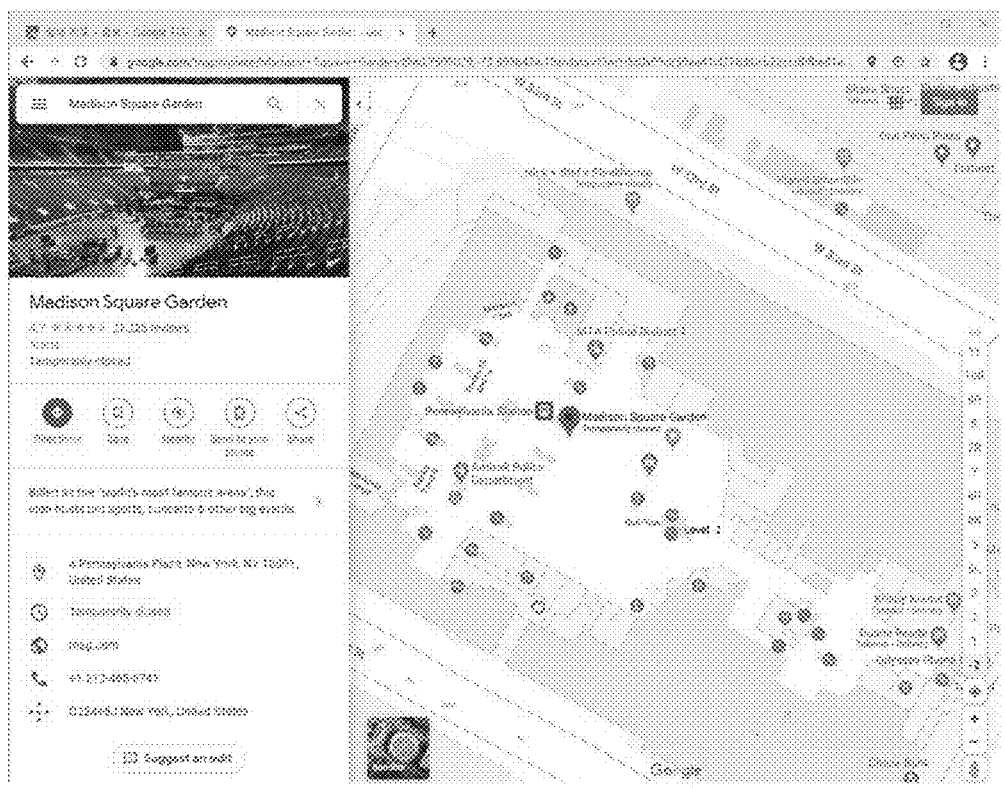
Figure 6:
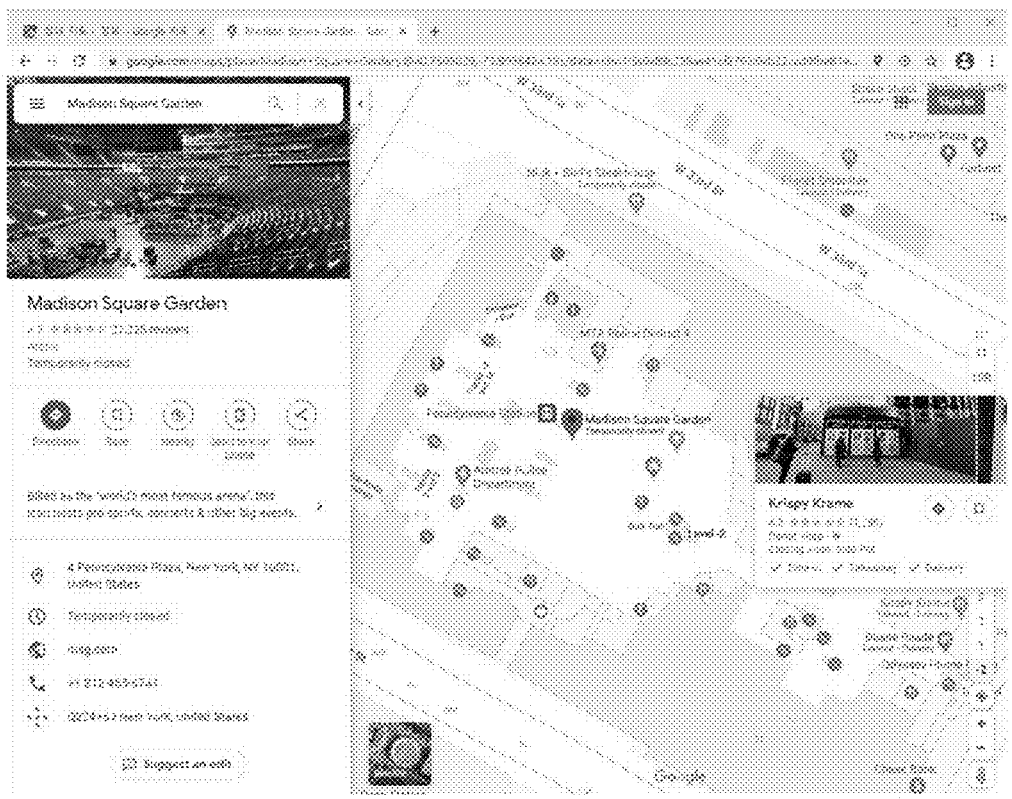
Figure 7:
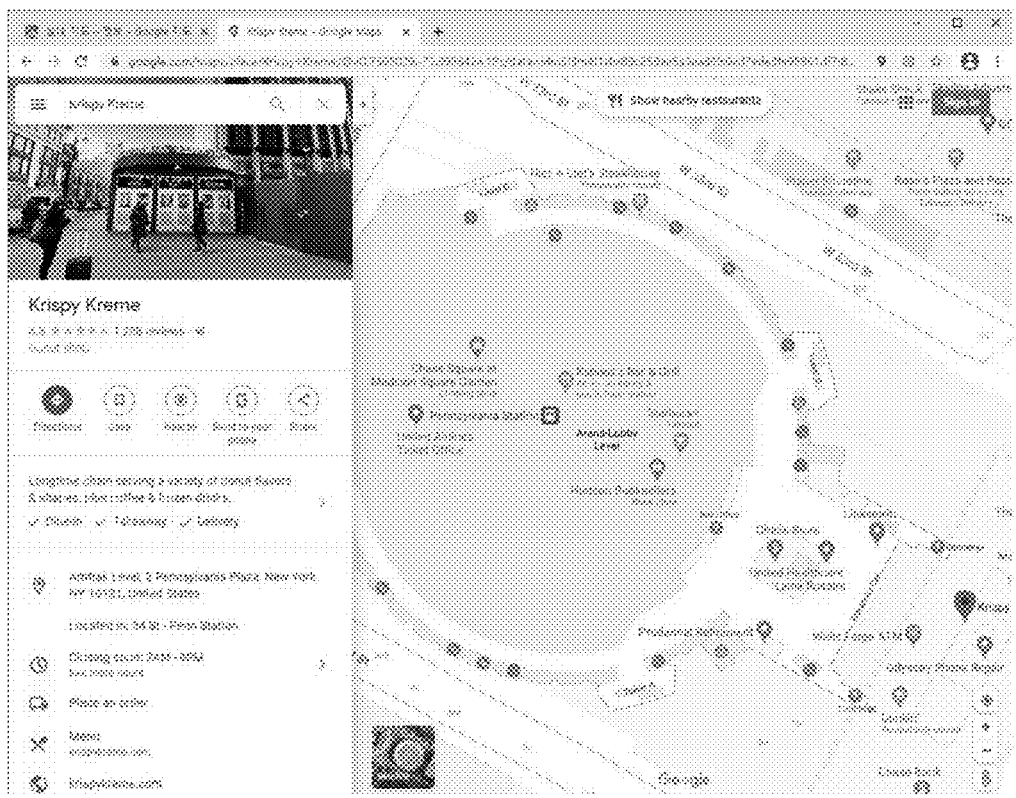
Figure 8:
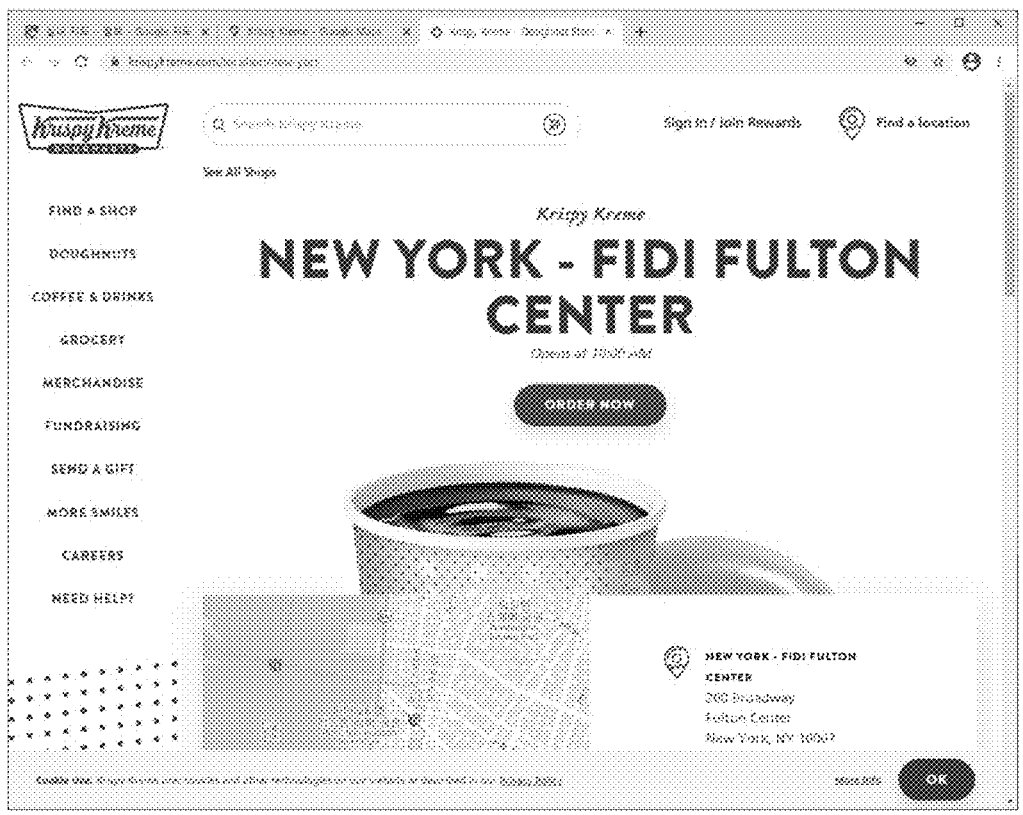
Figure 9:
FIG. 9 and FIG. 10 are screens illustrating an indoor map function of MazeMap.
Figure 10:
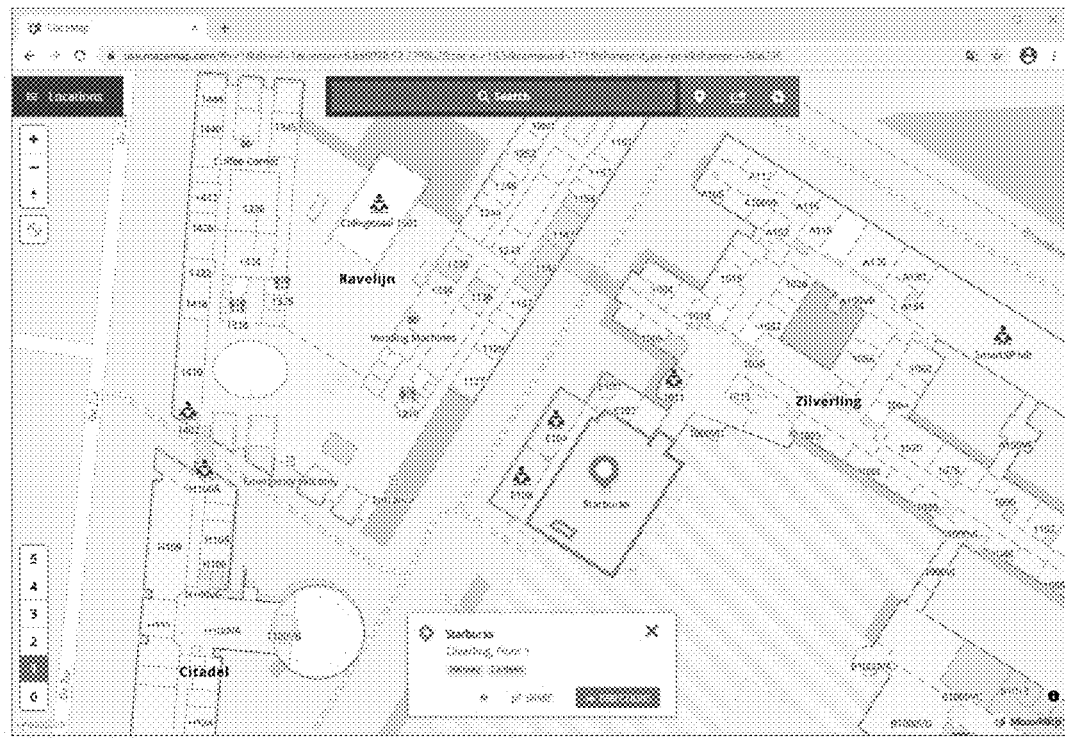

Hereinafter, embodiments of the present invention will be described in detail with reference to FIG. 11 to FIG. 53.

First Embodiment

The most common way to specify a location on the Earth is by using an address, but there are places that do not have an address at all, such as deep in a mountain, in a desert, or in the middle of an ocean. Therefore, a hiker who is lost in the backwoods cannot give an address when calling authorities for rescue.

The best way to specify an arbitrary location on the Earth is to use GPS (Global Positioning System) coordinates. In particular, since smartphones provide latitude, longitude and altitude as GPS coordinates, by using these coordinates, it is possible to accurately specify a place not having an address. By the way, although we are using it inadvertently, there are several definitions of latitude, and several definitions of altitude. So we need to know exactly what latitude and altitude we are referring. If not stated otherwise, most likely latitude means geodetic latitude defined by the World Geodetic System (WGS), and altitude means height above sea level. Also, in the present invention, if they are simply expressed as latitude and altitude, they should be understood as referring to geodetic latitude and height above sea level. In general, geodetic latitude is represented by $\phi$, longitude by $\lambda$, and height above sea level by H. An arbitrary point on the surface of the Earth can be specified using geodetic latitude and longitude, and the elevation of a summit of a mountain or the height of an aircraft can also be specified by adding height above sea level on those.

However, in various ways, it is inconvenient to specify a location on the Earth by latitude, longitude, and altitude. For example, given the latitudes and the longitudes of two locations, it is difficult to intuitively understand how far apart the two locations are. Also, when, for example, the number of digits of latitude and longitude is specified to three decimal places, it is difficult to guess what will be the distance error range these coordinates specify on the ground.

For this reason, various coordinate systems have been developed in order to specify geographical locations with coordinates having a unit of distance. For example, by using the UTM coordinate system (Universal Transverse Mercator coordinate system) developed by the U.S. Army for military use, geographic locations can be accurately specified down to a millimeter level [non-patent document 3]. However, the UTM coordinate system divides the Earth's surface into 60 vertical zones, and then specifies a location within each zone by the easting E and the northing N. Therefore, in order to specify a geographical location, the zone is specified first, and then the easting and the northing are written in that order. The reason why the easting is written before the northing is that when reading a map in the UTM coordinate system, conceptually, a longitude is first read and then a latitude is read.

However, the latitude range is only allowed from 80° South (80° S) to 84° North (84° N). That is, the North Pole or the South Pole cannot be expressed in the UTM coordinate system. In addition, the formula for converting between UTM coordinates and longitude-latitude coordinates is very complex, making it virtually impossible to calculate without a computer.

In [patent 16], examples of expressing a longitude and a latitude coordinates given by "36 degrees 28 minutes 39.5 seconds East longitude, 137 degrees 11 minutes 13.7 seconds North latitude" in several representative coordinate systems including the UTM coordinate system are presented as follows.

WGS84: 39.3531111°, 127.3415833°
MGRS: 52SCJ 5710757274
UTM: 52S 357107mE 4357274 mN
AIM coordinates: AX0 27L TXI Also, if we want to include an altitude in the AIM coordinate system, a slash (/) is added and the altitude is written down as follows.

AIM coordinates (including altitude): AX0 27L TXI/46N

However, such coordinate systems are not only complicated to use, but also they are more inconvenient to use to find directions than longitude-latitude coordinate system by ordinary people who are not map experts. In addition, these days, the importance of map is increasing not only outdoors but also indoors. In an indoor map, the floor plan for each floor of a building is the most important and basic data. Therefore, in order to use the indoor map, we must first know the floor number in the building.

The concept of a floor in a commercial building or apartment is familiar to everyone. We call a ground floor as the first floor, and basement levels are called as B1 (the first basement level) and B2 (the second basement level) and etc. If we think of the first basement level (B1) as −1 floor and the second basement level (B2) as −2 floor and directly substitute the floor numbers by integers, the index becomes discontinuous because there is no 0 floor. That is, it becomes like −3 ($3^{rd}$ basement level), −2 ($2^{nd}$ basement level), −1 ($1^{st}$ basement level), 1 ($1^{st}$ floor, ground floor), 2 ($2^{nd}$ floor above the ground), 3 ($3^{rd}$ floor above the ground), 4 ($4^{th}$ floor above the ground) and 5 ($5^{th}$ floor above the ground). Therefore, it is not natural.

It is said that in Europe, the ground floor is denoted as G, and the floor directly above the ground floor, which we call the second floor, is called the first floor. According to this notation, the floor numbers are B3 ($3^{rd}$ basement level), B2 ($2^{nd}$ basement level), B1 ($1^{st}$ basement level), G (ground floor, $1^{st}$ floor), 1($2^{nd}$ floor above ground), 2($3^{rd}$ floor above ground), 3($4^{th}$ floor above the ground), and 4($5^{th}$ floor above the ground). If minus (−) signs are attached to the basement levels, and G is considered as zero (0), it becomes −3($3^{rd}$ basement level), −2($2^{nd}$ basement level), −1($1^{st}$ basement level), 0($1^{st}$ floor, ground floor), 1($2^{nd}$ floor above the ground), 2($3^{rd}$ floor above the ground), 3($4^{th}$ floor above the ground), and 4($5^{th}$ floor above the ground).

However, since it may be inconvenient to use negative integers, by using B as the identification letter for the basement levels, G as the identification letter for the ground floor, and F as the identification letter for the floors above the ground, it seems more reasonable to use European style notation such as B3($3^{rd}$ basement level), B2($2^{nd}$ basement level), B1($1^{st}$ basement level), G (ground floor, $1^{st}$ floor), F1($2^{nd}$ floor above the ground), F2($3^{rd}$ floor above the ground), $F_3$ ($4^{th}$ floor above the ground), and $F_4$ ($5^{th}$ floor above the ground). Here, B can be considered as a minus (−) sign, G as a zero, and F as a plus (+) sign. In other words, according to this notation, effectively, we are expressing floors as −3($3^{rd}$ basement level), −2($2^{nd}$ basement level), −1 (first basement level), 0 (ground floor, $1^{st}$ floor), +1($2^{nd}$ floor above the ground), +2($3^{rd}$ floor above the ground), +3($4^{th}$ floor above the ground), and +4($5^{th}$ floor above the ground). Of course, by denoting the first floor as F1, floor numbers can be expressed as B3($3^{rd}$ basement level), B2($2^{nd}$ basement level), B1($1^{st}$ basement level), F1($1^{st}$ floor, ground floor), F2($2^{nd}$ floor above the ground), F3($3^{rd}$ floor above the ground), F4($4^{th}$ floor above the ground) and F5($5^{th}$ floor above the ground). But, I think the European style is much more reasonable.

However, in order to transmit a location on the Earth using wired or wireless network, rather than sending two values separately as a pair of latitude and longitude, or equivalently as a pair of northing and easting, it would be desirable to make it into one string and transmit only one data. However, if a space, a plus (+) sign, a minus (−) sign, or a slash (/) sign is included, it can be inconvenient during the transmission or processing stage. In the first embodiment of the present invention, the form shown in Eq. 1 is used to integrally specify a location on the Earth as one string P regardless of whether it is outdoors or indoors.

$$P = N\{N\}E\{E\}(H\{H\})(F\{F\}|G|B\{B\}) \qquad \text{[Equation 1]}$$

Here, N, E, H, F, G and B are identification letters respectively indicating northing, easting, height above sea level, floor above the ground, ground floor, and basement level. The curly brackets { } are symbols indicating to replace the curly brackets with the actual value corresponding to the identifying letter inside the curly brackets, round brackets ( ) are symbols indicating an omissible item, and vertical bar I is a symbol indicating that one on either side of the vertical bar can be selected. Mathematically, it corresponds to OR sign.

The northing N, the easting E, and the height above sea level H are real numbers that have positive (+) values with a unit of distance. A pair of northing N and easting E should be mutually convertible with a pair of geodetic latitude $\phi$ and longitude $\lambda$. Mutually convertible means than geodetic latitude can be calculated as a function of northing and easting, longitude can be calculated as a function of northing and easting, northing can be calculated as a function of geodetic latitude and longitude, and easting can be calculated as a function of geodetic latitude and longitude.

Therefore, in the present invention, the northing N and the easting E does not necessarily refer to the northing and the easting in the UTM coordinate system or in the web Mercator projection (spherical Mercator projection). Rather, it can be considered, in general, that a northing is a coordinate corresponding to the latitude and having a unit of distance, and an easting is a coordinate corresponding to the longitude and having a unit of distance. That is, the northing in Eq. 1 may be the northing in the UTM coordinate system, the northing in the Web Mercator projection, or a northing in an another coordinate system. However, in the UTM coordinate system, in order to specify an arbitrary position on the Earth, a zone must be specified first. Therefore, in order to specify a position on the Earth using the form of Eq. 1, the region must be limited to one zone. Therefore, for the northing and the easting in the present invention, it is preferable to exclude the northing and the easting in the UTM coordinate system.

Web Mercator map projection was developed by Google in 2005 and is currently used by most of the Internet map service providers, and SRID (Spatial Reference Identifier) is given as EPSG:900913 or EPSG:3857. The official name of EPSG:3857 is WGS 84/Pseudo_Mercator.

The Web Mercator projection uses geodetic latitude and longitude based on the Earth ellipsoid, still it is assumed that the Earth is a perfect sphere, and as a radius of the sphere, the long radius (semi-major axis) of the Earth ellipsoid is used which is 6,378,137 m [non-patent document 4]. The difference between the Mercator projection and the Web Mercator projection is whether the Earth's shape is assumed as an ellipsoid or it is assumed as a sphere. Although the Mercator projection is accurate, the calculation process is too complicated. So, Internet maps such as Google Maps use the Web Mercator projection which assumes that the shape of the Earth is a sphere.

The easting E and the northing N in the Web Mercator projection are given by Eq. 2 and Eq. 3.

$$E = R\lambda \qquad \text{[Equation 2]}$$

$$N = R\ln\left[\tan\left(\frac{\pi}{4} + \frac{\phi}{2}\right)\right] = R\tanh^{-1}(\sin\phi) \qquad \text{[Equation 3]}$$

Here, R is the long radius of the Earth ellipsoid, and radian is used as the unit of angle. In addition, the latitude range in the Web Mercator projection is limited to ±85.051129° or less [non-patent document 5]. In fact, it can be thought as more relevant to use the Earth's average radius of 6,371,008.8 m for R. But, if we use the long radius of the Earth ellipsoid instead of the average radius, there is an advantage in that, at least, the two coordinates, that is Mercator coordinates and Web Mercator coordinates, coincide at the equator.

The center of Daejeon Jungang-ro intersection has a latitude of 36.3286936° and a longitude of 127.4259233°. If we calculate the northing and the easting from this using the Web Mercator projection, the northing is 4,345,943.87 m and the easting is 14,184,988.90 m. Therefore, if we express the center position of the Daejeon Jungang-ro intersection in one sentence in the form of Eq. 1, it is given as P=N4345943.87E14184988.90. At this location, the height above sea level is measured as 59.0 m with a smartphone. However, the uncertainty of measurement is not known. Including height above sea level, this location is given as P=N4345943.87E14184988.90H59.0.

Since there are no identifying letters F, G or B to indicate the floor in this coordinate, it can be seen that it is outdoors. If there was a building at the Daejeon Jungang-ro intersection, the location on the first floor of this building will be given as P=N4345943.87E14184988.90G, or P=N4345943.87E14184988.90H59.0G. Actually, there is no building on the ground at this intersection, but under the ground, there is Daejeon Jungang-ro underground shopping mall. Therefore, the location of the underground shopping mall just below the Daejeon Jungang-ro intersection can be expressed as P=N4345943.87E14184988.90B1.

Figure 11:
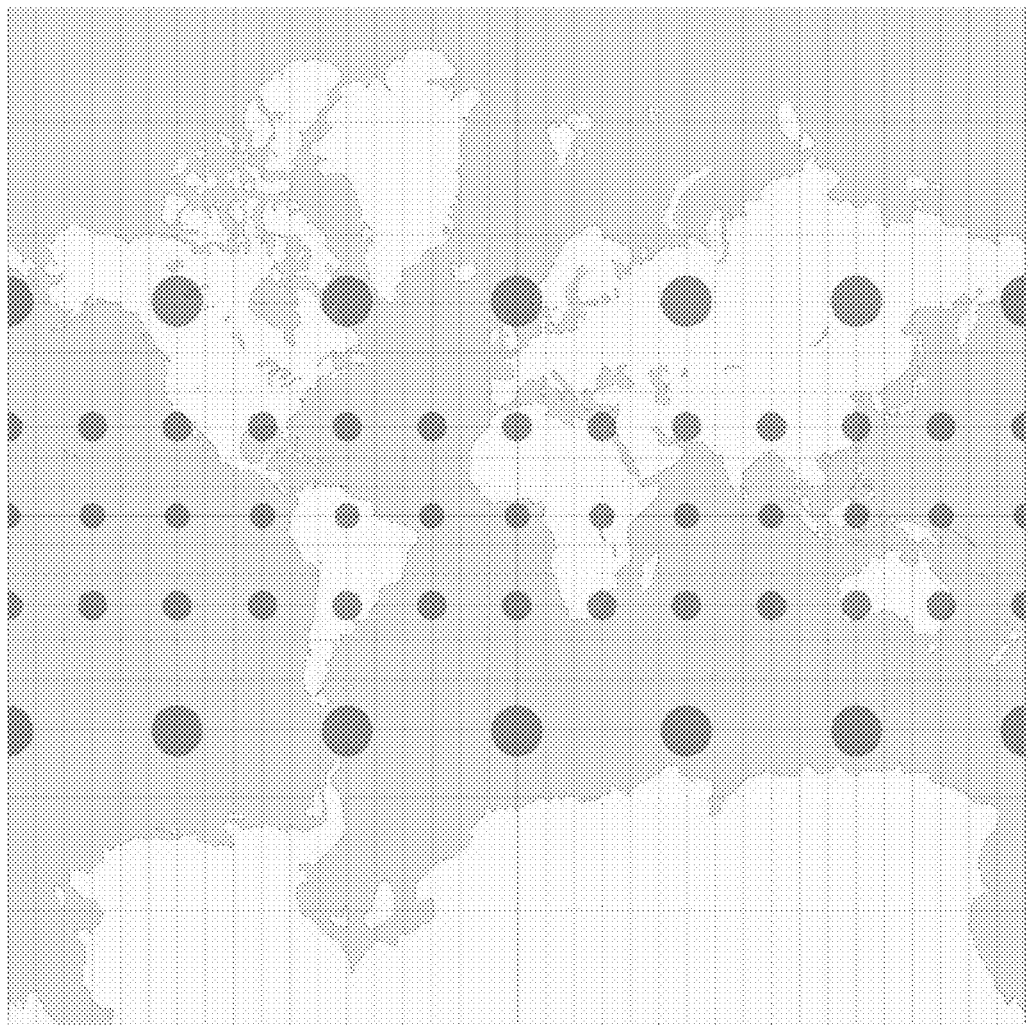
FIG. 11 is an example of a map created by the Web Mercator projection.

Although the northing and the easting in the Web Mercator projection have units of distance, they are significantly different from the actual distances on the surface of the Earth. FIG. 11 is an example of a world map created in Mercator projection (author: Justin Kunimune, source: https://en.wikipedia.org/wiki/Mercator_projection#/media/File:Mercator_with_Tissot's_In dicatices_of_Distortion.svg).

The greatest advantage of Mercator projection is that it preserves direction, which has been particularly helpful in the past in navigating ships using a compass. However, the biggest disadvantage of the Mercator projection is that area is greatly distorted and the polar regions cannot be shown. For example, on a map in the Web Mercator projection, Greenland appears to be the same size as Africa, but in reality the area of Africa is 14 times that of Greenland.

The circles shown in FIG. 11 are called Tissot's indicatrix of deformation, and indicate how the area or shape is distorted according to the location. To put it simply, a circle with a radius of 1 m is drawn on the actual surface of the Earth, and then the circle is also mapped to appear on a map. If there is distortion on the shape, a circle appears as an ellipse. Therefore, if the circles look like almost perfect circles, it can be said that the distortions on the shapes are small. If there is no distortion at all, the Tissot's ellipses should all be represented by circles having the same size.

In FIG. 11, as latitudes increase, the Tissot's ellipses increase in size, but it can be seen that all of them maintain the shapes of circles. That is, the Mercator projection preserves the angle and the shape of a small area. Mercator projection is a representative example of conformal projection. However, as latitudes increase, the sizes of the ellipses increase, indicating that the distortions in sizes or distances are large. That is, in the Mercator projection, the distance between two points on the surface of the Earth with a distance of 1 m in the northing or the easting can be significantly different from 1 m.

Table 1 shows the calculated northing and the easting in the Web Mercator projection at representative places on the Earth.

TABLE 1

| no. | places | latitude | longitude | northing | easting |
|---|---|---|---|---|---|
| 1 | longitude-latitude origin | 0° | 0° | 0.00 m | 0.00 m |
| 2 | antipode | 0° | 180° | 0.00 m | 20037508.34 m |
| 3 | North Pole | 90° | 0° | +∞ | 0.00 m |
| 4 | South Pole | −90° | 0° | −∞ | 0.00 m |
| 5 | Sejong Continuously Operating Reference Station | 36.5222134° | 127.3031899° | 4372717.10 m | 14171326.28 m |
| 6 | center of Daejeon Jungang-ro intersection | 36.3286936° | 127.4259233° | 4345943.87 m | 14184988.90 m |
| 7 | Sydney opera house | −33.8567844° | 151.2152967° | −4009587.84 m | 16833209.83 m |

As can be seen in Table 1, the northing of the North Pole is given as infinity (∞), and the northing of the South Pole is calculated as minus infinity (−∞). Also, in the southern hemisphere, northings have negative values.

Figure 12:
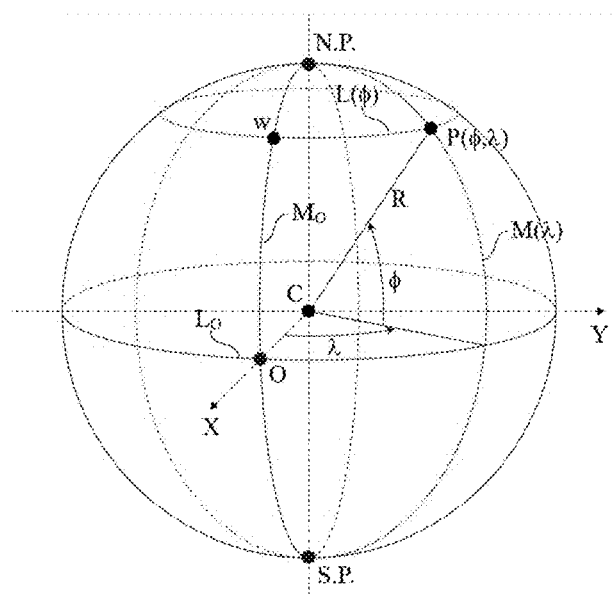
FIG. 12 is a conceptual diagram for understanding the optimal coordinate system used in the first embodiment of the present invention.

The coordinate system disclosed in reference [patent 17] is closely related to the sinusoidal projection method [non-patent document 6]. The sinusoidal projection is one of the pseudocylindrical projection methods. FIG. 12 is a conceptual drawing for understanding this coordinate system. While assuming that the shape of the Earth is a perfect sphere as in the Web Mercator projection, this coordinate system uses geodetic latitude and longitude based on the Earth ellipsoid for latitude and longitude. Simply put, geodetic latitude is treated as if it were geocentric latitude. Therefore, the distance from the center C of the Earth to a point P ($\phi$, $\lambda$) on the Earth's surface having a geodetic latitude $\phi$ and a longitude $\lambda$ is the Earth's radius R, and the geodetic latitude and the longitude are given by simple formulas of the rectangular coordinates X, Y and Z.

In this coordinate system, the northing and the easting are defined as follows. A point P ($\phi$, $\lambda$) with latitude $\phi$ and longitude $\lambda$ corresponds to an intersection point of a line L($\phi$) passing through points with latitude (parallels, lines of latitude) and a meridian M($\lambda$) passing through points with longitude $\lambda$ (lines of longitude). The line of latitude passing through points with latitude 0 is the equator $L_o$, the meridian corresponding to longitude 0° is the prime meridian $M_o$, and the intersection point of the equator and the prime meridian is the longitude-latitude origin O. And, the intersection point of the prime meridian $M_o$ and the line of latitude L($\phi$) is called a waypoint w.

Then, northing is defined as the arc length measured along the prime meridian from the longitude-latitude origin O to the waypoint point w, and easting is defined as the arc length measured along the line of latitude from the waypoint w to the one point P (ϕ, λ). However, since there is a region where the northing and the easting measured in this way have negative (−) values, in order to have positive (+) values as a whole, a reference point, which is the starting point of the measurement of the northing and the easting, may be allowed to move freely from the longitude-latitude origin to another point on the Earth's surface, and default values of the northing N and the easting E are allowed as well. Then, it is given as in Eq. 4 and Eq. 5.

$$N=N_o+R(\phi-\phi_o) \quad \text{[Equation 4]}$$

$$E=E_o+(\lambda-\lambda_o)R\cos\phi \quad \text{[Equation 5]}$$

Here, $N_o$ is the default value of the northing, $E_o$ is the default value of the easting, $\phi_o$ is the geodetic latitude of the reference point, and $\lambda_o$ is the longitude of the reference point. In addition, the formulas for obtaining the geodetic latitude and the longitude from the northing and the easting are given as in Eq. 6 and Eq. 7.

$$\phi = \phi_o + \frac{N-N_o}{R} \quad \text{[Equation 6]}$$

$$\lambda = \lambda_o + \frac{E-E_o}{R\cos\left(\phi_o + \frac{N-N_o}{R}\right)} \quad \text{[Equation 7]}$$

In order to maximize the compatibility of the coordinate system, it will be preferable to use 6,371,098 m as an average radius R of the Earth as in the Web Mercator projection. Then, in order to ensure that the northing and the easting always have positive values at any location on the Earth, the reference point can be placed at the longitude-latitude origin (that is, $\phi_o=\lambda_o=0$), and the default values of the northing and the easting can be $N_o$=20,000,000 m and $E_o$=40,000,000 m. Table 2 shows the calculated northing and the easting in such condition at representative places.

Figure 13:
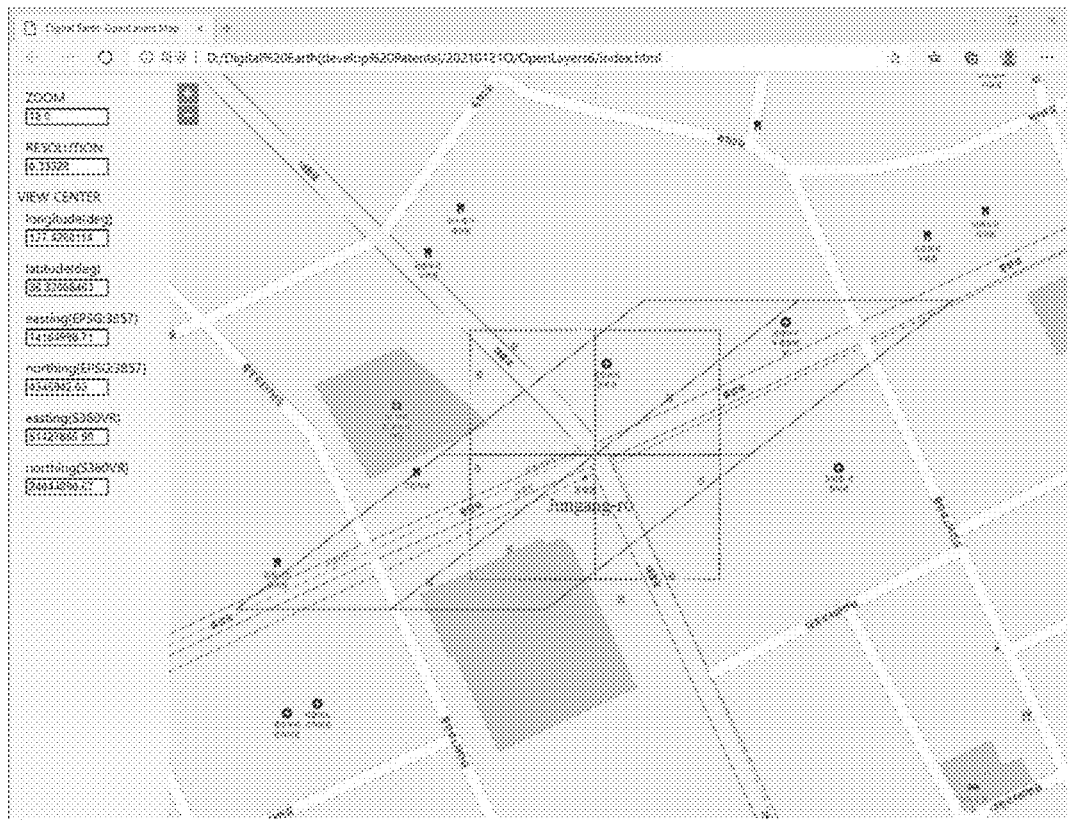
FIG. 13 is a diagram showing a region with an area of 100×100 m² at the Daejeon Jungang-ro intersection.

The disadvantage of such a northing and an easting is that the two coordinates are not orthogonal. In other words, two points with a difference of 1 m in easting are actually 1 m apart along the line of latitude on the Earth's surface, but two points with a difference of 1 m in northing are not 1 m apart along the meridian. FIG. 13 illustrates this fact.

FIG. 13 is a diagram showing the boundary of an area of about 100 m in width and length at Daejeon Jungang-ro intersection. A parallelogram indicates an area where the ranges of the northing and the easting described by Eq. 4 and Eq. 5 are within 50 m from the Daejeon Jungang-ro intersection, and in the same way, the square marked by a dotted line indicates an area where the ranges of the northing and the easting in the Web Mercator coordinate system are within 50 m from the Daejeon Jungang-ro intersection. It can be seen from FIG. 13 that the areas of the square and the parallelogram are significantly different. As strange as it may seem, the area of this parallelogram is 100×100 m². And the area of the square is far less than that.

Figure 14:
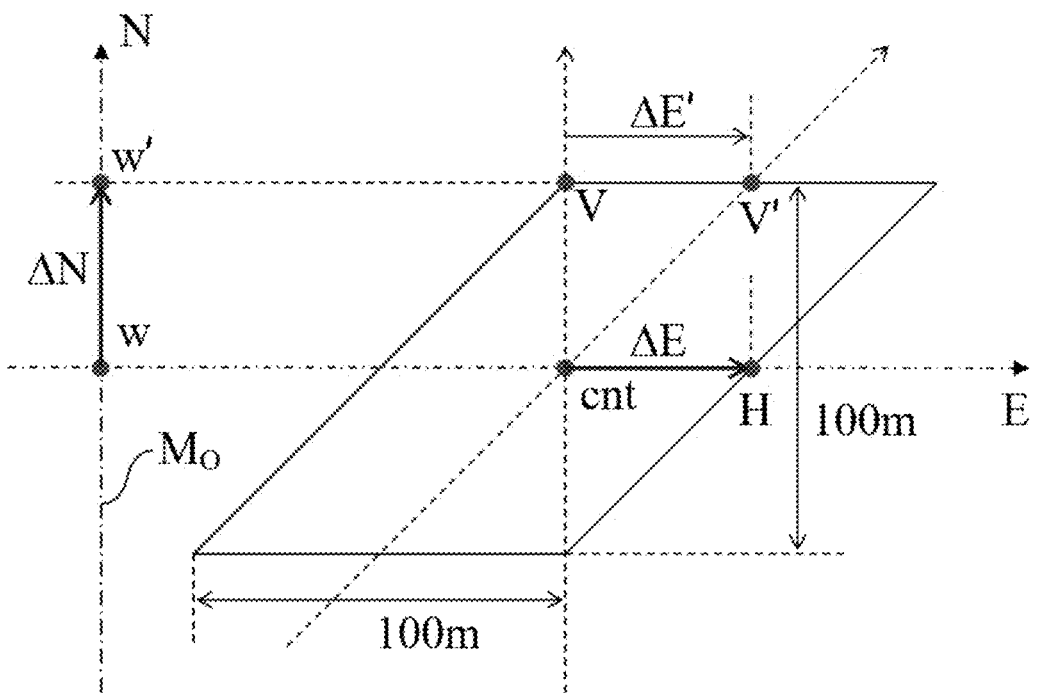
FIG. 14 is a diagram for understanding the shape of the region in FIG. 13.

FIG. 14 is a diagram for understanding this phenomenon. The center of the region is cnt, the horizontal axis E represents the direction of the easting given by Eq. 5, and the vertical axis N represents the direction of the northing given by Eq. 4. And the position, of which the easting is ΔE=50 m apart from the center cnt, is H, and the position, of which the northing is ΔN=50 m apart, is V'.

H is simple to understand. The center cnt and the position H have the same northing. And, the easting is measured along the line of latitude from the waypoint w. Since the center cnt and the location H have the same northing, they have the same waypoint w, and only the eastings measured along the line of latitude differs by 50 m. Therefore, the center cnt and the position H differ by 50 m in the east-west direction.

Then, why is the point V' instead of V, which has the same easting with the center cnt and differs by 50 m in northing? Northing is a distance measured along the prime meridian $M_o$ from the longitude-latitude origin. Thus, the waypoint w of the center cnt and the waypoint w' of the location V' are 50 m apart along the prime meridian. However, an easting is

TABLE 2

| no. | places | latitude | longitude | northing | easting |
|---|---|---|---|---|---|
| 1 | longitude-latitude origin | 0° | 0° | 20000000.00 m | 40000000.00 m |
| 2 | antipode | 0° | 180° | 20000000.00 m | 60037508.34 m |
| 3 | North Pole | 90° | 0° | 30018754.17 m | 40000000.00 m |
| 4 | South Pole | −90° | 0° | 9981245.82 m | 40000000.00 m |
| 5 | Sejong Continuously Operating Reference Station | 36.5222134° | 127.3031899° | 24065634.20 m | 51388448.93 m |
| 6 | center of Daejeon Jungang-ro intersection | 36.3286936° | 127.4259233° | 24044091.67 m | 51427876.75 m |
| 7 | Sydney opera house | −33.8567844° | 151.2152967° | 16231080.00 m | 53978848.40 m |

As can be seen in Table 2, the northing and the easting have finite positive values at all points on the Earth. In addition, when comparing the northing and the easting on the map with the actual distances on the ground in the above-described way, two points with a difference of 1 m in the northing calculated by Eq. 4 or in the easting calculated by Eq. 5 also have similar differences on the actual surface of the Earth. The reason why it is not exactly 1 m is due to the fact that the Earth is assumed as a sphere rather than an ellipsoid, and altitude is not taken into account.

a distance measured along the line of latitude from the waypoint. In the northern hemisphere, the waypoint w' is 50 m north of the waypoint w, so the perimeter of the line of latitude is shorter. Therefore, if started from the waypoints w and w' and moved by the same easting, the angular distance moved with respect to the waypoint w' with a small circumference is inevitably larger. Therefore, the point, of which the northing differs by 50 m with the center cnt, becomes V', not V.

If the northing and the easting given by Eq. 4 and Eq. 5 of the center cnt are N and E, respectively, the coordinates of the center cnt are (N, E), the coordinates of the location H are (N, E+ΔE), and the coordinates of the location V are (N+ΔN, E).

To move from the center cnt to position H, the longitude λ must be changed. If the longitude is changed from λ to λ', the amount of change in longitude is given as in Eq. 8.

$$\Delta\lambda = \lambda' - \lambda \qquad [\text{Equation 8}]$$

Then, the amount of change in easting is given by Eq. 9.

$$\Delta E = E(\phi, \lambda') - E(\phi, \lambda) = R\Delta\lambda \cos\phi \qquad [\text{Equation 9}]$$

Looking at Eq. 9, if the longitude λ changes, the easting E increases in proportion to it. Looking at Eq. 4, it can be seen that the northing is not affected by this. This means that as longitude increases, the coordinates move parallel to the line of latitude.

To change the northing from the center cnt, the latitude φ must be changed. Assuming that the longitude does not change and only the latitude changes from φ to φ', the amount of change in latitude is given as in Eq. 10.

$$\Delta\phi = \phi' - \phi \qquad [\text{Equation 10}]$$

Then, the amount of change in northing is given by Eq. 11.

$$\Delta N = N(\phi', \lambda) - N(\phi, \lambda) = R\Delta\phi \qquad [\text{Equation 11}]$$

On the other hand, although the longitude has not changed and only the latitude has changed, the amount of change in the easting is given as in Eq. 12.

$$\Delta E' = E(\phi', \lambda) - E(\phi, \lambda) = R(\lambda - \lambda_o)(\cos\phi' - \cos\phi) \qquad [\text{Equation 12}]$$

If the amount of change in latitude is very small, Eq. 12 can be approximated as Eq. 13.

$$\Delta E' \cong -R(\lambda - \lambda_o)\sin\phi\Delta\phi \qquad [\text{Equation 13}]$$

Therefore, when latitude has changed, the new position becomes V', not V. For this reason, in FIG. 13, the shape of the region, of which the range of the northing and the easting according to Eq. 4 and Eq. 5 are within 50 m from the center, is given as a parallelogram.

However, in FIG. 13, when both the latitude and the longitude have positive values and the longitude φ is larger than the reference longitude $\phi_o$, the amount of change in the easting has a negative value. However, in FIG. 13, since the parallelogram is inclined to the right, it appears to have a positive value. This discrepancy is because the points having the northing and the easting given by Eq. 4 and Eq. 5 were converted back to the Web Mercator projection and displayed on the map.

In FIG. 13, the upper and the lower sides of the parallelogram are perfectly horizontal, and the two sides are parallel to each other. However, the two hypotenuses of the parallelogram, that is, the left and the right sides, are not parallel to each other, and in fact, they are not straight lines either. However, since the length (100 m) of one side of the parallelogram is much smaller than the size of the Earth, they appear as two parallel straight lines.

In FIG. 14, the length of the upper and the lower sides of the parallelogram is 100 m. And the height of the parallelogram is 100 m. Therefore, the area of the parallelogram is 100×100 m². That is, when a region having a certain range in northing and easting according to the first embodiment of the present invention is displayed (e.g., N−0.5≤y≤N+0.5, E−0.5≤x≤E+0.5), the region usually has a shape of a parallelogram, but its area is always constant as 1 m².

On the other hand, if the boundary of a region is marked having the same constant range in northing and easting in the Web Mercator projection, the region has a square shape on a map in the Web Mercator projection, but the actual area of the region can greatly differ from 1 m².

Figure 15:
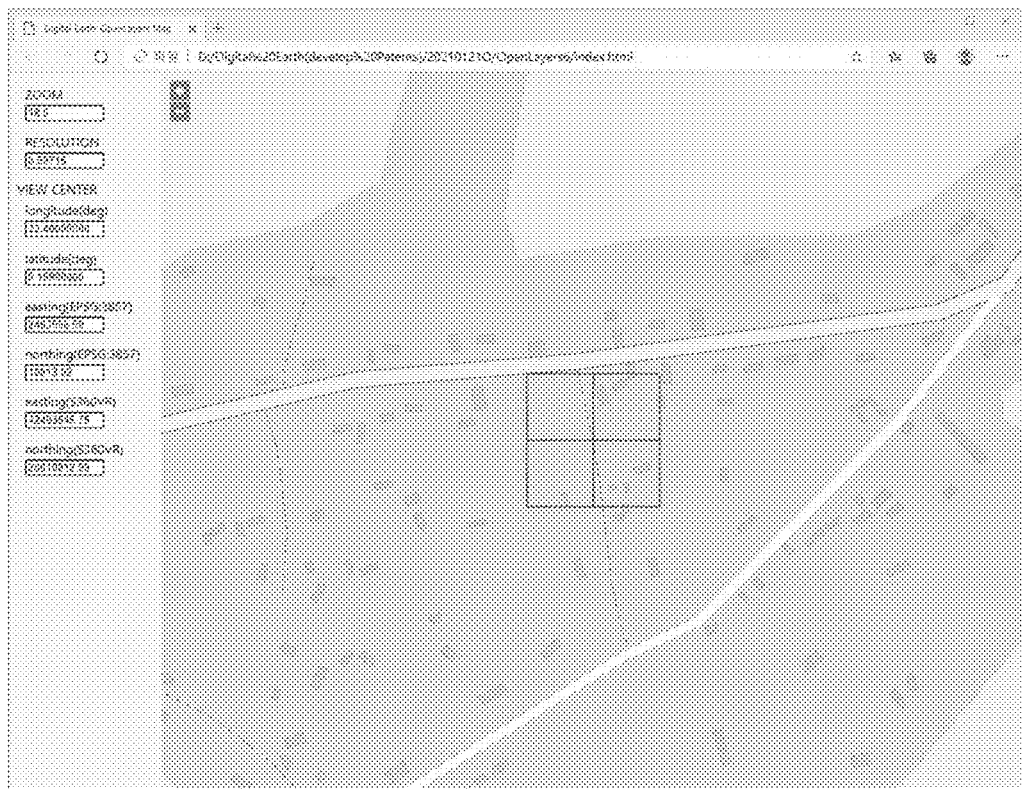
FIG. 15 to FIG. 17 are diagrams comparing regions having the same northing and easting ranges according to latitude and longitude.
Figure 16:
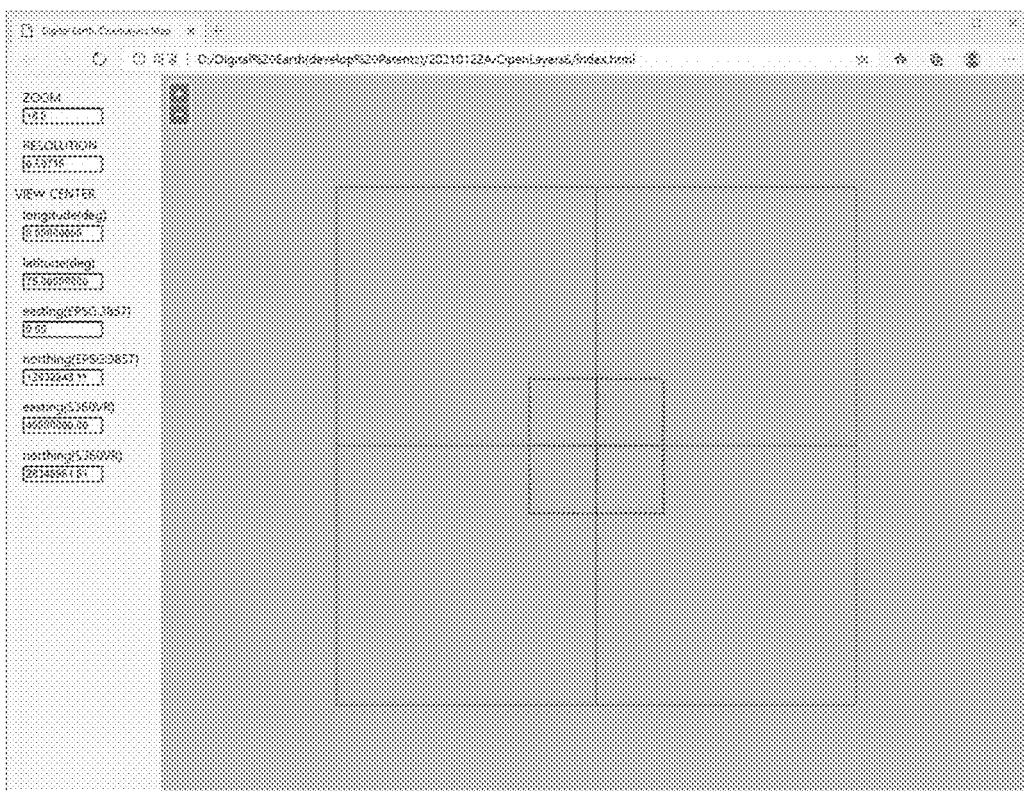
Figure 17:
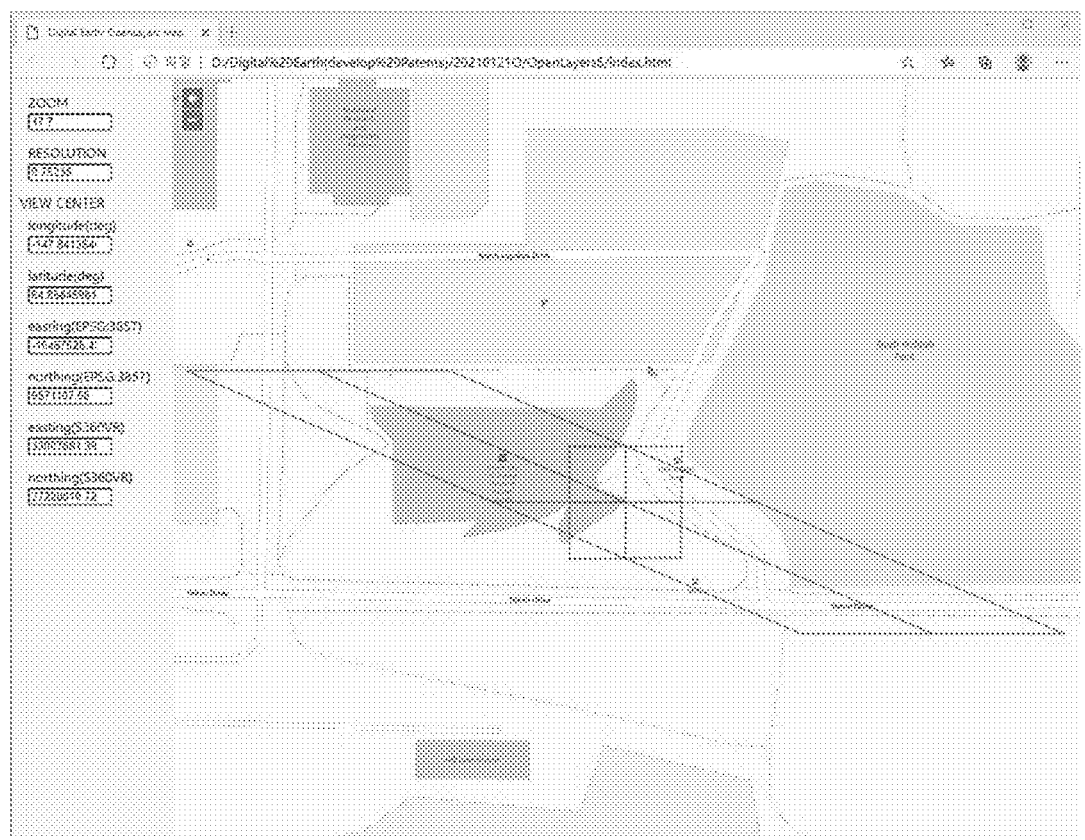

FIG. 15 shows that near the equator, there is little difference in the areas of the regions according to the two coordinate systems. In addition, both regions according to the two coordinate systems have square shapes. Meanwhile, as shown in FIG. 16, on the prime meridian (λ=0°), both regions have square shapes at a latitude of 75°, but have very different areas. In other words, if a region with a range of 1 m in northing and easting in the Web Mercator coordinate system is designated, the area of the region may actually be 1 cm² instead of 1 m². On the other hand, in FIG. 17, the parallelogram is inclined to the left in the Western Hemisphere where the longitude has a negative (−) value.

As can be seen from the above, the Web Mercator coordinate system is not suitable for dividing the region on the Earth into pieces having the same area. On the other hand, in the coordinate system according to the first embodiment of the present invention, the shape of the region is not a circle or a square, but has an area of 1 m² which is the same almost at any point on the Earth.

Both the northing and the easting in the Web Mercator coordinate system and the northing and the easting presented in [patent 17] satisfy the conditions to be used in the equations of the first embodiment of the present invention. Therefore, the northing and the easting in Eq. 1 may be the northing and the easting in the Web Mercator projection, or the northing and the easting presented in [patent 17], or they could be a northing and an easting in another coordinate system.

The northing and the easting in the Web Mercator projection have the advantage that the coordinates can be read off directly from a digital map drawn in the Web Mercator projection, and the shape of the region is given as a square. Therefore, for example, if they are used only within the territory of the Republic of Korea, the northing and the easting given by Eq. 2 and Eq. 3 can be used. However, even if a region of 1 m width and 1 m length is specified in the northing and the easting in the Web Mercator projection, the actual area may differ greatly from 1 m² depending on the latitude, and it has a further disadvantage that it cannot be used in polar regions.

On the other hand, if a region is specified within a range of 1 m, respectively, in the northing and the easting presented in [patent 17], the area is given as almost 1 m² at all places on the Earth including the polar regions. However, the shape of the region is usually given as a parallelogram.

It is a great advantage that an arbitrary position on the Earth can be specified with an error of 1 m². For example, after calculating the northing and the easting given by Eq. 4 and Eq. 5 from the latitude and the longitude of an arbitrary place on the Earth, an integer or a natural number can be obtained by rounding off the numbers. Then, the area of a region having the same integer or natural number obtained in this way is always 1 m². An error range of 1 m² is sufficient to specify the location of a traffic light or a passerby on the street. In addition, when the Earth's surface is divided by these two integers, only about 510 trillion pairs of integers are generated which is just the right amount to be used globally. Therefore, for global use, the northing and the easting given by Eq. 4 and Eq. 5 can be considered as the best choice.

Second Embodiment

When a company intends to operate a separate website for publicity or for a shopping mall dealing its own products, they must first secure an Internet domain and pay an annual domain maintenance fee. In addition, it is quite difficult to secure an Internet domain that does not overlap with already occupied domains. This is because, in most cases, domains which are easy to remember and have clear meanings have been already registered by someone else.

If we create our own website on Google Maps, we don't need to purchase a domain. This is because Google automatically creates a sub domain by an algorithm. In addition, if we upload a company name, phone numbers, photos and etc., a homepage is automatically created from these. The reason why a homepage is created in this way is because a basic frame, that is, a template, is used to create a homepage.

The biggest advantage of using a template to create a website is that subscribers do not have to know anything about website creation, and the overall storage space is reduced and the speed is increased because everything is done using a database. On the other hand, the biggest drawback is the lack of flexibility. It's like the difference between making a driver's license and making a business card. Driver's licenses have only one design, but names, addresses, and photos are all different. On the other hand, business cards also contain names, addresses, and phone numbers, but their designs are all unique. Therefore, there is an advantage that a unique design can be used to show one's own individuality, but designing a business card is everyone's responsibility and requires considerable effort.

Therefore, it is advantageous not to use a template or to store in a database if we are going to operate a website of various types rather than a standardized homepage or more generally an online website. Instead, it is preferable to store the Internet page in a separate folder and store only the full path including the path to the folder and the name of the Internet page in a database.

However, a character string according to the first embodiment of the present invention can be used to integrally manage digital files to which location attribute can be assigned, such as a website source file of a store having an address. Here, the location attribute is the location attribute of a representative point in the place of business of the business entity, and includes a geodetic latitude and a longitude and optionally a floor number. In addition, digital files can be source codes of websites constituting the homepages of businesses having addresses, and photos, videos, etc., and data related to online shopping malls of stores. They can also be data such as transaction records or customer reviews.

Figure 18:
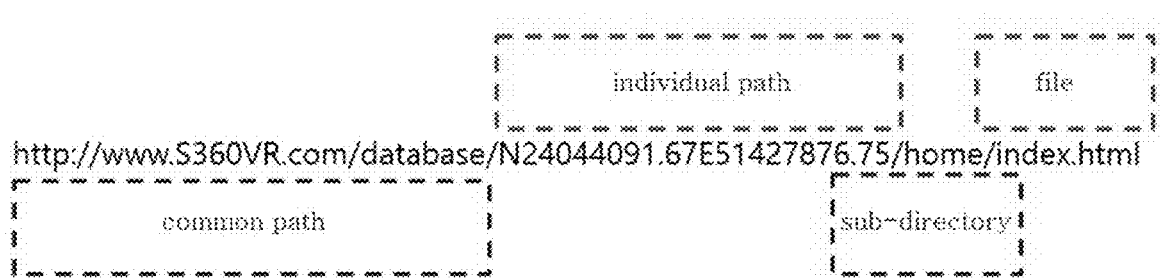
FIG. 18 is a conceptual diagram illustrating full paths of digital files in the second embodiment of the present invention.

As illustrated in FIG. 18, the website address of such a store can be created as "http://www.S360VR.com/database/N24044091.67E51427876.75/home/index.html" using the northing and the easting of the store's representative position. According to this expression, there is a folder named 'database' in the domain of 'www.S360VR.com', and in it, there is an individual folder for each store. In it, there is a sub-folder with a common format name 'home', and in it, an HTML page named 'index.html' is stored.

Here, 'N24044091.67E51427876.75' is an individual folder name created using the northing N=24044091.67 m and the easting E=51427876.75 m of the representative point of the store assuming an imaginary store at Daejeon Jungang-ro intersection, and is created as a single string in the same format given in Eq. 14.

$$P=N\{N\}E\{E\}(F\{F\}|G|B\{B\})$$ [Equation 14]

Here, N, E, F, G and B are identification letters respectively indicating northing, easting, floor above the ground, ground floor, and basement level. The curly brackets { } are symbols indicating to replace the curly brackets with the actual value corresponding to the identifying letter inside the curly brackets, round brackets ( ) are symbols indicating an omissible item, and vertical bar | is a symbol indicating that one on either side of the vertical bar can be selected. The northing N and the easting E are real numbers that have positive (+) values with a unit of distance and a pair of northing N and easting E can be converted to and from a pair of geodetic latitude φ and longitude λ.

If the store is located on the second floor above the ground, 'F1' must be added to the end of the string indicating the name of the individual folder, and 'B3' must be added if it is in the third basement level. And, if it is a store on the first floor (ground floor) in a multi-story building, 'G' must be added, but if it is a store in a single-story building or a street stall, the 'G' can be omitted.

The northing and the easting can be the northing and the easting in the Web Mercator projection given by Eq. 2 and Eq. 3, or the northing and the easting given by Eq. 4 and Eq. 5 can be used. As can be seen from Eq. 14, the height above sea level is not used. This is because there is no need to specify the height above sea level to distinguish shops from each other.

However, there is no need to specify the northing and the easting in detail to the centimeter (cm) level. No matter how small a store is, the area will exceed 1 m², so we can round off the northing and the easting to make them into natural numbers. Therefore, it is sufficient to set the address of the imaginary store as 'http://www.S360VR.com/database/N24044092E51427877/home/index.html'. Therefore, an individual folder can be created as in Eq. 15.

$$P=N\{\overline{N}\}\overline{E}\{E\}(F\{F\}|G|B\{B\})$$ [Equation 15]

Here, $\overline{N}$ is a northing corresponding integer, which is a natural number obtained by rounding off the northing, and $\overline{E}$ is an easting corresponding integer, a natural number obtained by rounding off the easting.

Therefore, the character string 'N24044092E51427877' is the name of an individual folder wherein a sub folder storing digital files related to an imaginary store at Daejeon Jungang-ro intersection is stored. For example, the digital files may constitute the official website of the 'Starbucks' Cafe, which is an imaginary store at Daejeon Jungang-ro intersection.

However, if individual folder names are created in the same way as in Eq. 14 and Eq. 15, it is convenient to manage them with a computer, but it may be inconvenient for people. This is because it is difficult to know what kind of store it is by just looking at the northing and the easting. However, if the individual folder name is given as 'N24044092E51427877(starbucks)', there is a disadvantage in that the work load for computer increases a little bit, but it is convenient for people to manage.

From another perspective, if we add country name or country name and administrative district name to individual folder names, such as 'Korea-N24044092E51427877(starbucks)' or 'Korea-Daejeon-N24044092E51427877(starbucks)', it will be easier to manage a large amount of digital files for each country or for each administrative district. Therefore, according to a preferred embodiment of the present invention, the individual folder name is given as one character string including a character string P corresponding to the location attribute, and the character string P is given by Eq. 14 or Eq. 15.

On the other hand, it can be created in a similar way not only for a store in a building, but also for the name of an individual folder for managing the homepage of the building itself or other files, for example, a floor plan file. However, in this case, individual folders are created using only the northing and the easting without the need for floor information. Accordingly, the name of the individual folder is given as one character string including a character string P given as in Eq. 16 or Eq. 17.

$$P=N\{N\}E\{E\} \qquad \text{[Equation 16]}$$

$$P=N\{\overline{N}\}E\{\overline{E}\} \qquad \text{[Equation 17]}$$

Within these individual folders, for example, we can create a subfolder called 'structure' and store floor plans like 'G.geojson' and 'F1.geojson' in this subfolder. That is, it is possible to store and manage not only HTML pages for constituting a homepage, but also digital files having arbitrary forms.

Therefore, the second embodiment of the present invention provides a method and a data store (data warehouse) for integrally managing digital files which can be assigned with location attributes that can optionally include floor numbers. A location attribute refers to information of a geographic coordinates represented by a latitude and a longitude, or a northing and an easting which are mutually convertible with a latitude and a longitude, and optionally an added integer representing a floor number in a building.

Digital files with different location attributes are stored in different individual folders, and the full path to an individual folder includes a common path and an individual folder name. The individual folder name is given as in Eq. 14 to Eq. 17 as one character string corresponding to the location attribute.

These digital files are stored in one or more media or data stores. The media can be simply an internal or an external hard drive of a computer, NAS (Network Attached Storage), a server for data storage, or a data center. As the amount of contents increase, they could be several distributed servers or data centers scattered around the world.

Digital files can be building outline drawings and floor plans of buildings with addresses. In this case, the said location attribute is a geodetic latitude and a longitude of the representative point of the building.

In addition, said digital files can be HTML source codes related to homepages of companies (businesses, enterprises) having addresses. In this case, the said location attribute is a location attribute of a representative point in the said place of business, and includes a geodetic latitude and a longitude and optionally a floor number.

Also, the said digital files can be digital files associated with spaces. Here, spaces refer to one or more places on the Earth, which have location attributes including geodetic latitudes and longitudes and optionally floor numbers in buildings, and people can recognize boundaries in closed curves or polygon shapes, and have finite areas. For example, a small store with walls and doors can become a space.

In addition, digital files can be any data that can be associated with individual spaces including homepage source codes, bulletin boards data, blogs, photo galleries, game sites, sound sources, chatting room, and file sharing sites.

Third Embodiment

As well as digital files related to homepages of stores or buildings, the same method as in the second embodiment may be used to integrally manage digital devices capable of being assigned with location attributes. For example, these days, most security cameras are installed as IP cameras. An IP camera has its own web server built-in inside the camera. Therefore, if we know the ID and password, we can access the camera using a web browser and view the screen captured by the security camera in real time.

IOT (Internet Of Things) sensors as well as IP cameras have connection endpoints, so we can access a connection endpoint to manipulate an IOT device or read the sensor value of an IOT sensor. As such, digital devices according to the third embodiment of the present invention refer to all devices that can be accessed online, such as IP cameras, live cameras, NAS (Network Attached Storage), IOT sensors and etc.

If such digital devices are named in the same manner as in the second embodiment of the present invention, numerous globally installed devices can be managed in an integrated and consistent manner. For example, if an IP camera and a fire detector are installed in an underground shopping mall just below the Daejeon Jungang-ro intersection, the names of the IP camera and the fire detector can be 'N24044091.67E51427876.75B1-Cam' and 'N24044091.67E51427876.75B1-Pyro', respectively. Or, it can be determined as 'N24044092E51427877B1-Cam' and 'N24044092E51427877B1-Pyro' by rounding off the northing and the easting, respectively. Also, a traffic light on the ground can be named in the same way as 'N24044092E51427877-TrafficLight'.

The reason for adding additional characters in addition to the northing and the easting and the floor number is that usually several digital devices are installed in a narrow region, and the types of digital devices cannot be known only from the northing and the easting and the floor number. Therefore, it is preferable to define the names of digital devices as one character string including a character string P given in the form of Eq. 18 or Eq. 19.

$$P=N\{N\}E\{E\}(F\{F\}|G|B\{B\}) \qquad \text{[Equation 18]}$$

$$P=N\{\overline{N}\}E\{\overline{E}\}(F\{F\}|G|B\{B\}) \qquad \text{[Equation 19]}$$

Here, the meaning of each symbol and letter is the same as in the first and the second embodiments of the present invention.

In order to access this IP camera, an Internet address such as 'http://www.S360VR.com/N24044091.67E51427876.75B1-Cam' can be used. Paths for accessing these digital devices are also composed of a common path and an individual digital device name similar to the first and the second embodiments. In the third embodiment, however, the character string including a character string P is not a name of an individual folder that manages files, but a connection endpoint of an individual digital device. That is, the Internet address of the connection endpoint of a digital device includes a common path and name of an individual digital device. These digital devices may be accessed through an existing search method, such as "http://www.S360VR.com/cam=N24044091.67E51427876.75B1?".

On the other hand, if we want to integrally manage digital devices by type, we can set the name of the camera as 'Cam-N24044092E51427877B1' instead of 'N24044092E51427877B1-Cam'. In addition, by adding the country name and administrative district name such as 'Korea-Daejeon-Cam-N24044092E51427877B1', digital devices can be integrally managed by country, administrative district name, and device type.

Fourth Embodiment

As we have already seen, Google Maps provides indoor maps for large multi-story buildings. When the zoom of the map exceeds a preset value, the floor plan of the ground floor of a large building that provides indoor map service is displayed. When the building is clicked, a menu for selecting a floor appears on one side of the map screen. If we select another floor from the menu, the floor plan of the ground floor is replaced by the floor plan of the corresponding floor.

While this approach may seem intuitively reasonable, actually, it was more appropriate in the days when everyone sat in a chair and looked at a map on a computer monitor. This cannot be said as the best way to do in current days when everyone has a smartphone, and unmanned vehicles and delivery robots are increasingly becoming realities.

When we launch a digital map with a smartphone, the location of the smartphone is calculated from the GPS signal and displayed on the map. In other words, when we run a map on our smartphone, our current location is displayed on the map. Then we can program the map to pan automatically so that our location is always at the center of the map. Therefore, if a smartphone owner entered into a certain building, it will be possible to show a menu for selecting a floor without even clicking the mouse or touching the screen. In other words, if the current location is inside a multi-story building where we can select a floor, it would be convenient to show a menu for selecting a floor without having to click or touch it.

In this method, if a smartphone owner stays on the ground floor, he/she can ignore the floor selection menu. If he/she is about to move to other floor using either stairs or elevator, it will be convenient to check the floor plan of the corresponding floor in advance using a floor selection menu. In addition, in the case of a desktop computer or a laptop computer, it can be assumed that the center of the map screen is my location, and if the center of the map is located inside a building that provides an indoor map by panning the map screen, a floor selection menu can be automatically displayed. Furthermore, when combined with various technologies that can identify the current floor, it may be possible to automatically change the floor plan when the floor is changed.

In order to implement a digital map having such a functionality, it is necessary first to understand the concept of layers and a view that are basically used in an electronic map system. Software that are widely known to the public such as AutoCAD, Photoshop and Adobe Illustrator all use layers to create or modify drawings, photos, and illustrations. In the past, before the advancement of computer technology, the concept of layers was also used to create cel animations.

Cel animation is a production technique for making a cartoon film, in which the background and the characters are all drawn on a separate transparent plastic film called celluloid, and then the films are stacked on top of each other and filmed with a camera to complete one frame at a time. Using this technique, layers that do not change between frames can be used repeatedly, saving time and effort.

In cel animation, each layer consists of an opaque partial picture drawn on a separate transparent film. For example, in a layer containing the main character of a cartoon film, only the main character is drawn opaquely, and all the rest remain as a transparent film. One frame is completed by overlapping each of the completed layers in order. Therefore, it is important to correctly overlap all the layers, but also it is important to keep the order of the layers.

Figure 19:
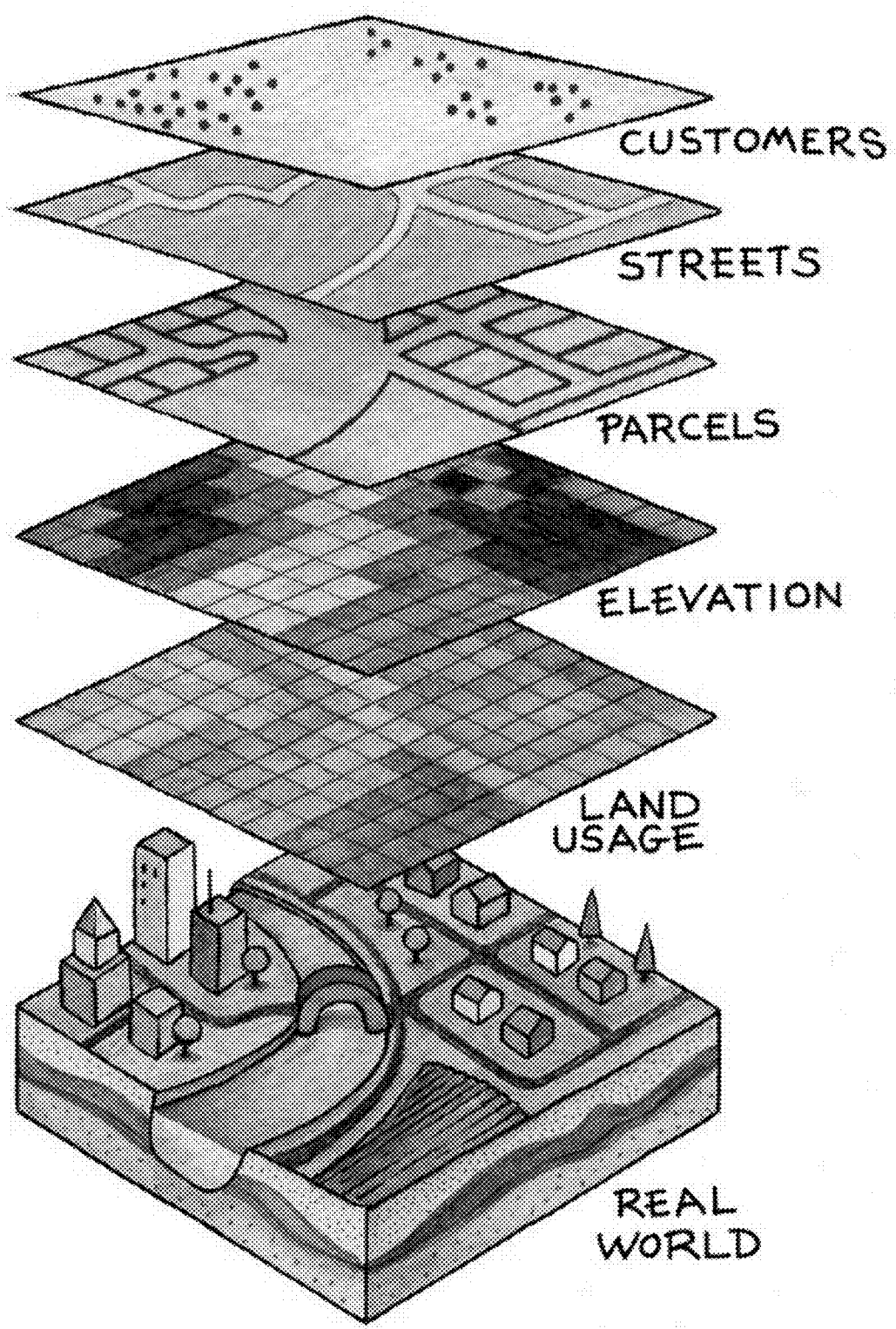
FIG. 19 is a conceptual diagram illustrating the concept of layers in map production.

FIG. 19 is a conceptual diagram illustrating a process of dividing the real world into respective layers in map production (source: https://saylordotorg.github.io/text_essentials-of-geographic-information-systems/s11-02-multiple-layer-analysis.html). In describing the real world as a map, it can be seen that the status of land usage, elevation, parcels of land, and streets are constructed in separate layers.

In FIG. 19, let's assume that each layer is made of a transparent film and then overlapped in order to take a picture. If we poke these superimposed layers from above with an awl and drill small holes in all of them, the holes in all layers will have the same geographic locations in the real world, for example the same latitude and longitude.

As a real example, the year 2020 edition of Baro (meaning immediate) e-map (map.ngii.go.kr), an official national map produced by the National Geographic Information Institute (https://www.ngii.go.kr), consists of 193 layers. If we use software such as QGIS, which is an open source software for map production, we can edit each layer separately and then combine all layers to print out a single map.

This single map can be created as a picture file, that is, a raster map with an extension such as jpeg, png or tiff, or it can be created as a vector map such as a floor plan of a building created in AutoCAD. Although 193 layers were used in the production process of the Baro e-map, the finished raster map is a single layer.

Using software platforms such as QGIS, OpenLayers or Leaflet, it is possible to create a map tailored to each person's needs. In this case, we can use more than one layer again. For example, after importing a satellite image, we can draw the dimly visible roads in the satellite image as a vector layer, and display these two layers by overlapping them. In this case, it could be used to plan a hiking by making the road stand out in a real landscape, much like a view from the sky.

In the past, a map printed on one large piece of paper or divided into regions and printed as a book was essential for travel. But now, as the use of computer and smartphone has become popular, electronic map has taken its place. Traditionally, the term 'electronic map' was used, but the term 'digital map' may be more appropriate. The biggest advantage of an electronic map is that we can pan the center of the screen to the place of interest to us, zoom-in to the required magnification, and change the map orientation to compare it with the real landscape seeable in front of us. The basic concept for implementing such convenient functionalities, which was not possible with a paper map, is a view.

If a complete map of Korea or a world map is a (full) map, a part of the map displayed on a computer or a smartphone, or an object on which the map is displayed can be thought of as a view. OpenLayers, a representative client-side open source software related to maps, defines a view as follows.

A View object represents a simple 2D view of the map. This is the object to act upon to change the center, resolution, and rotation of the map. A View has a projection. The projection determines the coordinate system of the center, and its units determine the units of the resolution (projection units per pixel). The default projection is Spherical Mercator (EPSG:3857).)(source: https: openlayers.org en latest api-doc module-ol View-View.html.)

Other maps such as Google Maps, BingMap, OpenStreetMap, Naver Map and Daum Map all have the same concept, and most of the names are the same. So we can think of a view as a concept practically all digital maps use, albeit an informal one. Not only this, most of the other objects and their related syntax are similar. Therefore, for convenience, in the present invention, the invention will be described based on the objects and grammar in OpenLayers.

FIG. 20 is a part of JavaScript code written in the OpenLayers grammar, and shows the configuration of layers in the fourth embodiment of the present invention. The layers consist of baseLayer, BBoxLayer, buildingLayer, bldLabelLayer, floorLayer, spaceLabelLayer, and markerLayer. The layer declared first is drawn first, so the baseLayer is at the bottom and the markerLayer is at the top. The baseLayer is a layer that draws an outdoor map by receiving map tiles as picture files from OpenStreetMap. The baseLayer is a raster layer and the rest are vector layers.

The markerLayer is a layer for drawing a cross at the center of the view for the convenience of a user. The remaining layers except the baseLayer and the markerLayer form a structure layer group. Among them, the buildingLayer is a layer for drawing building outlines, and the floorLayer is a layer for drawing floor plans of buildings. Here, a floor plan can be any one among the floor plans for each floors of buildings. The BBoxLayer is a layer for drawing minimum bounding boxes that contain buildings in them for a reference purpose, and bldLabelLayer is a layer for displaying key information related to buildings, such as building names or website addresses. And, spaceLabelLayer is a layer for showing business names and others for individual spaces shown in the floor plan per level.

Here, a space means an indoor or an outdoor place having a location attribute and an area. A space has a boundary given by a closed curve or simply by a polygon. We can think of a room as the most representative example of a space. A room has walls, doors and a ceiling, allowing us to specify the longitude and the latitude of the center of the room and the floor number whereon the room is located. In addition, the area of the room can be specified in the unit of $m^2$. However, for a living room, the room is not entirely blocked by walls or doors. Nevertheless, anyone can specify from where to where the living room is. Such a living room is also recognized as a space in the present invention.

More drastically, outdoor soccer fields or street stalls in traditional markets are treated as spaces in the present invention, and soccer fields and open-air traditional markets are also treated as buildings. In the present invention, a place having one or more spaces having fixed location attributes and areas is treated as a building. Accordingly, not only typical buildings such as houses or commercial buildings, but also cases without walls or roofs, such as tennis courts with boundaries drawn with chalk, are treated as buildings in the present invention.

Although FIG. 20 is only an example, it is important that there is a map layer group for displaying an outdoor map first, and a structure layer group for showing building outlines or floor plans as a vector layer on it. In FIG. 20, the map layer group is a layer group having only one layer (i.e., baseLayer), but in an example in which a general map and a satellite map are used together, the map layer group can have a plurality of layers, also. In addition, the structure layer group may be composed of several layers. The reason why it is composed of several layers like this is for structural programming.

FIG. 21 is a conceptual drawing showing the configuration of a digital map system in the fourth embodiment of the present invention. When smartphones, computer users or delivery robots access a web server or a service server through the Internet, a digital map can be used using web browsers such as Chrome or Microsoft Edge.

A smartphone, a computer, a delivery robot and the like may be collectively referred to as a digital device. A digital device may comprise a processor, a memory, a storage and an I/O part.

A processor can perform certain calculations or tasks. Depending on the implementation, the processor can be a micro-processor or a central processing unit (CPU). The processor can communicate with the memory device, the storage device, and the input/output units through buses such as address bus, control bus, and data bus. Depending on the implementation, the processor can also be connected to an expansion bus, such as a Peripheral Component Interconnect (PCI) bus.

The memory can store data necessary for the operation of an electronic device. For example, the memory can be implemented as DRAM, mobile DRAM, SRAM, PRAM, FRAM, RRAM, and/or MRAM. A storage is a physical storage element capable of storing data files and may include a solid state drive, a hard disk drive, a CD-ROM and the like. The input/output units may include input means such as a keyboard, a keypad and a mouse, and output means such as a printer and a display. In addition, the electronic device may include a power supply unit for supplying electrical power required for operation.

The processor according to an embodiment of the present specification is included in an electronic device, and may be executed to specify a location on the Earth as a character string.

The processor according to an embodiment of the present specification is included in an electronic device and it can be executed to manage in an integrated way digital files capable of being assigned with location attributes including geodetic latitudes and longitudes and optionally floor numbers.

The processor according to an embodiment of the present specification can control data store in an integrated way that integrally stores digital files capable of being assigned with location attributes including geodetic latitudes and longitudes and optionally floor numbers in a medium. Specifically, data formed by specifying locations on the Earth with one string can be stored in the data storage.

The processor according to an embodiment of the present specification may control a data store that integrally stores digital files related to buildings in a medium and specifically, data formed by specifying locations on the Earth as character strings can be stored in a data store.

The processor according to an embodiment of the present specification can loads a digital map from an internal storage or an external storage device, and integrally displays an outdoor map and an indoor map including floor plans of buildings on a view of the map, and can be executed to output the result on input/output units.

A processor according to an embodiment of the present specification may be included in a digital map system to execute a computer program stored on a medium to execute a series of stages to integrally display an outdoor map and an indoor map including floor plans of buildings on a view.

A processor according to an embodiment of the present specification may control to display responsive HTML pages on a view of a digital map, and the digital map is loaded from an internal storage or an external storage, and responsive HTML pages can be controlled to be outputted from its own input/output units or from other electronic device.

A processor according to an embodiment of the present specification can be controlled to run a program stored in a medium to execute a series of stages to display responsive HTML pages on a view of a digital map, and can be included in a digital map system.

A processor according to an embodiment of the present specification can be controlled to integrally display an outdoor map, an indoor map having floor plans of buildings, Internet links and responsive HTML pages on a view of a digital map.

A user who wants to use a digital map service directly accesses a web server using a computer or a smartphone, and the web server is connected to an outdoor map server, a building database, and a building data store (building data warehouse) which manages individual folders in the second embodiment. Collectively, they can be said to constitute the hardware of a digital map system.

The outdoor map server is a server that provides map tiles to a web server to draw an outdoor map on a view when a user starts a digital map. For example, a service server of OpenStreetMap (www.openstreetmap.org) that provides tile service can be considered as an outdoor map server.

A building data store can be considered as a network attached storage (NAS) connected to the Internet, and can be more than one device or server as the number of users and content grows. In the building data store, building data including building outline drawings and floor plans per level are managed in individual folders for each building.

Figure 22:
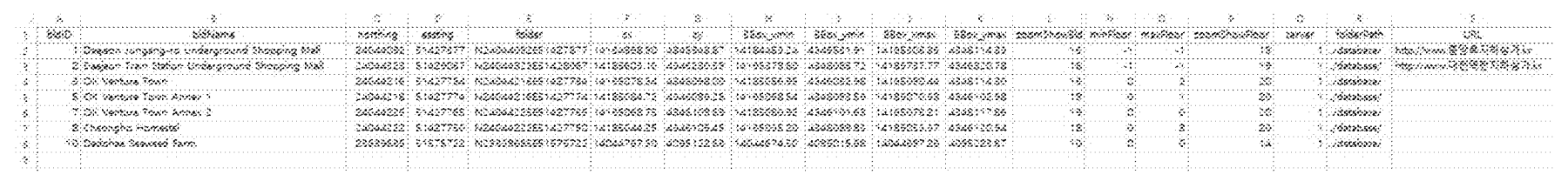

FIG. 22 is a building database simulated in Microsoft Excel, and has a form of a table in a relational database. The fields include building ID (bldID), building name (bldName), northing corresponding integer (northing) and easting corresponding integer (easting) of the representative point of a building, individual folder Name (folder), x-axis coordinate (cx) and y-axis coordinate (cy) of the representative point of a building, four boundary values of a minimum bounding box (BBox_xmin, BBox_ymin, BBox_xmax, BBox_ymax), zoom level for displaying the outline of a building (zoomShowBld), zoom level for showing the building name (not shown) (zoomShowLabel), lowest floor (minFloor), highest floor (maxFloor), zoom level for showing floor plan of a building (zoomShowFloor), server (server), common path (folderPath), and homepage address of a building (URL).

The northing corresponding integer and the easting corresponding integer are values obtained by rounding off the northing and the easting of the representative point of a building given by Eq. 4 and Eq. 5. A small and simple building such as OK Venture Town can use the centroid of the building's outline as a representative point, but it is not appropriate to use the centroid as a representative point for a large and complex building such as the Daejeon Jungang-ro Underground Shopping Mall. The centroid of Daejeon Jungang-ro Underground Shopping Mall is not even located within the outline of Daejeon Jungang-ro Underground Shopping Mall. Therefore, considering the structure of this underground shopping mall, the center of the underground plaza, which can be considered as a representative location, was selected as a representative point.

Once a representative point is determined, the northing and the easting are obtained by Eq. 4 and Eq. 5 from the latitude and the longitude of the representative point. However, this northing and easting are used to quickly investigate the approximate location of the building. Since a precision below the decimal point is not necessary in this case, the northing and the easting obtained by Eq. 4 and Eq. 5 can be rounded off and used. A database search can be performed quickly by using the northing corresponding integer $\overline{N}$ and the east-corresponding integer $\overline{E}$ which are rounded off values of the northing and the easting as main fields.

The northing corresponding integer and the easting corresponding integer are not only used when searching for a building, but also an individual folder name is automatically determined therefrom. Accordingly, the name of the individual folder for storing the outline drawing and the floor plans of the building is given as Eq. 20 or Eq. 21 as a character string from the location attribute including the geodetic latitude and the longitude of the representative point of the building.

$$P=N\{N\}E\{E\} \qquad \text{[Equation 20]}$$

$$P=N\{\overline{N}\}E\{\overline{E}\} \qquad \text{[Equation 21]}$$

Here, N and E are identification letters indicating northing and easting, respectively, and curly brackets { } are symbols indicating to replace the curly brackets with an actual value corresponding to the identification letter therein. The northing N and the easting E are real numbers with positive (+) values and have a unit of distance. Mutual conversion is possible between a pair of northing N and easting E and a pair of geodetic latitude ϕ and longitude λ. Also, $\overline{N}$ is a natural number obtained by rounding off the northing, and $\overline{E}$ is a natural number obtained by rounding off the easting.

In summary, all map setting data necessary for displaying an indoor map including floor plans of buildings on an outdoor map such as names and routes of individual folders and names of buildings are stored in the building database. That is, outline drawings of buildings, floor plans for each floor, or HTML files constituting the homepages of buildings are stored in individual folders, but it is the building database that relays user interaction in the digital map and the individual folders.

Figure 23:
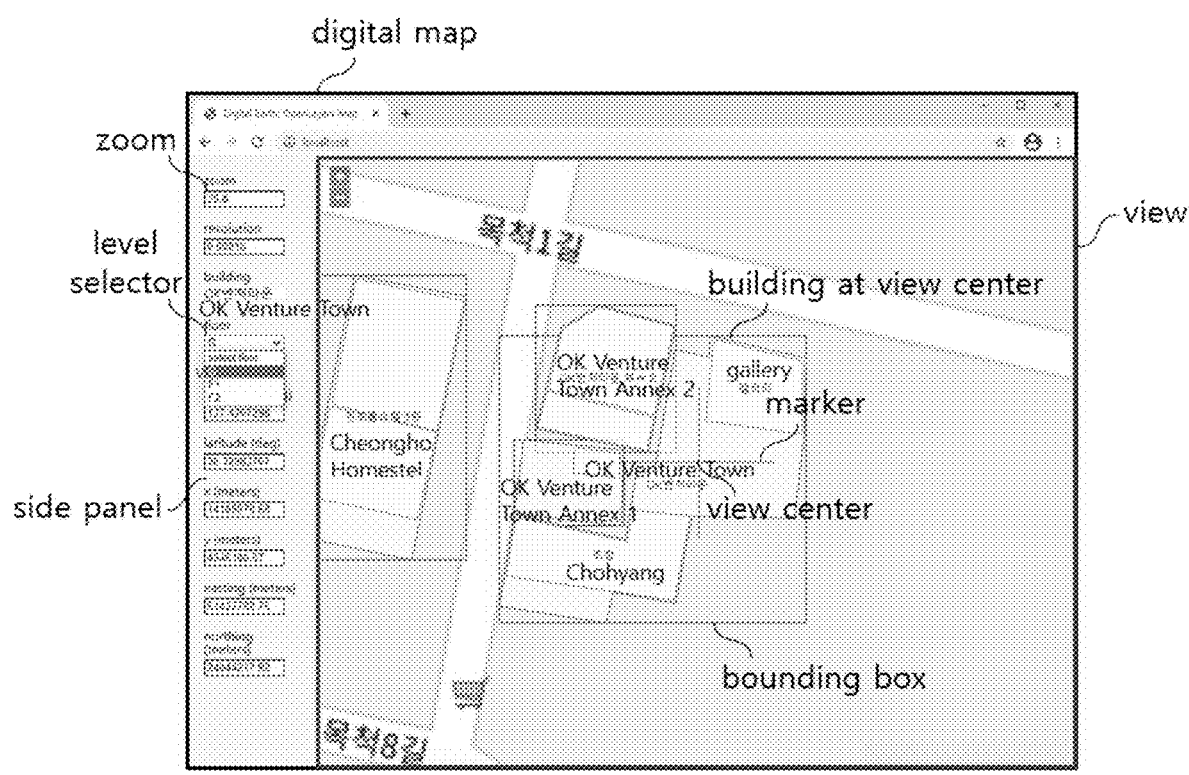
FIG. 23 is a drawing showing an example of a view of a digital map and a building at the view center.

FIG. 23 shows the main window of a digital map in the fourth embodiment of the present invention. The most essential element of a digital map is a view, and it is desirable to have a side panel to facilitate interaction with the user. In FIG. 23, the view has a rectangular shape, and the extent of the outdoor map shown on the view is called a view extent. The view extent can be expressed as the minimum and the maximum values of the longitude and the latitude on the view area, or equivalently, the minimum and the maximum values of the easting and the northing in the Web Mercator projection.

In addition, there is a cross-shaped marker at the center of the view, and the coordinates of the center of this view are all indicated as latitude and longitude, easting (x) and northing (y) in the Web Mercator coordinate system, and northing and easting given by Eq. 4 and Eq. 5. Web Mercator coordinates cannot be used above latitude 85°, but below that, it is possible to mutually convert between a pair of longitude and latitude and a pair of northing and easting given by Eq. 4 and Eq. 5.

OK Venture Town is seen at the center of the view in FIG. 23. When the center of the view is located within the outline of this building—referred to as the building at the view center—the name of the building is displayed on the left side panel, and since this building is a three-story building, a floor selection menu (level selector) appears for selecting a floor.

FIG. 23 also shows minimum bounding boxes containing the outlines of buildings therein. A minimum bounding box is used to quickly determine whether a building should be visible on the view or not. The coordinates of a minimum bounding box are calculated in advance and stored in the building database.

Figure 24:
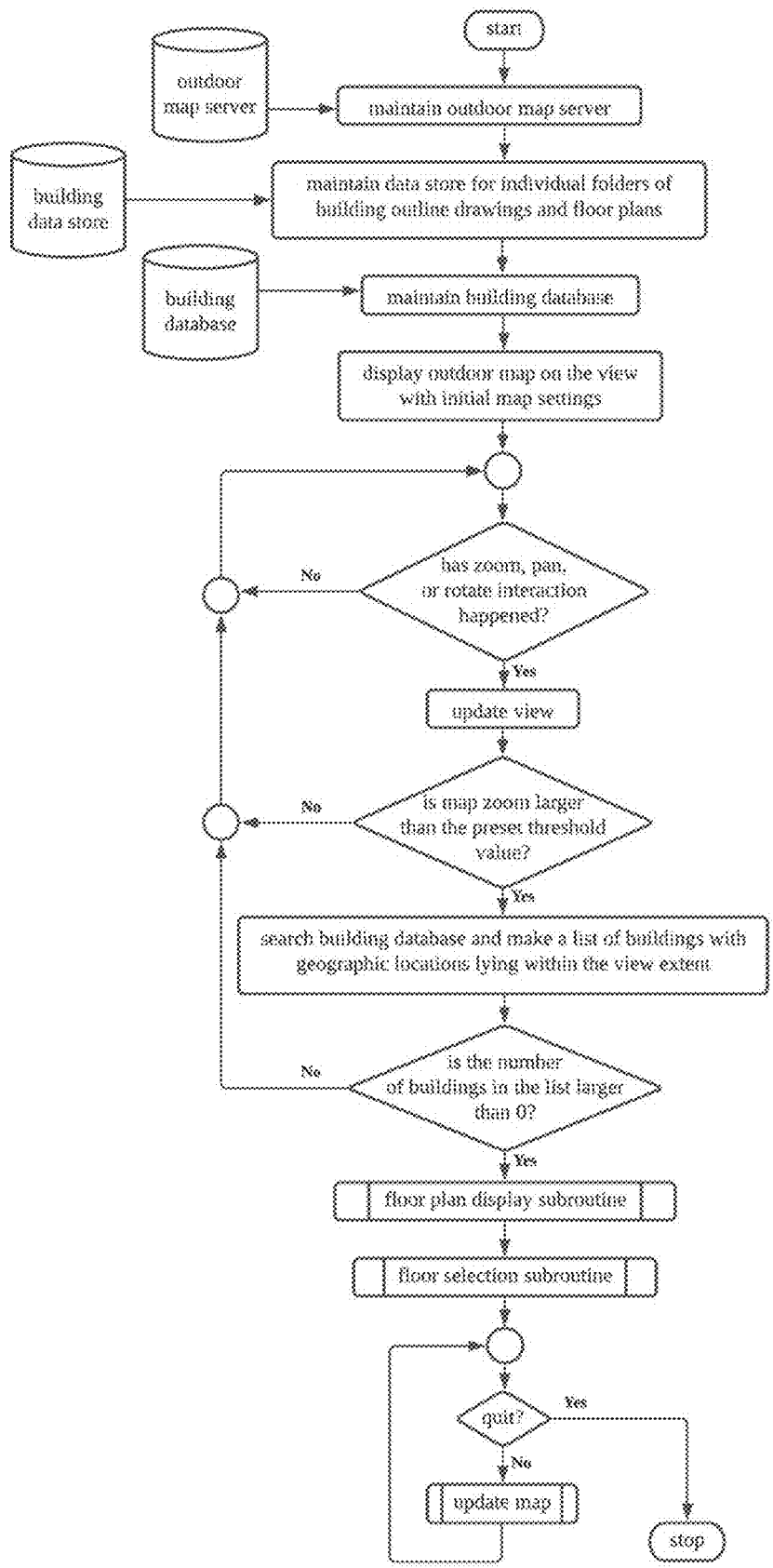
FIG. 24 is a flowchart showing the overall execution algorithm of the digital map in the fourth embodiment of the present invention.

As such, the fourth embodiment of the present invention provides away to integrally display an outdoor map and an indoor map including floor plans of buildings on a view of a digital map. FIG. 24 is a flowchart illustrating the entire process of displaying a digital map in the fourth embodiment of the present invention.

This includes a stage of maintaining an outdoor map server, and a stage of maintaining a data store that manages building outline drawings and floor plans of buildings in individual folders for each building, and a stage of maintaining a building database that manages map setting data of buildings.

The map setting data stored in the building database includes unique identification number of each building (primary ID, bldID), full path to an individual folder, floor number of the lowest floor (minFloor), floor number of the highest floor (maxFloor), zoom level for showing building outline (zoomShowBld), zoom level for showing floor plan (zoomShowFloor), northing corresponding integer $\bar{N}$ and easting corresponding integer $\bar{E}$.

It also includes a stage of showing the outdoor map on the view with an initial map setting when a user starts a digital map, and a stage of updating the view to match the user's zoom, pan and rotate operations. When the view is updated, not only the outdoor map is updated, but also the outlines and the floor plans of the buildings included in it are displayed in zoomed, panned and/or rotated state.

Preset data of a digital map include a preset zoom threshold value representing an absolute zoom value for displaying floor plans of buildings. For example, it is neither possible nor necessary to display all the floor plans of buildings in Korea when looking at a complete map of Korea. Accordingly, for example, a preset zoom level can be set to 14. In other words, only when the digital zoom is higher than a preset value, floor plans for some buildings are needed to be shown on the map. When the zoom of the digital map is greater than or equal to a preset threshold value as such, it includes a stage of searching the building database and creating a list of buildings whose geographic locations are lying within the view extent.

Figure 25:
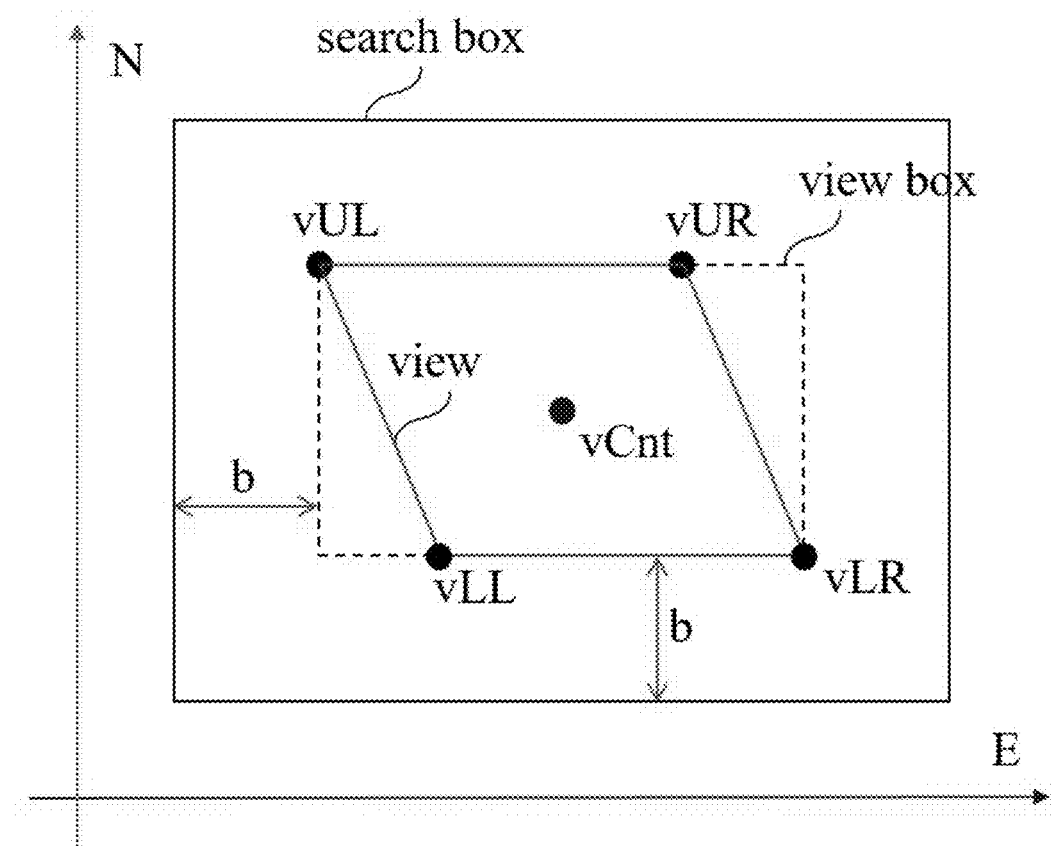
FIG. 25 is a conceptual diagram illustrating a process of searching a building database for buildings whose geographic locations are lying within the view extent.

FIG. 25 is a diagram for understanding this search range. In FIG. 25, the horizontal axis is the easting E given by Eq. 5, and the vertical axis is the northing N given by Eq. 4. The view given as a rectangle in the Web Mercator projection is given as a parallelogram in the coordinate system given by Eq. 4 and Eq. 5, and the center vCnt of the view is located at the center of the parallelogram.

A rectangle with a minimum area containing all the four corners of the view (vUL, vLL, vLR, vUR) will be referred to as a view box. Then, from the building database, a list of buildings is made whose northing and easting both fall within this view box. We will refer to this list as a view extent building list (bldIDsInExtent).

To be precise, this view extent building list (bldIDsInExtent) is the list of building ID (bldID) that were returned in the form of a JavaScript array whose northing corresponding integer and easting corresponding integer are located within the view box. The number of these buildings can be found as bldIDsInExtent·length in the JavaScript syntax. In JavaScript, the index of an array starts from 0, so the index of this array ranges from i=0 to i=(bldIDsInExtent·length−1).

However, it may be advantageous to extend the search range of the building database to a wider area than the view box by giving a buffer to the search range in all directions by a distance b. We will call this rectangle a search box. Expanding the search range to this search box corresponds to searching buildings outside the view in advance, thus it reduces data loading time, and makes the digital map to respond more smoothly to zoom, pan, and rotation operations.

Therefore, the view extent building list (bldIDsInExtent) in the fourth embodiment of the present invention is to create a list of buildings, of which the geographic locations are lying within the view extent, but the search condition is not applied strictly. In fact, in the process of searching for buildings, the important thing is that there are no missing buildings, and it does not cause much problem if buildings outside the view have been searched. If buildings within the view extent cannot be searched, it corresponds to a serious error because buildings to be displayed on the view have not been searched. On the other hand, searching unnecessary buildings is only a small waste of memory at best.

For this reason, the view extent building list (bldIDsInExtent) is not searched under strict conditions, and even if there are unnecessary search results, there should be no missing buildings, and the search should be executed quickly. Therefore, instead of using the latitude and the longitude of the representative point of a building or equivalently using the northing and the easting, the northing corresponding integer and the easting corresponding integer are used, and the search range is not limited within the boundary of the view given as a parallelogram, but is expanded into a view box or a search box.

Figure 26:
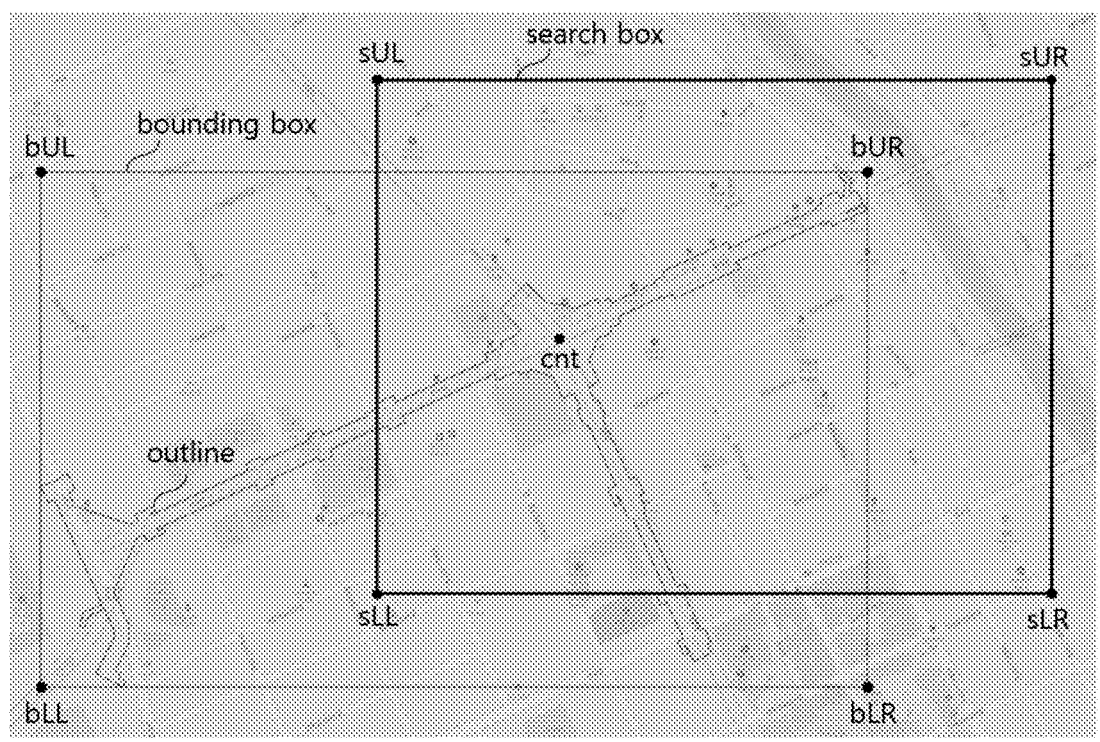
FIG. 26 is a conceptual diagram for understanding an algorithm for investigating whether the geographical location of a building is lying within the view extent.

FIG. 26 is a diagram for understanding an algorithm for investigating whether a specific building is located within the search box. The building outline shown in FIG. 26 is the outline of the Daejeon Jungang-ro Underground Shopping Mall. Representative point of this outline is marked as cnt. In this case, the simplest method is to investigate whether this representative point (cnt) is lying within the search box.

However, this method can cause problems when the shape of the building is complicated or the building has a significant size compared to the view. A more sophisticated method is as follows. First, the four vertices (sUL, sLL, sLR, sUR) of the search box are obtained. Also, the four vertices (bUL, bLL, bLT, bUR) of the minimum bounding box of the building are obtained. Next, it is checked whether any of the four vertices of the search box is lying within the minimum bounding box. Also, it is checked whether any of the four vertices of the minimum bounding box is lying within the search box. If any of these 8 tests is passed, the building is judged as lying within the view extent, otherwise it is judged as lying outside. Here, instead of using the four vertices of the search box (sUL, sLL, sLR, sUR), we can also use the four corners of the view (vUL, vLL, vLR, vUR).

If the number of buildings in the view extent building list obtained in this way is greater than 0 (bldIDsInExent·length>0), a floor plan display subroutine for displaying floor plans on the view and a floor selection subroutine comprising a stage of displaying a floor selection menu are launched.

Figure 27:
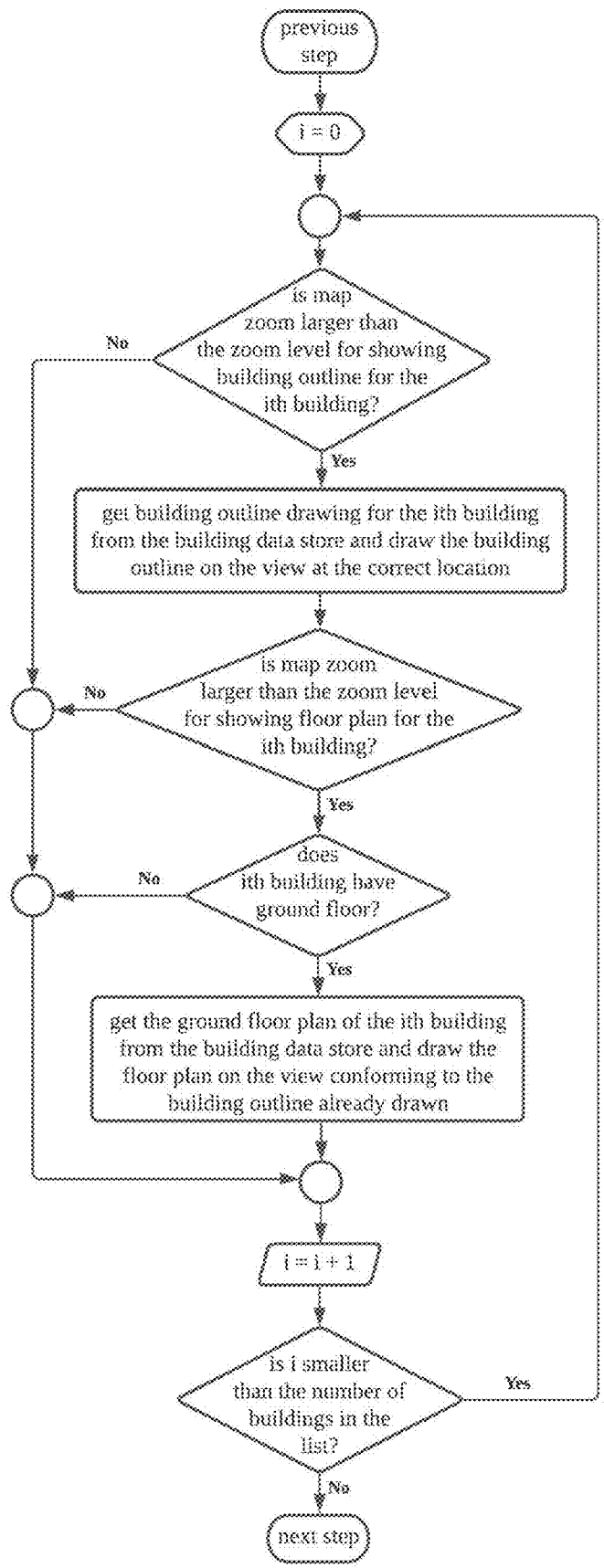
FIG. 27 is a flowchart of floor plan display subroutine.

FIG. 27 is a flowchart illustrating a floor plan display subroutine for displaying floor plans on the view for the first time. If the number of buildings in the view extent building list is greater than 0, a circular loop such as for loop starts, and the for loop starts with the first building in the list (i=0). The ID of this first building is given as bldIDsInExtent[0] and the ID of the last building is given as bldIDsInExtent[bldIDsInExtent·length−1].

The view extent building list (bldIDsInExtent) is a list of buildings, of which the center coordinates of the buildings, or all or part of the buildings are located within the view and registered in the building database. However, some buildings may be too small to be displayed at this zoom level. Therefore, for the buildings in this list, the outline of a building is displayed only when the zoom level of the digital map is larger than the individual zoom level for displaying the outline of that building (zoomShowBld). In addition, a list of buildings, of which building outlines are to be displayed—hereinafter referred to as a building outlines to show (bldIDsToShow)—is extracted from the view extent building list and managed.

If this building, that is, the $i^{th}$ building, is a building in the building outlines to show (bldIDsToShow), the outline drawing of this building is retrieved from the data store and added to the buildingLayer. This outline drawing can be created in the GeoJSON format or in other vector formats, but the GeoJSON format is the most compatible one.

The building outlines should be given as closed curves or polygons. However, since the GeoJSON format does not allow curves, in reality, they must be given only as polygons. If an outline is given as a polygon, it can be determined whether the view center is inside or outside the polygon. In the GeoJSON format, the types of shapes are limited to point, line, polygon and their plurals. Therefore, this outline drawing is given as a Polygon or MultiPolygon, and a polygon is completed by specifying the positions of multiple points and the order of connecting the points with lines, and finally connecting the first point and the last point.

The coordinates of these points are given in the form of [easting, northing] in the Web Mercator coordinate system or [longitude, latitude]. In JavaScript, square brackets [ ] mean an array. So when we add this outline drawing to the building layer (buildingLayer), it is automatically added at the correct place.

Next, for each building in the building outlines to show (bldIDsToShow), if the zoom level of the digital map is greater than the zoom level for displaying label (zoomShowLabel), where the building label includes the name of the building, the building label is added to the building label layer (bldLabelLayer).

Next, for each building in the building outlines to show (bldIDsToShow), it is investigated whether the zoom level of the digital map is larger than the zoom level for displaying floor plan (zoomShowFloor), and for a building with the zoom level of the digital map larger than the zoom level for displaying floor plan, it is investigated again whether the building has a ground floor. This can be found by examining whether the lowest floor (minFloor) of the building is less than or equal to 0 and the highest floor (maxFloor) is greater than or equal to 0.

Next, create a list of buildings that have passed both of these tests—hereinafter referred to as floor plans to show (floorplanIDsToShow)—and for the buildings in this list, the floor plans of the ground floor are retrieved from the data store and displayed conforming to the building outlines. Since the locations of points in these floor plans are all given in the form of [easting, northing] in the Web Mercator coordinate system or [longitude, latitude], when floor plans of the ground floor are added to the floor plan layer (floorLayer), the outdoor map, the outline drawings of the buildings and the floor plans of the ground floor are all displayed at the correct location.

Figure 28:
FIG. 28 and FIG. 29 are examples of running a digital map in the fourth embodiment of the present invention.

FIG. 28 shows an execution screen of a digital map. When zoom is 15.9, it is investigated whether there are buildings in the view extent, but because the individual setting value (zoomShowBld) for displaying the outline of the building is larger than this value, no buildings are actually displayed. Therefore, although there are buildings in the view extent building list (bldIDsInExtent), no buildings are included in the list of building outlines to show (bldIDsToShow).

Figure 29:
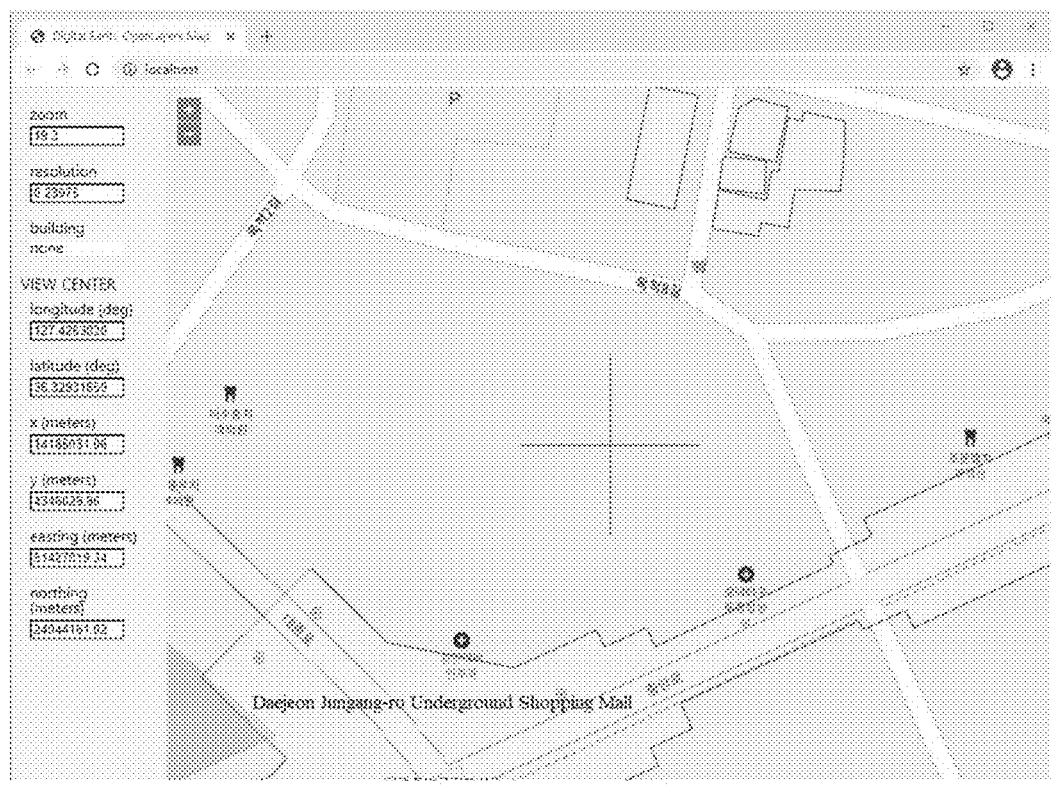

In FIG. 29, the zoom is increased to 19.3, and in this case, five buildings (Daejeon Jungang-ro Underground Shopping Mall, OK Venture Town, OK Venture Town Annex 1, OK Venture Town Annex 2, and Cheongho Homestel) are visible. Therefore, the building outlines to show (bldIDsToShow) contain 5 buildings. However, since there is no building at the center (crosshairs) of the view, 'none' is displayed in the building field on the side panel.

Figure 30:
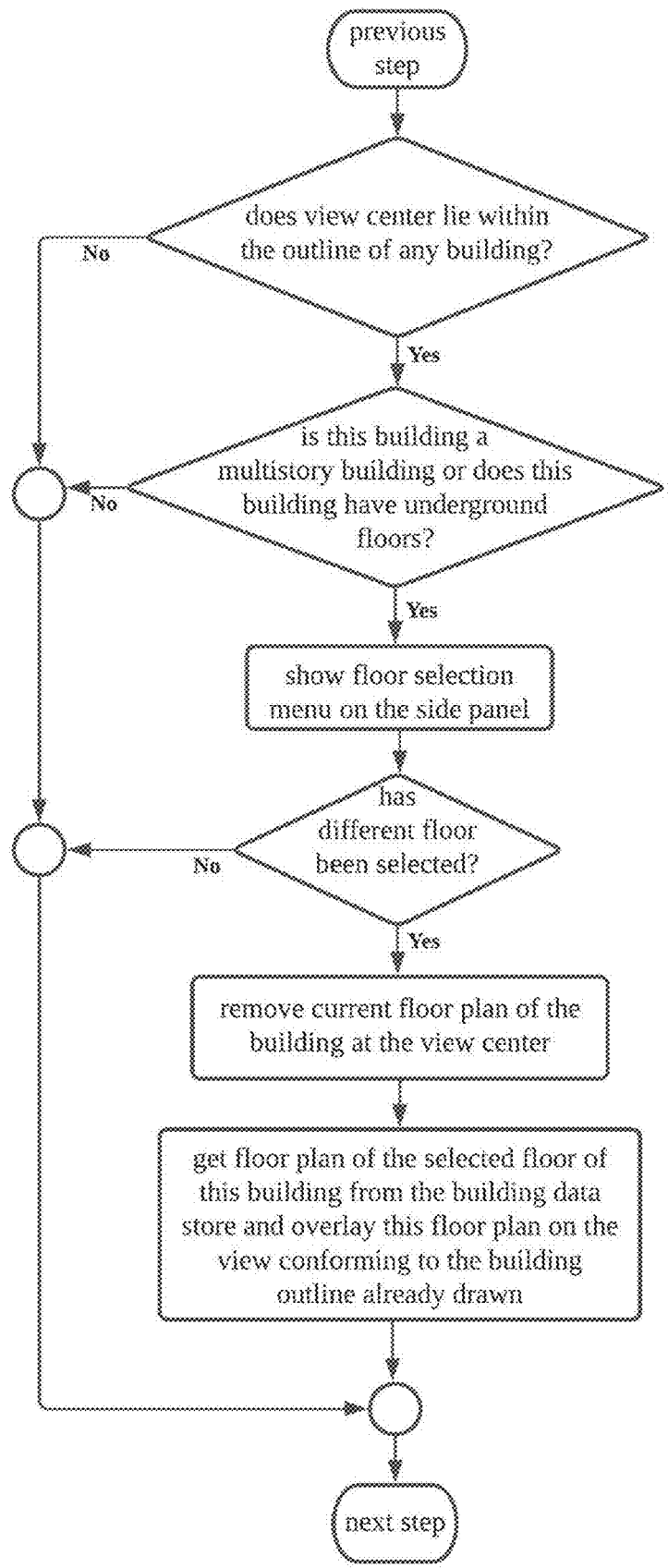
FIG. 30 is a flowchart of a floor selection subroutine.

FIG. 30 shows a floor selection subroutine. This subroutine includes a stage of checking whether there is a building—hereinafter referred to as a building at the view center—of which the view center is located within the building outline. Specifically, this is a stage of investigating which one among the outline drawings in the building layer (buildingLayer) is at the coordinate of the center of the view. If there is no building at the view center, this stage ends and moves on to the next stage.

Figures 31, 32:
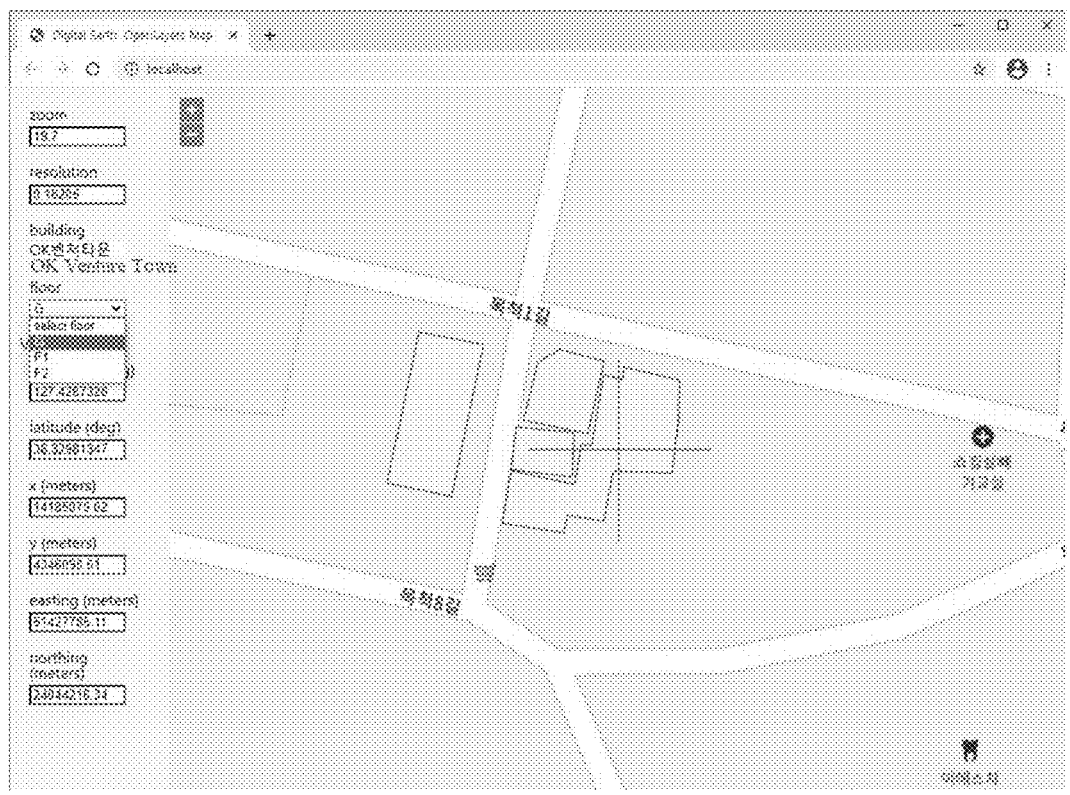
FIG. 31 is a drawing showing an example of storing a building outline drawing in the GeoJSON format.
FIG. 32 to FIG. 36 are examples of executing a floor selection subroutine in a digital map.
Figure 33:

FIG. 31 is the outline of the Daejeon Jungang-ro Underground Shopping Mall stored in the GeoJSON format. This outline drawing is stipulated in MultiPolygon, and the coordinates are given in the longitude-latitude coordinate system (CRS84), and it uses $8^{th}$ decimal places so that the distance precision on any location on the Earth is 1 mm or less. In addition, the properties of this outline file include the ID of the building (bldID) and the name of the building (bldName).

When such a building at the view center is found, a stage is initiated for extracting the building ID (bldID), and after searching the building database with extracted building ID, it displays a floor selection menu if there are basement levels or if this is a multistory building. In addition, when a user selects a floor other than the ground floor, the currently displayed floor plan of the building at the view center is removed, and the floor plan of the selected floor is retrieved from the data store and displayed to overlap with the building outline at the view center.

In FIG. 31, the outline drawing of the building was prepared in the GeoJSON format, but it is difficult to create a beautiful drawing as seen in an apartment sale advertisement in the GeoJSON format. In this case, the floor plans of buildings may be prepared in SVG (Scalable Vector Graphics) format and displayed on a separate canvas layer.

Figure 34:
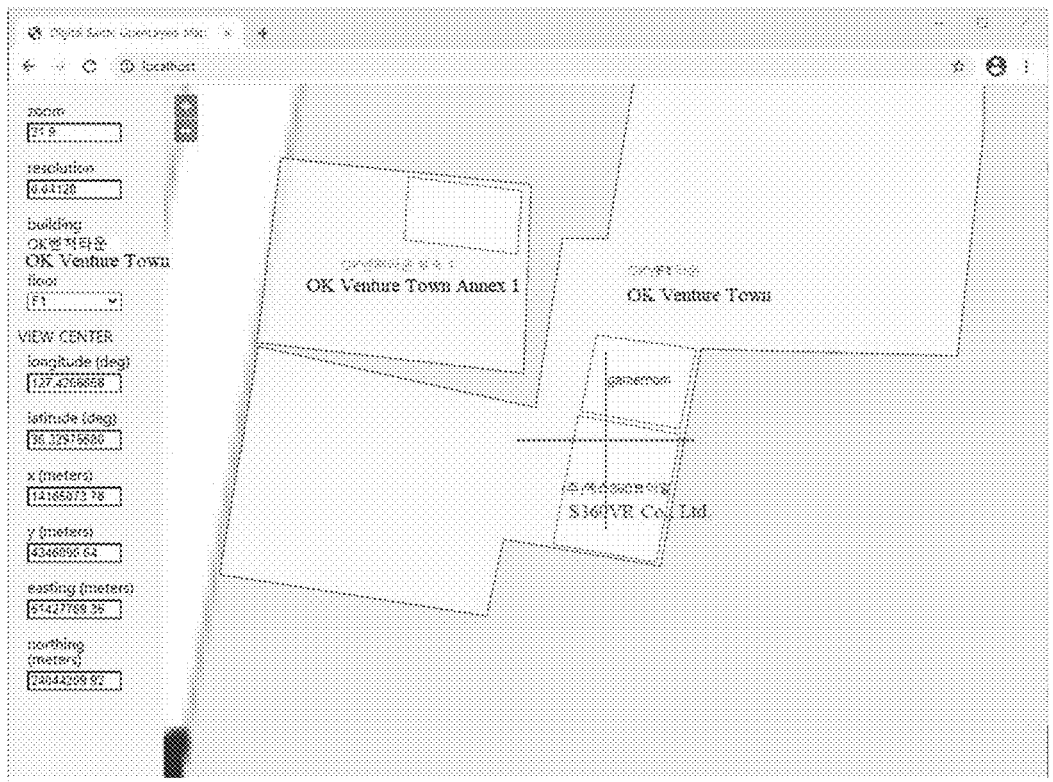

FIG. 32 to FIG. 36 show examples where the floor selection algorithm is executed in a digital map system. In FIG. 32, the center of the view (center of the crosshair) is located within the outline of a building, and the name of the building is displayed as 'OK Venture Town' on the left side panel, and in the floor menu below, 'G', 'F1' and 'F2' floors are to be seen as a drop-down menu. As the zoom is increased to 20.7 in FIG. 33, the names of the buildings and the floor plans of the first floor (G) are displayed. In FIG. 34, when the floor is changed from the 'G' floor to the 'F1' floor for the building at the view center, that is, OK Venture Town, the floor plan of the first floor is removed and the floor plan of the second floor is displayed.

Figure 35:
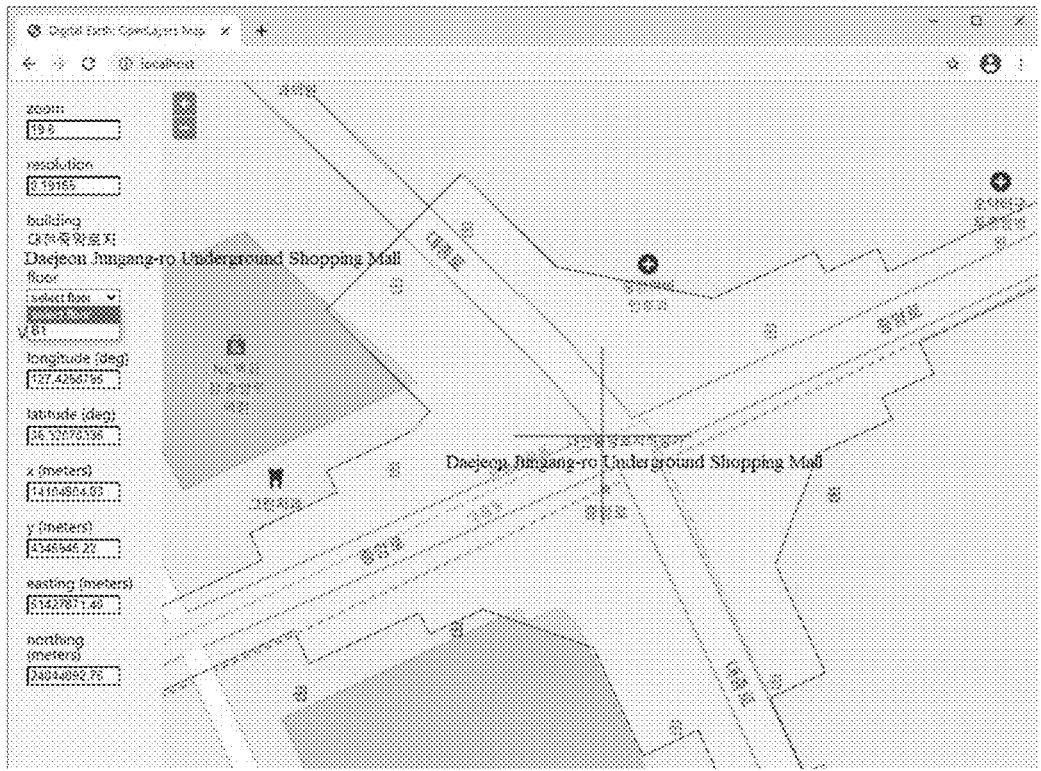
Figure 36:
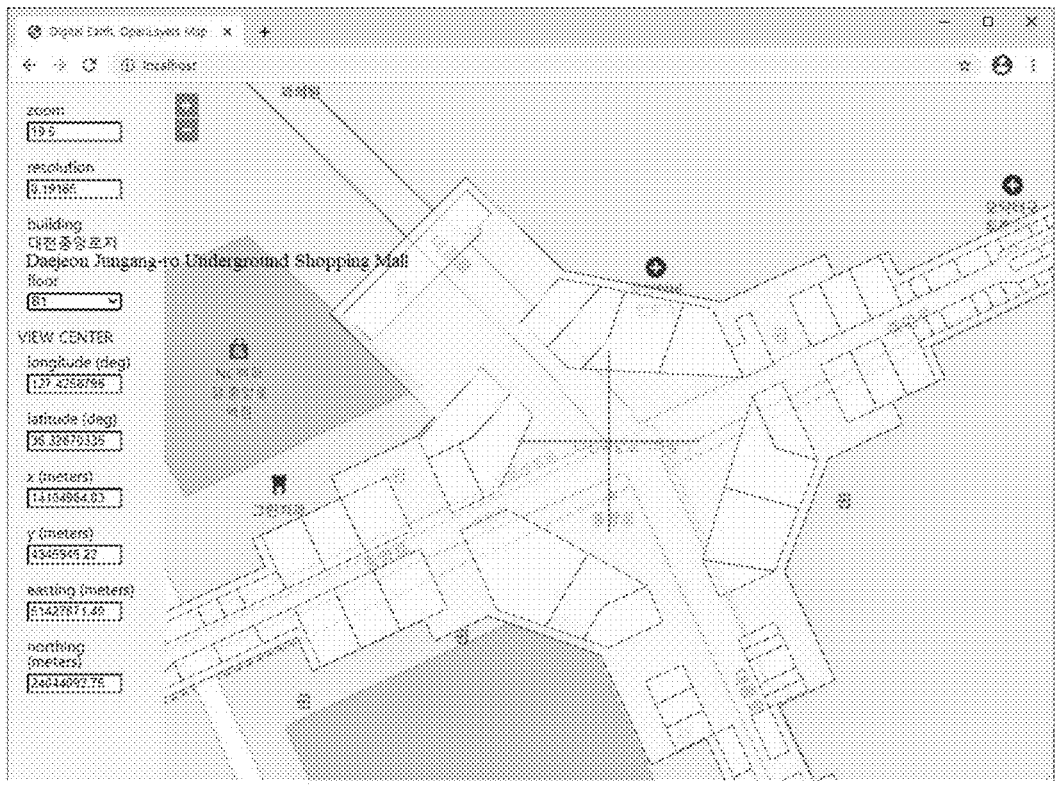

In FIG. 35, when the center of the view is located within the outline of the Daejeon Jungang-ro Underground Shopping Mall, the building is also displayed as 'Daejeon Jungang-ro Underground Shopping Mall', and it can be seen that the 'B1' floor is selectable on the floor selection menu. However, since there is no ground floor (first floor) in the Daejeon Jungang-ro Underground Shopping Mall, floor plan does not appear no matter how large the zoom becomes. If the floor is changed to 'B1' in FIG. 36, after confirming that the zoom level is capable of displaying a floor plan, the floor plan of the first basement level is displayed in conformity with the outline of the underground shopping mall.

What has been explained so far is a flowchart from the start of a digital map until a floor plan of a building appears for the first time. After that, if zoom, pan, and rotate operations occur again, then the map update process, such as adding new floor plans, moving existing floor plans, or removing some of the existing floor plans, may repeat the aforementioned processes. In other words, after initializing all the view extent building list (bldIDsInExtent), the building outlines to show (bldIDsToShow), and the floor plans to show (floorplanIDsToShow) to 0, and removing all the outline drawings and the floor plans on the view, it can be started again from the view update process.

However, it is very inefficient to remove all the building outline drawings and floor plans and draw anew every time user interaction occurs. So, the map update process is similar to the processes so far, but the floor plan display subroutine is mainly different, and in addition to the view extent buildings list (bldIDsInExtent) and the building outlines to show (bldIDsToShow) and the floor plans to show (floorplanIDsToShow), it is better to use an algorithm that maintains and updates the list of buildings, of which buildings outlines are in display—hereinafter referred to as building outlines in view—(bldIDsInView) and the list of buildings, of which floor plans are in display—hereinafter referred to as floor plans in view—(floorplanIDsInView), separately. That is, when the view is changed, after the view extent building list (bldIDsInExtent) and the building outlines to show (bldIDsToShow) are newly prepared, a stage is initiated wherein the existing building outline drawings are deleted or updated or new building outline drawings are added after comparing with the existing building outlines in view (bldIDsInView), and the same stage is initiated with respect to the floor plans.

A digital map system that performs such functionalities includes an outdoor map server, a data store that manages building outline drawings and floor plans of buildings in individual folders for each building, a building database that manages map setting data of buildings, and a computer program stored in a medium for executing a series of stages to integrally display an outdoor map and an indoor map including floor plans of building on the view of the map.

The above series of stages comprises starting a digital map with initial map settings and displaying the outdoor map on the view, and updating the view in response to the user's zoom, pan, and rotate operations, creating view extent building list (bldIDsInExtent) of the buildings, of which the geographic locations are lying within the view extent, by searching building database if the zoom of the digital map is greater than or equal to a preset threshold zoom value, and launching a floor plan display subroutine and a floor selection subroutine if the number of buildings in the view extent building list is greater than zero.

Fifth Embodiment

An Internet link serves to redirect to another Internet page when a string, a diagram, an icon, a photograph, or a picture is clicked. Even on Google or Naver maps, if we click on a store's name or icon, the store's mini-homepage appears in a popup window, and the mini-homepage often has another link to the store's official homepage.

However, a large shopping mall may have hundreds of stores. Therefore, when a user surfing the Internet online tries to browse the stores of a large shopping mall, he/she must click hundreds of links. If the user wants to browse hundreds of stores without having to do such a chore, we need a different technology.

The method of launching a pop-up window on a digital map is based on two premises. The first is that the user makes his/her choice clear by clicking on the link of the store of interest, and the second is that the user sees one pop-up window at a time. However, if we want to browse hundreds of stores at the same time, the mini-homepages of all the stores must be displayed simultaneously so that there is no need for the user to select the store of interest in this process. And if not just one but many mini homepages are displayed at the same time, it is necessary to distinguish which mini homepage belongs to which store.

The most desirable way to implement such a functionality is to simultaneously display the mini-homepages of every store within the shop boundary of each store. If we run Google or Naver maps, each store doesn't appear big enough to have a mini-homepage in it. However, this is because the map service provider has set the maximum zoom value of the digital map, and there are no technological restrictions to make it happen that a shop or a space that is visible only as a small square on an ordinary map is large enough to fill an entire computer monitor.

Such a functionality can be most preferably implemented as follows. Even if a user does not click on the business names or the mini homepages of stores, mini homepages of every store appear within the boundaries of each store visible on the view of the digital map, and if the user pan the map, the mini homepages also move accordingly, and if the user zoom-in on the digital map, the mini homepages are also enlarged, but they must not be expanded beyond the boundaries of each store.

Pop-up windows that appear on Google Maps or other digital maps are using overlay technology. OpenLayers (https://openlayers.org/en/latest/apidoc/module-ol_Overlay-Overlay.html) defines an overlay as follows.

An element to be displayed over the map and attached to a single map location. Like module:ol/control Control~Control, Overlays are visible widgets. Unlike Controls, they are not in a fixed position on the screen, but are tied to a geographical coordinate, so panning the map will move an Overlay but not a Control.

Therefore, by using such an overlay technology, it is possible to solve the part where the mini homepages should move with the map. Although Google and Naver maps use the same technology to display pop-up windows as in OpenLayers, it is difficult to conclude that the same overlay technology is necessarily used at a certain point in time because the construction of the map changes so frequently.

However, as we can see when we run Google or Naver maps, even if we zoom-in on the map, the pop-up windows are not enlarged together, and this is also the case in OpenLayers. This is because overlays are basically designed to act like small signs or information boards.

Let's assume that a sign that says '200 m to the top' on a hiking trail has been implemented on a digital map using overlay technology. As long as the zoom is high enough to show the overlay, it is desirable to display the overlay in the same size regardless of the exact zoom level of the map. If the font size of the text on the sign board is changed as the zoom is changed, it will be rather inconvenient to read. Therefore, if the overlay technology is used to solve the panning problem, an algorithm capable of adjusting the size of an HTML page is required.

FIG. 37 is a diagram for understanding a method of displaying a responsive HTML page within the boundary of any one space in the fifth embodiment of the present invention, and FIG. 38 is an exemplary JavaScript code for generating an HTML page overlay. As illustrated in FIG. 37, a space does not necessarily have a rectangular shape, but has a general polygonal shape or more generally a shape of a closed curve. The only conditions necessary for a place to be specified as a legitimate space are that it has a fixed location attribute on the Earth, and that it has a finite area and a boundary. The location attribute is given as a pair of latitude and longitude of a representative point in space, or a pair of northing and easting, and optionally a floor number.

In FIG. 37, x and y indicate map units which in this case mean easting and northing in the Web Mercator coordinate system. And, the representative point is usually given as the centroid of the shape representing the space, and is indicated by cnt in FIG. 37 and FIG. 38 (FIG. 38: line 5).

Next, considering the shape and the size of the space, a rectangular region is designated that is located within the space and has a center that coincides with the centroid of the space and does not go over the boundary of the space. The width of this rectangle in map unit is width$_M$, and the height is height$_M$. In FIG. 38, the width and the height are 7 m and 11 m, respectively (line 7 and line 9). Since these are distances in map unit, there will be some differences with the actual distances. As described above, in the Web Mercator projection, the ratio of the distance on the map to the distance on the actual surface of the Earth varies according to latitude. In any case, if the size of the rectangle is set in the same map unit as the space, such anomaly is not felt.

Next, the resolution is calculated from the view of the digital map. Here, a resolution refers to the ratio of map units per pixel on the screen. In OpenLayers, the resolution can be obtained with the map.getView( ).getResolution( ) command (line 11). Once the resolution was obtained in this way, the size of the rectangle on the computer screen, that is, the width and the height in pixels, can be obtained as in Eq. 22 and Eq. 23 (lines 13 and 15).

$$\text{width} = \frac{\text{width}_M}{\text{resolution}} \quad \text{[Equation 22]}$$

$$\text{height} = \frac{\text{height}_M}{\text{resolution}} \quad \text{[Equation 23]}$$

Next, an iframe element is created in the document with a name of container (line 17). A document is the top-level object in the DOM (document object model). All the elements we see on a computer screen are hierarchically attached to a document. MDN Web Docs (https.//developer.mozilla.org/en/docs/Web/APLDocument) describes a document as follows:

The Document interface represents any web page loaded in the browser and serves as an entry point into the web page's content, which is the DOM tree. The DOM tree includes elements such as <body> and <table>, among many others. It provides functionality globally to the document, like how to obtain the page's URL and create new elements in the document.

In addition, an iframe is an element for inserting an HTML page into an HTML page in HTML5 grammar. The width and the height of this iframe element are designated by the width and height given by Eq. 22 and Eq. 23, respectively (lines 18-19).

Next, a responsive HTML page prepared in advance is designated as the source (src) of the iframe element (line 20). It was assumed that this HTML page is a file named index.html in a folder named 'popup', and in order to run responsively, the width and the height are specified as 100% in the CSS properties of this HTML page. If we specify this way, the size of the HTML page automatically becomes the same as the size of the container. After the preparation of the iframe element is completed in this way, the iframe element is appended to the document as a child node (line 22).

Next, an overlay is created (line 24). Considering the case of using multiple overlays, an ID is assigned to the overlay (line 25). The iframe element is designated as an element of the overlay (line 26). Position the overlay at the center of the rectangle (line 27), and set the positioning property to center-center (line 28). By specifying the alignment property in this way, the center position of the overlay coincides with the center position of the iframe element. Finally, the overlay is added to the digital map (line 31).

Figure 39:
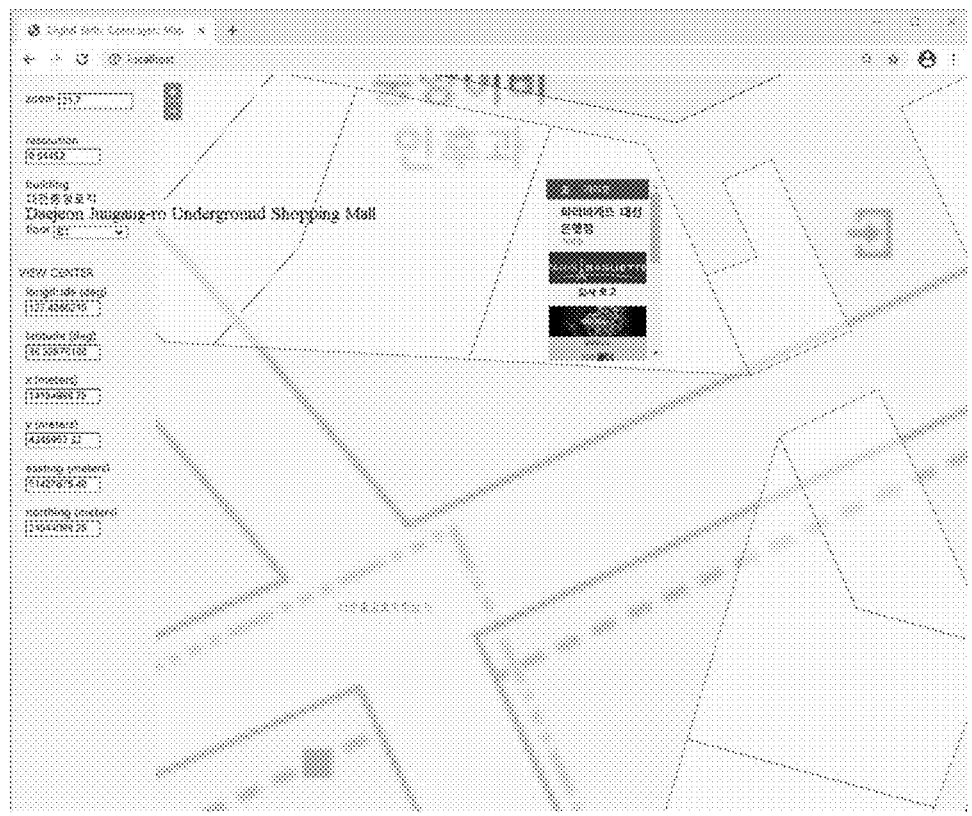
FIG. 39 to FIG. 41 are exemplary screens of playing a digital map.
Figure 40:
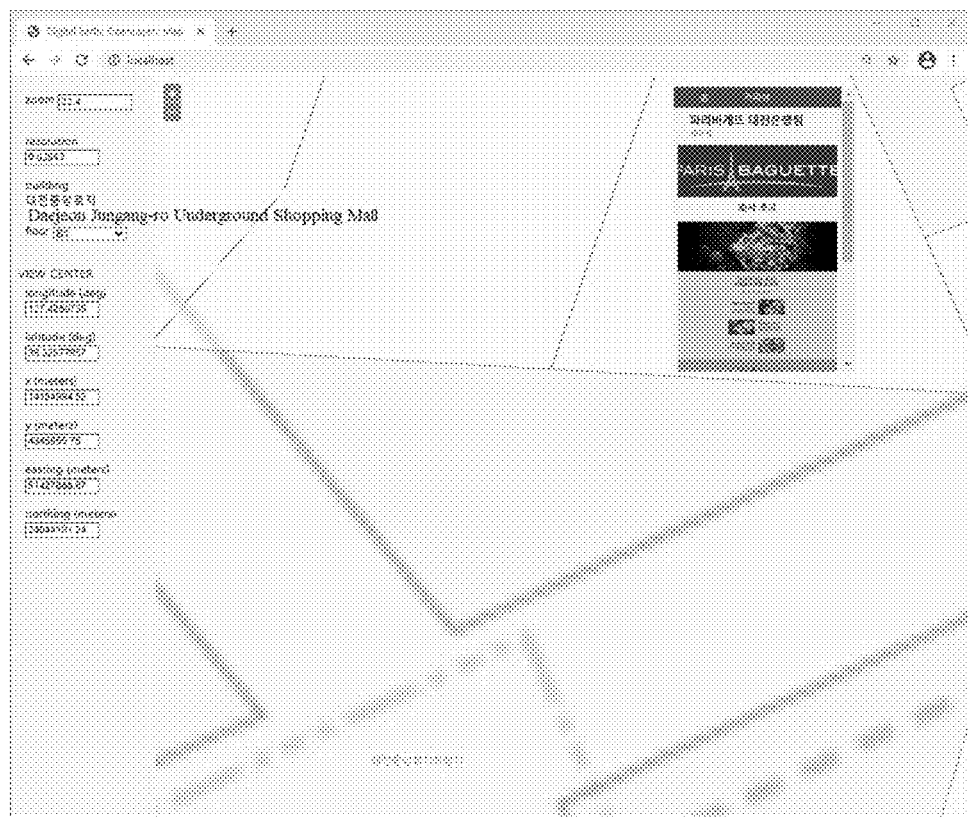

FIG. 39 shows an exemplary digital map on which a responsive HTML page generated in this way is displayed. And, when there is a user's zoom, pan, or rotation interaction, the resolution is newly calculated and the width and the height of the iframe element are newly calculated and updated. The size of the physical space is independent of user interaction. Therefore, width$_M$ and height$_M$ do not change, but the resolution is changed as the view is changed. Therefore, whenever there is a user interaction, if only the resolution and the width and the height of the iframe element are newly updated, the digital map and the responsive HTML page are interlocked. In FIG. 40, as the zoom of the digital map is increased, the responsive HTML page is also enlarged, but as in FIG. 39, it can be seen that it is confined within the boundary of the store.

The essence of the fifth embodiment of the present invention is a method of displaying a responsive HTML page on the view of a digital map. This method comprises specifying a rectangular area on the view, obtaining the resolution of the view, dividing the width and the height of the rectangle in map units by the resolution of the view, respectively, to obtain the width and the height in pixels, creating an iframe element in the document, specifying the width and the height of the iframe element as the width and the height in pixels obtained in the previous step, respectively, designating a prepared responsive HTML page as a source (src) of the iframe element, appending the iframe element as a child node on the document, creating an overlay, designating the iframe element as an overlay element, positioning the overlay at the center of the rectangle, specifying the positioning property of the overlay as center-center, and adding the overlay to the digital map.

In addition, when a zoom, pan, or rotate event occurs due to user interaction, series of stages are launched including a stage of newly obtaining the resolution of the view, a stage of dividing the width and the height of the rectangle in map units by the resolution of view to obtain a new width and height in pixels, and a stage of updating the width and the height of the iframe element with the width and the height in pixels obtained in the previous step.

Figure 41:
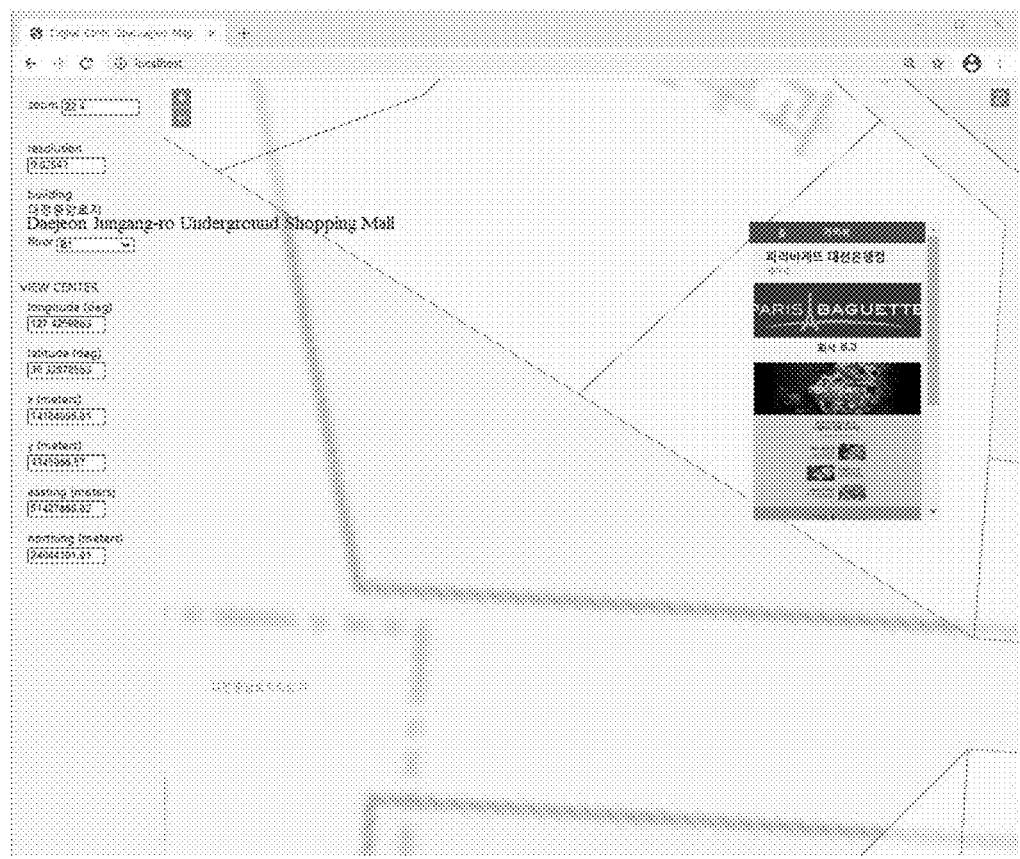

FIG. 41 shows a state in which the map is rotated. Unlike other raster tiles or vector geometry added to the layer of a digital map, even if the map is rotated, the overlay does not rotate and maintains the orientation. Considering that the overlay is meant to be used for signage purposes, this is of course a desirable feature. This is also true when we want to display an HTML page, such as a store's homepage, rather than a signpost.

However, another problem is found in FIG. 41. In FIG. 40, the HTML page was confined within the boundary of the space. In FIG. 41, however, when the map was rotated, the space was rotated as well, but the overlay was not rotated accordingly. So, the HTML page was spilled out beyond the boundary of the space. In this case, it won't be a problem because crossing the boundary was not significant in amount and there were no other HTML pages around. But if we display the mini-homepages of all the stores in a place where stores are densely packed such as in a shopping mall, problems may occur as the map is rotated.

Figure 42:
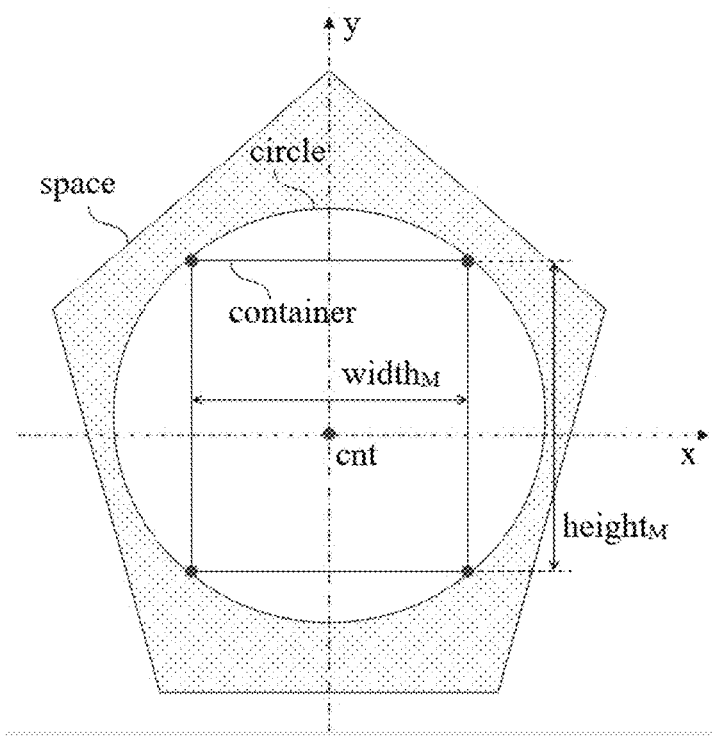
FIG. 42 is a drawing illustrating a method for ensuring that a responsive HTML page does not cross the boundary of space regardless of the rotation of the digital map.

FIG. 42 is a diagram illustrating a method for ensuring that a responsive HTML page does not cross the boundary of a space regardless of the rotation of the digital map. In this method, for a space whereon to display a responsive HTML page, a circle with a maximum diameter confined within the boundary of the space is first calculated. Next, a rectangle is designated, of which four vertices are lying on the perimeter of the circle. After that, the width ($width_M$) and the height ($height_M$) of this rectangle in the map units are calculated, and the resolution of the view is obtained, and the width and the height in the map units are divided by the resolution of the view to obtain the width and the height in pixels. If the width and the height of the iframe element are updated with the values obtained in this way, the HTML page does not cross the boundary of the space even when the view is rotated. FIG. 43 shows an execution screen of a digital map using this method.

A digital map system with this functionality has a program stored in a medium to execute a series of stages to display responsive HTML pages on the view of the digital map.

Sixth Embodiment

The algorithm is simpler in the case of displaying an Internet link, rather than displaying a responsive HTML page within the boundary of a space on a digital map. FIG. 44 shows an example of JavaScript code for displaying an Internet link on the view.

First, a representative point on each space is designated in order to display an Internet link within the boundary of each space (line 5). The position where the Internet link will be displayed on the view is called an anchor position. Further stages include a stage of creating an anchor element in the document (line 7), a stage of specifying a string to be used as a link (line 9), a stage of creating a text node in the document having the said string (line 10), a stage of appending the text node on the anchor element as a child element (line 11), a stage of specifying an Internet address to be connected by the Internet link (line 12), a stage of designating the specified Internet address as the href of the anchor element (line 13), a stage of specifying the target attribute of the anchor element as a new window (_blank) (line 14), a stage of appending the anchor element on the document as a child node (line 15), a stage of creating an overlay (line 16), a stage of designating the anchor element as an overlay element (line 18), a stage of positioning the overlay at the anchor position (line 19), specifying the positioning property of the overlay as center-center (line 20), and adding the overlay to the digital map (line 22).

Seventh Embodiment

When all of the technologies from the first to the sixth embodiments of the present invention are used, a new type of online platform can be provided integrating websites related to spaces having location attributes into a digital map to replace the existing portal sites. This digital map based online platform comprises an outdoor map server, a data store that manages digital files related to buildings including floor plans of buildings and digital files related to spaces in individual folders for each building and space, a building database that manages map setting data of buildings, a space database that manages map setting data of spaces, and a computer program stored in a medium executing a series of stages to integrally display an outdoor map, an indoor map including floor plans of buildings, Internet links, and responsive HTML pages on the view of the digital map.

Figure 45:
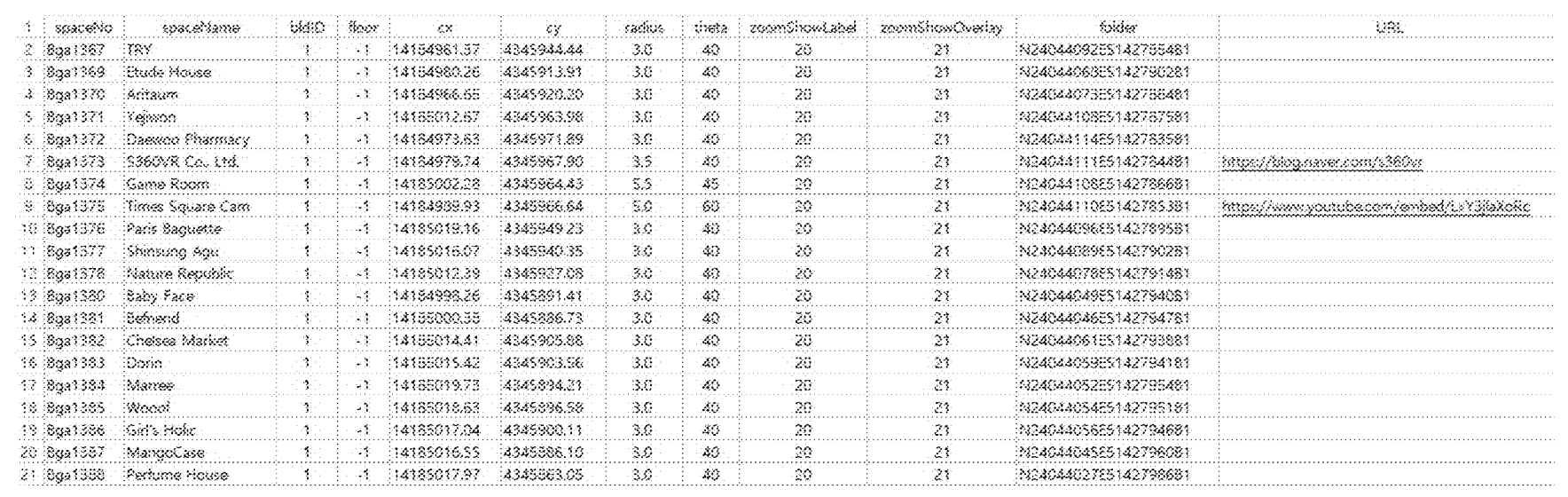

FIG. 45 is a space database simulated in Microsoft Excel. The fields of this space database include ID of the space (spaceID), name of the space (spaceName), ID of the building to which the space belongs (bldID), floor number in the building whereon the space is located (floor), easting (cx) and northing (cy) of the representative point of the space in Web Mercator projection, zoom level for showing link overlay (zoomShowLabel), zoom level for showing HTML page overlay (zoomShowOverlay), name of the individual folder (folder), and Internet address of the space (URL).

Figure 46:
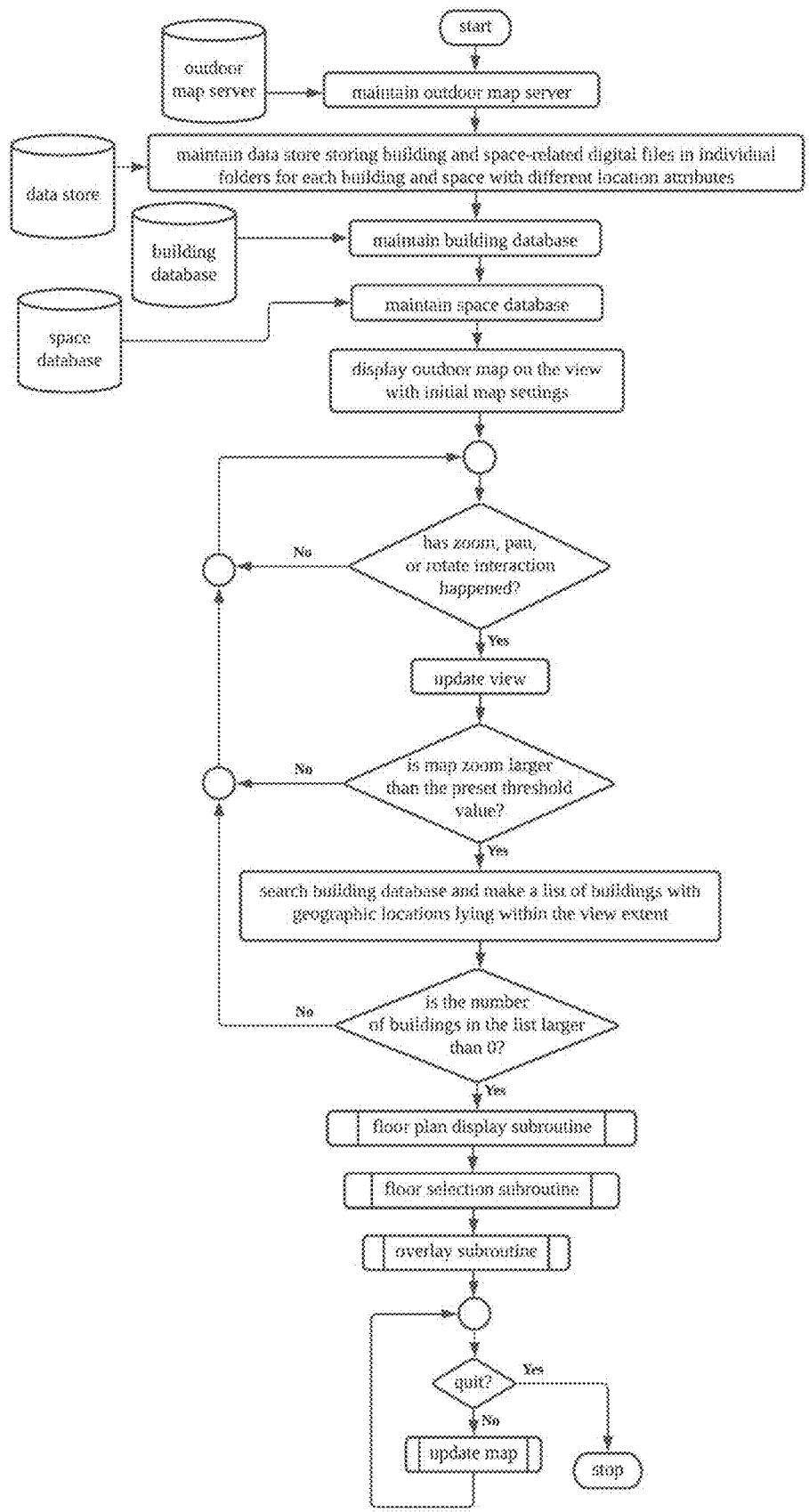
FIG. 46 is a flowchart showing the entire execution algorithm of the online platform according to the seventh embodiment of the present invention.

FIG. 46 is a flowchart showing the execution sequence of such a digital online platform. As such, a method of integrally displaying an outdoor map, an indoor map including floor plans of buildings, Internet links, and responsive HTML pages on the view of a digital map comprises maintaining an outdoor map server, maintaining a data store that manages building-related digital files including building outline drawings and floor plans and digital files related to spaces in individual folders for each building and space, maintaining a building database that manages map setting data of buildings, maintaining a space database that manages map setting data of spaces, starting a digital map with initial settings and showing an outdoor map on the view, updating the outdoor map shown on the view according to the zoom, pan and rotate operations by the user, searching the building database and making a view extent building list of buildings, of which the geographic locations are lying within the view extent, when the digital map zoom is greater than or equal to a preset threshold zoom value, launching a floor plan display subroutine and a floor selection subroutine if the number of buildings in the view extent building list is larger than 0, and executing an overlay subroutine displaying Internet links and responsive HTML pages for the spaces visible on the view.

Here, spaces are one or more places within the floor plans of buildings which have location attributes including geodetic latitudes and longitudes and optionally floor numbers, and map users can recognize boundaries in the shape of closed curves or polygons, and have finite areas.

The stages of displaying Internet links or responsive HTML pages for the spaces visible on the view comprises a stage of creating a list of spaces visible on the view—hereinafter referred to as the view extent space list—, a stage of creating link display space list for spaces, of which digital zoom is larger than the zoom level for showing link overlay and smaller than the zoom level for showing HTML page overlay, and HTML page display space list for spaces, of which digital zoom is larger than the zoom level for showing HTML page overlay by comparing the zoom level for showing link overlay (zoomShowLabel) and the zoom level for showing HTML page overlay (zoomShowOverlay) with the zoom on the digital map, a stage of displaying Internet links within the boundary of each space for spaces listed in link display spaces list, a stage of displaying responsive HTML pages within the boundary of each space for spaces listed in HTML page display space list.

The stages of displaying Internet links and displaying responsive HTML pages within the boundary of each space are the same as in the fifth and the sixth embodiments of the present invention. The Internet links in the seventh embodiment of the present invention include Internet links to any one among HTML pages, email addresses, phone numbers, SNS accounts, bulletin boards, blogs, photos or photo galleries, videos or video galleries, and sound sources, Internet shopping malls, IP camera viewers, NAS, game access screens, and video chat rooms.

Figure 47:
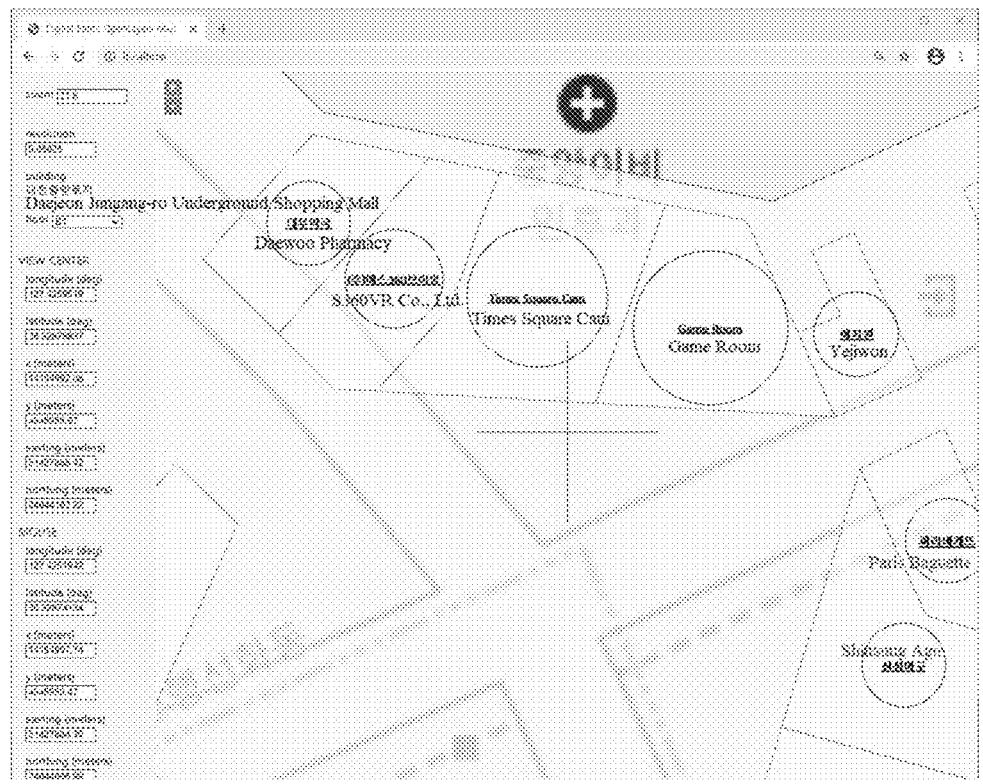
FIG. 47 to FIG. 53 show an exemplary embodiment of a digital map based online platform.

FIG. 47 to FIG. 53 show an exemplary embodiment of an online platform. In FIG. 47, imaginary shops are arranged in the Daejeon Jungang-ro Underground Shopping Mall. Shown in FIG. 47 are an Internet link to the applicant's blog (S360VR Co., Ltd.), an Internet link to Daewoo Pharmacy (Daewoo Pharmacy), an Internet link to Times Square live Camera (Times Square Cam), an Internet link to a game site (Game Room) and an Internet links to Korean restaurant Yejiwon (Yejiwon).

Figure 48:
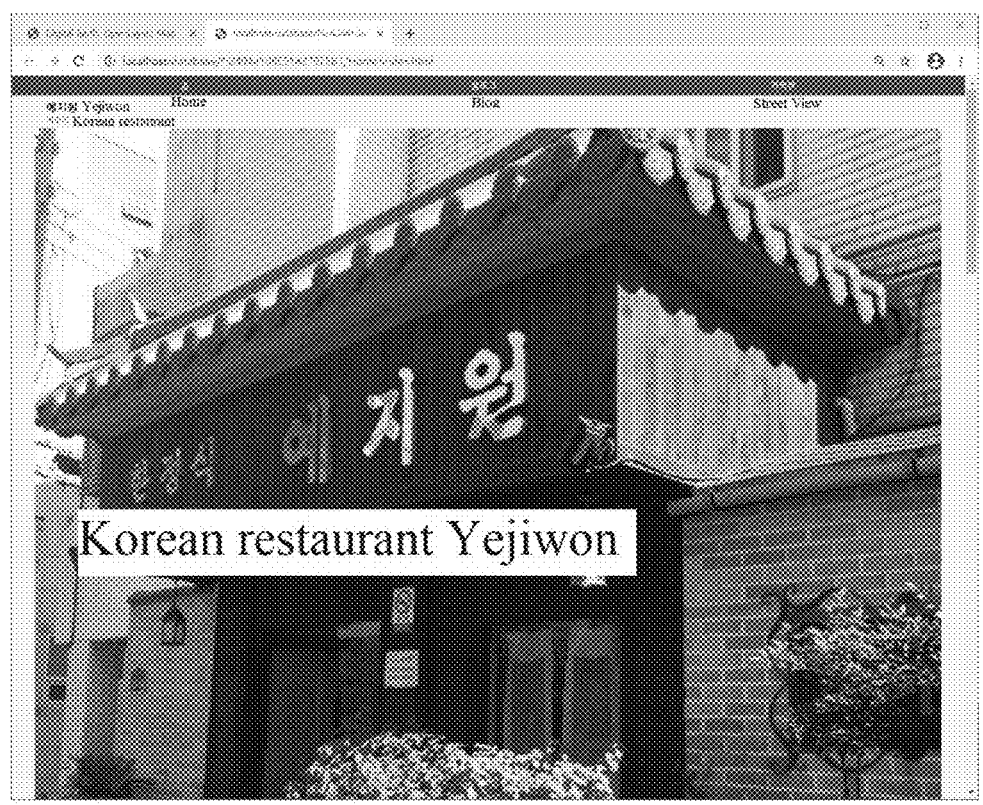
Figure 49:
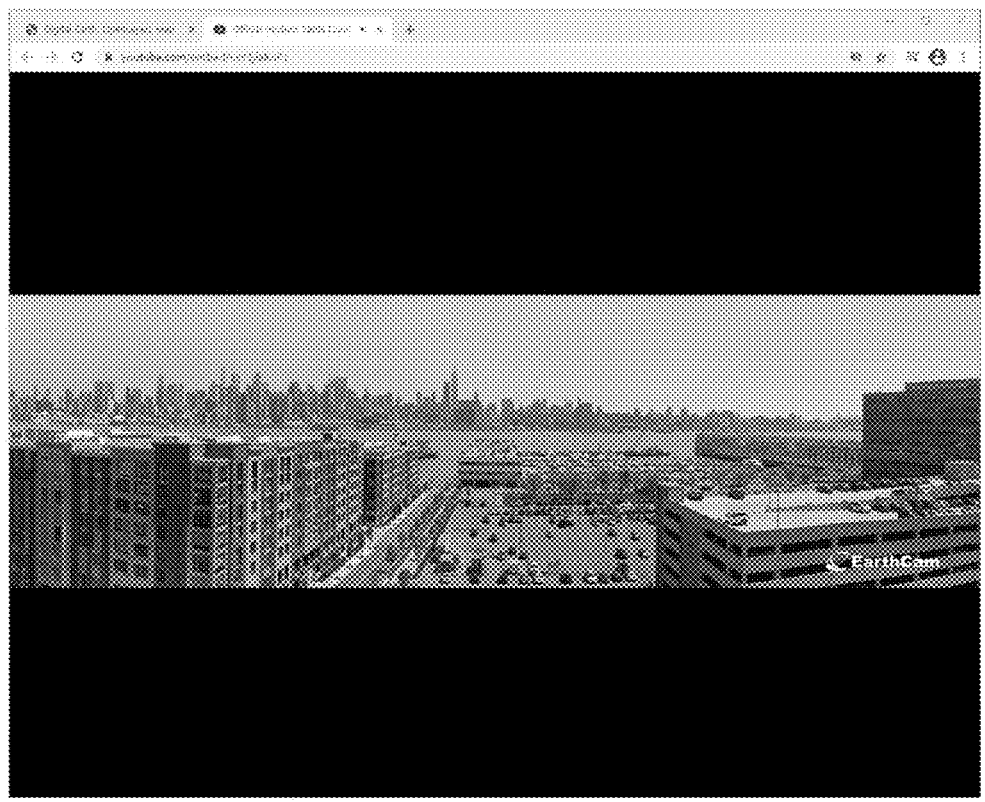
Figure 50:
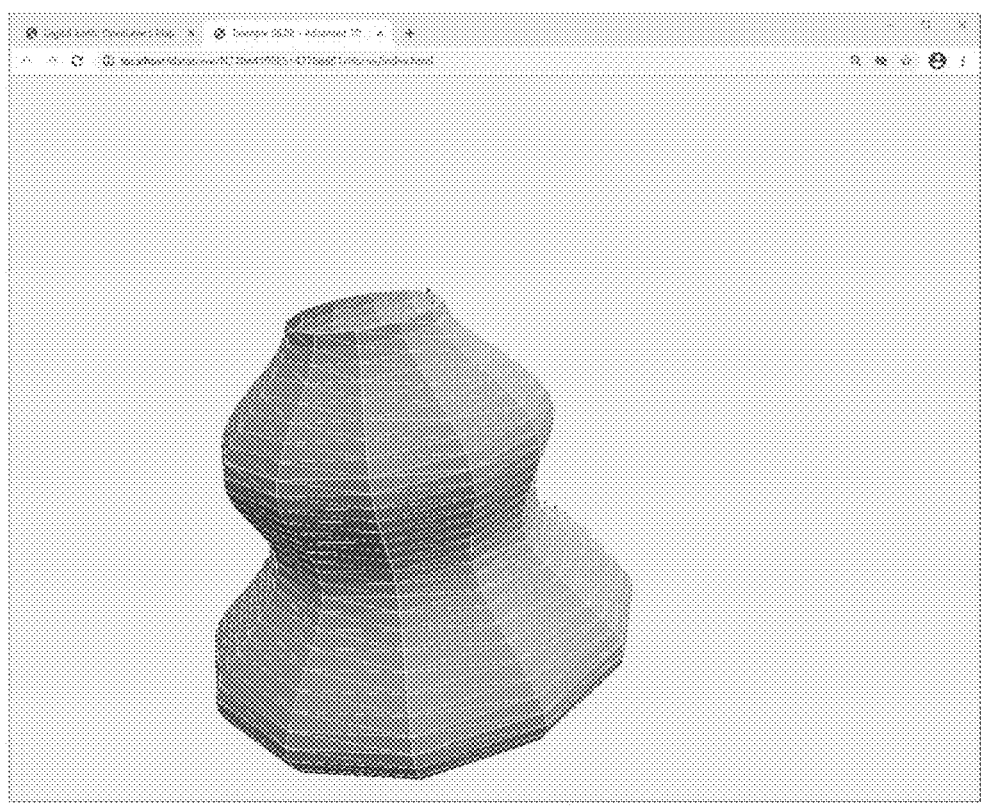
Figure 51:
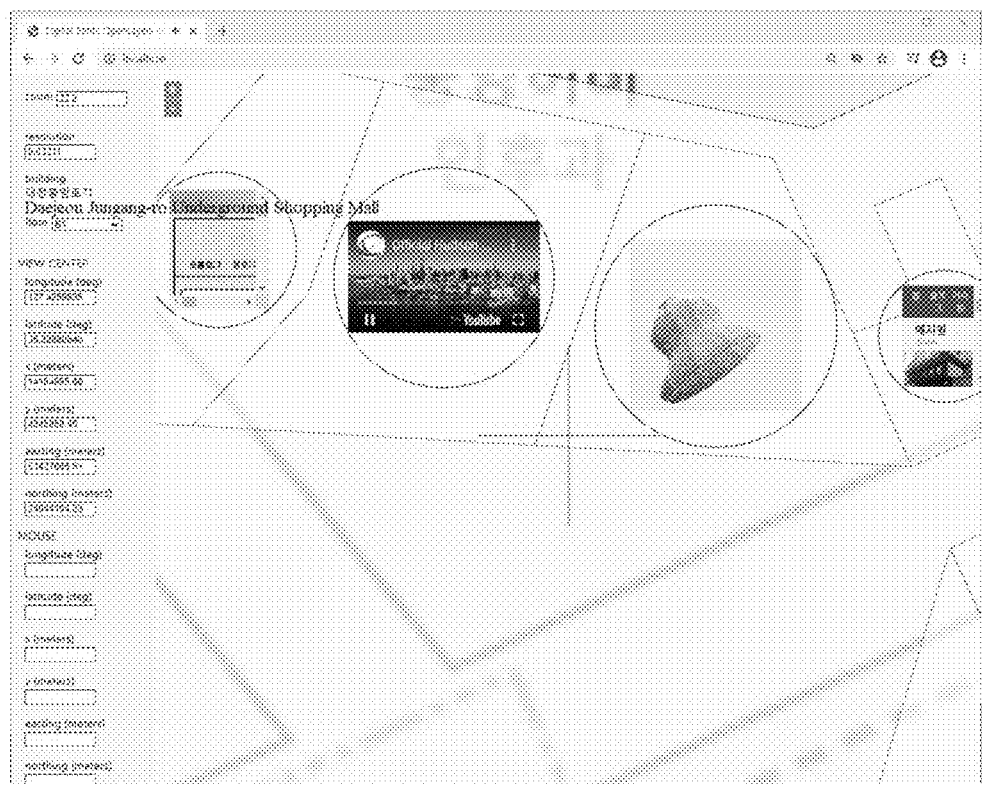
Figure 52:
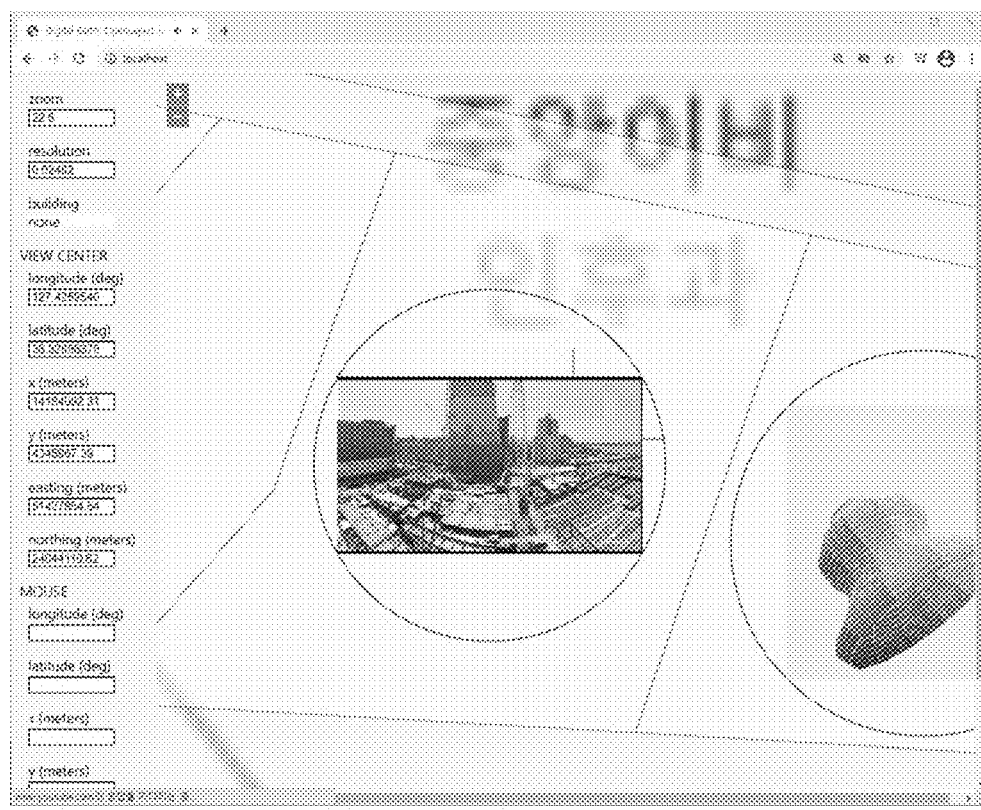
Figure 53:
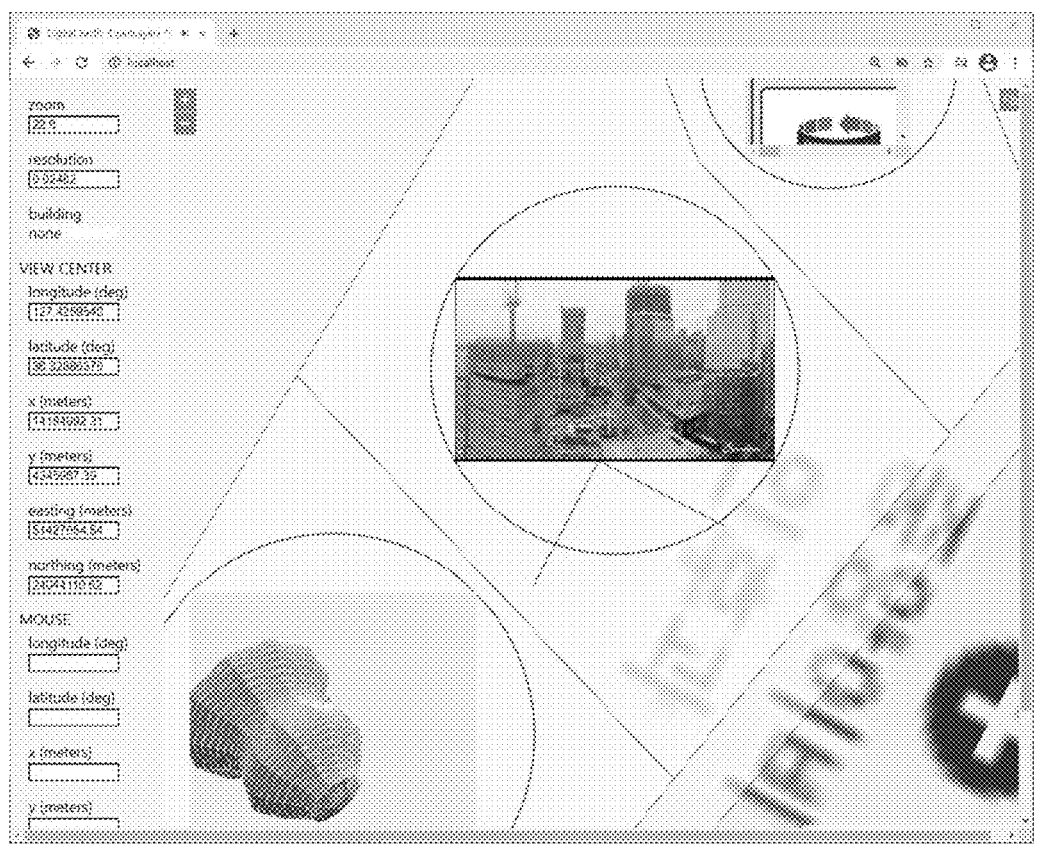

If the Internet link 'Yejiwon' in FIG. 48 is clicked, the homepage of this restaurant appears in a new window. FIG. 49 shows a screen of the Times Square live Camera, and FIG. 50 shows a virtual game screen. As such, an online platform according to the seventh embodiment of the present invention can be systematically connected to websites of arbitrary types as well as homepages. In FIG. 51, as the zoom level is increased, a responsive homepage appears instead of the Internet link. In FIG. 52, as the zoom level is increased, the responsive homepage also increased in size. In FIG. 53, responsive homepages maintain their orientation even if the map is rotated.

INDUSTRIAL APPLICABILITY

All Internet sites that can be assigned with location attributes can be integrated using a digital map based online platform, and separate Internet domains are not required.

What is claimed is:

1. A digital map system comprising a computer program stored in a non-transitory computer readable medium to be executed by a processor and executing a series of stages to integrally display an outdoor map and an indoor map including floor plans of building on a view of the digital map, the digital map system comprising:
an outdoor map server,
a data store that manages building outline drawings and floor plans of buildings in individual folders for each building,
a building database that manages map setting data of buildings,
and the series of stages are comprising:
starting a digital map with an initial map setting and displaying the outdoor map on the view,
updating the outdoor map shown on the view according to the user's zoom, pan, and rotate selections,
compiling a view extent building list consisting of buildings of which geographic locations are lying within the view extent by searching the building database when the zoom of the digital map is greater than or equal to a preset threshold zoom value,
launching a floor plan display subroutine and a floor selection subroutine when the number of buildings in the view extent building list is larger than 0,
wherein,
the floor plan display subroutine includes a stage of displaying outline drawings of buildings that satisfy preset conditions at correct positions on the outdoor map,
the floor selection subroutine includes a stage of displaying a floor selection menu for selecting a floor when the center of the view is lying within the outline of a building and the building has basement levels or is a multi-story building,
wherein,
a full path to an individual folder includes a common path and an individual folder name,
the individual folder name is given as one string containing a string P corresponding to a location attribute including a geodetic latitude, a longitude and optionally a floor number,
wherein,
the string P is either given by the following format, $P=N\{N\}E\{E\}$ or given by the following format, $P=N\{\overline{N}\}E\{\overline{E}\}$ wherein,
N, E, $\overline{N}$, $\overline{E}$ are identification letters respectively representing northing, easting, northing corresponding integer and easting corresponding integer,
curly brackets { } are symbols indicating to replace the curly brackets with an actual value corresponding to the identification letter therein,
northing N and easting E are real numbers having positive (+) values and having a unit of distance,
northing corresponding integer $\overline{N}$ and easting corresponding integer $\overline{E}$ are natural numbers obtained by rounding off the northing N and the easting E, respectively,
and a pair of northing N and easting E is mutually convertible with a pair of geodetic latitude $\phi$ and longitude $\lambda$,
wherein,
the northing N is given as follows, $N=N_o+R(\phi-\phi_0)$ wherein,
$N_o$ is a default value of the northing,
R is an average radius of the Earth,
the unit of angle is radian,
$\phi_o$ is the geodetic latitude of a reference point,
the easting E is given as follows, $E=E_o+(\lambda-\lambda_o)R \cos \phi$ where $E_o$ is the default value of the easting,
$\lambda_o$ is the longitude of the reference point,
the geodetic latitude $\phi$ is given as follows, $$\phi = \phi_o + \frac{N-N_o}{R}$$

and longitude $\lambda$ is given as follows.

$$\lambda = \lambda_o + \frac{E-E_o}{R\cos\left(\phi_o + \frac{N-N_o}{R}\right)}.$$

2. The digital map system of claim 1,
wherein,
the floor plan display subroutine is comprising:
compiling a building outline display list consisting of buildings of which building outline drawings are to be displayed by comparing the zoom level for showing building outline for the buildings in the view extent building list with the zoom level of the digital map,
retrieving building outline drawings of the buildings in the building outline display list from the data store, and displaying building outline drawings at correct positions on the outdoor map, investigating whether the zoom level of the digital map is larger than the zoom level for showing floor plan for each building in the building outline display list, and if it is larger, then compiling a floor plan display list consisting of buildings of which floor plans are to be displayed if the building has a ground floor, retrieving floor plans of ground floors from the data store for the buildings in the floor plan display list, and displaying them in conformity with the building outlines of the corresponding buildings.

3. The digital map system of claim 1, wherein, the floor selection subroutine is comprising:

investigating whether there is a building at the view center, displaying a floor selection menu for selecting a floor if the building at the view center has a basement level or the building is a multi-story building, if a user selects a floor other than the ground floor, removing the currently displayed floor plan of the building at the view center, and retrieving the floor plan of the selected floor from the data store, and displaying the floor plan of the selected floor conforming to the building outline of the building at the view center.

4. The digital map system of claim 1, further comprising a marker indicating the center of the view is displayed on the view.

\* \* \* \* \*